US011468044B2

(12) United States Patent
Zamani et al.

(10) Patent No.: US 11,468,044 B2
(45) Date of Patent: Oct. 11, 2022

(54) OPTIMIZATIONS FOR VERIFICATION OF INTERACTIONS SYSTEM AND METHOD USING PROBABILITY DENSITY FUNCTIONS

(71) Applicants: Visa International Service Association, San Francisco, CA (US); The Board of Trustees of the Leland Stanford Junior University, Stanford, CA (US)

(72) Inventors: Mahdi Zamani, Palo Alto, CA (US); Lucianna Kiffer, San Francisco, CA (US); Karl Benedikt Bunz, Stanford, CA (US)

(73) Assignees: Visa International Service Association, San Francisco, CA (US); The Board of Trustees of the Leland Stanford Junior University, Stanford, CA (US)

( * ) Notice: Subject to any disclaimer, the term of this patent is extended or adjusted under 35 U.S.C. 154(b) by 94 days.

(21) Appl. No.: 16/694,600

(22) Filed: Nov. 25, 2019

(65) Prior Publication Data

US 2021/0157790 A1    May 27, 2021

(51) Int. Cl.
*G06F 16/23* (2019.01)
*G06F 17/18* (2006.01)
(Continued)

(52) U.S. Cl.
CPC ...... *G06F 16/2379* (2019.01); *G06F 16/2255* (2019.01); *G06F 16/2455* (2019.01); *G06F 17/18* (2013.01)

(58) Field of Classification Search
CPC ............. G06F 16/2379; G06F 16/2255; G06F 16/2455; G06F 17/18
(Continued)

(56) References Cited

U.S. PATENT DOCUMENTS

| 8,996,563 B2 * | 3/2015 | Bender ............... G06F 16/2291 707/769 |
| 10,102,265 B1 | 10/2018 | Madisetti et al. |

(Continued)

FOREIGN PATENT DOCUMENTS

| CN | 109242500 | 1/2019 |
| KR | 102046059 B1 | 11/2019 |

(Continued)

OTHER PUBLICATIONS

A Next-Generation Smart Contract and Decentralized Application Platform, White Paper, Available Online at: https://github.com/ethereum/wiki/wiki/White-Paper, Accessed from Internet on Mar. 12, 2019, 49 pages.

(Continued)

*Primary Examiner* — Hanh B Thai
(74) *Attorney, Agent, or Firm* — Kilpatrick Townsend & Stockton LLP

(57) ABSTRACT

A method comprises a client device receiving a verification request comprising an interaction identifier and generating a random sampling of a number of block headers. The random sampling according to a random distribution generated based on a probability density function. The client device can query two or more full nodes for random samplings of block headers. The client device can receive the random samplings of block headers from the two or more full nodes and compare samplings of block headers received from two or more full nodes. The samplings of block headers are the random samplings of block headers. The client device can verify at least one block header of the samplings of block headers, then determine that a blockchain maintained by at least one of the two or more full nodes is valid in response to verifying the at least one block header of the samplings of block headers.

14 Claims, 20 Drawing Sheets

(51) Int. Cl.
G06F 16/22 (2019.01)
G06F 16/2455 (2019.01)
(58) Field of Classification Search
USPC .......................................................... 707/703
See application file for complete search history.

(56) References Cited

U.S. PATENT DOCUMENTS

| | | | |
|---|---|---|---|
| 10,157,295 | B2 | 12/2018 | Barinov et al. |
| 10,372,786 | B2* | 8/2019 | Loetjoenen .......... G06K 9/6296 |
| 10,482,196 | B2* | 11/2019 | Eckart .................. G06K 9/6277 |
| 10,592,324 | B2* | 3/2020 | Puri ....................... G06F 11/079 |
| 11,055,707 | B2 | 7/2021 | Lingappa |
| 2007/0266233 | A1 | 11/2007 | Jethanandani et al. |
| 2011/0246503 | A1* | 10/2011 | Bender ................. G06F 16/258 707/769 |
| 2013/0096878 | A1* | 4/2013 | Lotjonen ................ G06F 17/00 702/182 |
| 2015/0370860 | A1* | 12/2015 | Bender ............. G06F 16/24575 707/693 |
| 2016/0253232 | A1* | 9/2016 | Puri .................... G06F 11/0751 714/37 |
| 2017/0169352 | A1* | 6/2017 | Loetjoenen ............ G06N 7/005 |
| 2017/0249401 | A1* | 8/2017 | Eckart .................. G06V 10/955 |
| 2017/0344580 | A1 | 11/2017 | King |
| 2018/0139042 | A1 | 5/2018 | Binning et al. |
| 2018/0336552 | A1 | 11/2018 | Bohli et al. |
| 2019/0081793 | A1 | 3/2019 | Martino et al. |
| 2019/0123892 | A1 | 4/2019 | Basu |
| 2019/0130295 | A1* | 5/2019 | Okuyama ............... G06F 17/11 |
| 2019/0147065 | A1 | 5/2019 | Maeda et al. |
| 2019/0164153 | A1 | 5/2019 | Agrawal et al. |
| 2019/0188711 | A1 | 6/2019 | Wu et al. |
| 2019/0279210 | A1 | 9/2019 | Pen |
| 2019/0287105 | A1 | 9/2019 | Fedorov et al. |
| 2019/0370250 | A1* | 12/2019 | Tipton ................ G06F 16/9027 |
| 2020/0076603 | A1 | 3/2020 | Li et al. |
| 2020/0162239 | A1* | 5/2020 | Carver ................ G06F 16/2365 |
| 2020/0213128 | A1 | 7/2020 | Sharma et al. |
| 2020/0220899 | A1 | 7/2020 | Mathai et al. |
| 2020/0374300 | A1* | 11/2020 | Manevich ........... H04L 63/1416 |
| 2020/0379856 | A1* | 12/2020 | Jayachandran ..... G06F 16/9024 |
| 2020/0394176 | A1* | 12/2020 | Wu ..................... G06F 16/9024 |
| 2021/0157790 | A1 | 5/2021 | Zamani et al. |
| 2021/0232460 | A1 | 7/2021 | Kottomtharayil et al. |

FOREIGN PATENT DOCUMENTS

| | | |
|---|---|---|
| WO | 2018217804 | 11/2018 |
| WO | 2019032891 A1 | 2/2019 |

OTHER PUBLICATIONS

A Timestamping Proof Standard, OpenTimestamps, Available Online at: https://opentimestamps.org/, Accessed from Internet on Mar. 11, 2019, 4 pages.
Gilad, et al., Algorand: Scaling Byzantine Agreements for Cryptocurrencies, SOSP '17 Proceedings of the 26th Symposium on Operating Systems Principles, Oct. 28-31, 2017, pp. 51-68.
Merkle, et al., A Digital Signature Based on a Conventional Encryption Function, Proceeding CRYPTO '87 A Conference on the Theory and Applications of Cryptographic Techniques on Advances in Cryptology, Aug. 16-20, 1987, pp. 369-378.
Nakamoto, Bitcoin: A Peer-to-Peer Electronic Cash System, XP055131503, Available Online at: http://Nakamotoinstitute.org/static/docs/bitcoin.pdf, Oct. 31, 2008, pp. 1-9.
Blockchain Size the Total Size of All Block Headers and Transactions. Not Including Database Indexes, blockchain.com, Available Online at: https://www.blockchain.com/charts/blocks-size?, Accessed from Internet on Mar. 11, 2019, 1 page.
Blockchain Takes Way Too Long to Sync #2394, GitHub, Available Online at: https://github.com/ethereum/mist/issues/2394, May 31, 2017, 4 pages.
Laurie, et al., Certificate Transparency, Internet Engineering Task Force (IETF), ISSN: 2070-1721, Jun. 2013, 27 pages.
Hanke, et al., DFINITY Technology Overview Series Consensus System, Technology Overviews, Jan. 23, 2018, 16 pages.
Difficulty-Blockchain, Available Online at: https://www.blockchain.com/en/charts/difficulty, Accessed from Internet on Mar. 11, 2017, 1 page.
Ethereum Blocks, Available Online at: https://etherscan.io/blocks, Accessed from Internet on Mar. 11, 2019, 2 pages.
Ethereum Contract for Bitcoin SPV: Live on https://etherscan.io/address/0x41f274c0023f83391de4e0733c609df5a124c3d4 http://btcrelay.org, GitHub, Available Online at: https://github.com/ethereum/btcrelay, Accessed from Internet on Mar. 11, 2019, 6 pages.
Saini, Getting Deep Into Geth: Why Syncing Ethereum Node Is Slow, Available Online at: https://hackernoon.com/getting-deep-into-geth-why-syncing-ethereum-node-is-slow-1edb04f9dc5, Jul. 30, 2018, 6 pages.
Help:FAQ—Bitcoin Wiki, Available Online at: https://en.bitcoin.it/wiki/Help:FAQ, Accessed from Internet on Mar. 11, 2019, 16 pages.
Pass, et al., Hybrid Consensus: Efficient Consensus in the Permissionless Model, Initiative for Crypto Currency and Contracts (IC3), 2016, pp. 1-56.
Hyperledger Sawtooth Documentation, Sawtooth v1.1.4 Documentation, Available Online at: https://sawtooth.hyperledger.org/docs/core/releases/latest/index.html, Accessed from Internet on Mar. 11, 2019, 1 page.
Leaders in Blockchain-based Data Certification, Stampery, Available Online at: https://stampery.com/, Accessed from Internet Mar. 11, 2019, 8 pages.
Todd, et al., Merkle-Mountain-Range.md, GitHub, Available Online at: https://github.com/opentimestamps/opentimestamps-server/blob/master/doc/merkle-mountain-range.md, Accessed From Internet on Mar. 12, 2019, 2 pages.
Buterin, Merkling in Ethereum, Available Online at: https://blog.ethereum.org/2015/11/15/merkling-in-ethereum/, Nov. 15, 2015, 9 pages.
Poelstra, Mimblewimble, Available Online at: https://download.wpsoftware.net/bitcoin/wizardry/mimblewimble.pdf, Oct. 6, 2016, pp. 1-19.
Over 175 Million Europeans Ready to Pay with Wearable Devices, Mastercard, Engagement Bureau, Feb. 22, 2018, 3 pages.
Dwork, et al., Pricing via Processing or Combatting Junk Mail, Advances in Cryptology—CRYPTO '92, Lecture Notes in Computer Science, 1993, pp. 139-147.
Goldwasser, et al., Private Coins Versus Public Coins in Interactive Proof Systems, Proceeding STOC '86 Proceedings of the Eighteenth Annual ACM Symposium on Theory of Computing, May 28-30, 1986, pp. 59-68.
Kiayias, et al., Proof-of-Work Sidechains, Available Online at: https://fc19.ifca.ai/wtsc/PowSidechains.pdf, Oct. 30, 2018, 20 pages.
Dziembowski, et al., Proofs of Space Advances in Cryptology—CRYPTO 2015, Lecture Notes in Computer Science, Aug. 1, 2015, pp. 585-605.
Karp, et al., Randomized Rumor Spreading, Proceedings 41st Annual Symposium on Foundations of Computer Science, Nov. 12-14, 2000, 10 pages.
Daian, et al., Snow White: Robustly Reconfigurable Consensus and Applications to Provably Secure Proof of Stake, Financial Cryptography and Data Security, 2019, pp. 1-65.
Bano, et al., SoK: Consensus in the Age of Blockchains, Available Online at: arXiv: 1711.03936 [cs.CR], Nov. 14, 2017, 17 pages.
Gervais, et al., Tampering with the Delivery of Blocks and Transactions in Bitcoin, CCS '15 Proceedings of the 22nd ACM SIGSAC Conference on Computer and Communications Security, Oct. 12-16, 2015, 2 pages.
The High-Value-Hash Highway, Bitcoin Forum, Aug. 7, 2012, pp. 1-11.
Thin Client Security, Bitcoin Wiki, Available Online at: https://en.bitcoin.it/wiki/Thin_Client_Security, Accessed from Internet Mar. 11, 2019, 4 pages.
Top 6 Vendors in the Wearable Payment Market from 2016 to 2020: Technavio, Business Wire, Technavio, Nov. 18, 2016, 5 pages.

(56) References Cited

OTHER PUBLICATIONS

Visa Brings Secure Payment Solutions to the Internet of Things, Visa, Available Online at: https://USA.visa.com/visa-everywhere/innovation/visa-brings-secure-payments-to-internet-of-things.html, Accessed from Internet Mar. 11, 2019, 3 pages.

SHARMA What Is Ethereum's "Difficulty Bomb"?, Available Online at: https://www.investopedia.com/news/what-ethereums-difficulty-bomb/, Aug. 10, 2018, 7 pages.

Zamyatin, et al., (Short Paper) A Wild Velvet Fork Appears! Inclusive Blockchain Protocol Changes in Practice, 5th Workshop on Bitcoin and Blockchain Research, Financial Cryptography and Data Security 18, Apr. 18, 2018, 10 pages.

EP20155067.0 , "Extended European Search Report", dated Jun. 5, 2020, 8 pages.

PCT/US2020/061535 , "International Search Report and Written Opinion", dated Mar. 16, 2021, 11 pages.

U.S. Appl. No. 16/694,626 , "Notice of Allowance", dated Aug. 18, 2021, 24 pages.

Bunz et al., "FlyClient: Super-Light Clients for Cryptocurrencies", https://eprint.iacr.org/eprint-bin/versions.pl?entry-2019/226, Feb. 28, 2019, 29 pages.

Bunz et al., "FlyClient: Super-Light Clients for Cryptocurrencies", https://eprint.iacr.org/eprint-bin/versions.pl?entry-2019/226, Jun. 22, 2019, 30 pages.

Bunz et al., "FlyClient: Super-Light Clients for Cryptocurrencies", https://eprint.iacr.org/eprint-bin/versions.pl?entry-2019/226, Aug. 8, 2019, 31 pages.

Bunz et al., "FlyClient: Super-Light Clients for Cryptocurrencies", https://eprint.iacr.org/eprint-bin/versions.pl?entry-2019/226, Aug. 13, 2019, 31 pages.

Bunz et al., "FlyClient: Super-Light Clients for Cryptocurrencies", https://eprint.iacr.org/eprint-bin/versions.pl?entry-2019/226, Aug. 20, 2019, 31 pages.

Bunz et al., "FlyClient: Super-Light Clients for Cryptocurrencies", https://eprint.iacr.org/eprint-bin/versions.pl?entry-2019/226, Oct. 21, 2019, 31 pages.

\* cited by examiner

OPTIMIZATIONS FOR VERIFICATION OF INTERACTIONS SYSTEM AND METHOD USING PROBABILITY DENSITY FUNCTIONS

BACKGROUND

To ensure the validity of interactions, verification networks rely on a mechanism to verify if particular interactions are included in a blockchain. A node in the verification network can check if an interaction is recorded in the blockchain and that the block belongs to the longest chain (i.e., correct chain), in case of a fork in the blockchain. To perform these checks, the node downloads all blocks in the blockchain and verifies all of them. Blockchains like Ethereum and Bitcoin rely on proof-of-work (PoW) to reach agreement on blocks of transactions added to their blockchains. In Bitcoin and Ethereum, syncing all of these blocks requires a node to send and receive hundreds of gigabytes of data (about 160 GB in Bitcoin, and 650 GB in Ethereum), taking days for both downloading and verification.

Having all blocks allows a node to verify the inclusion of any past transaction on the blockchain. Such a requirement especially imposes a significant burden on resource-limited clients, often known as light or thin clients, such as smartphones and Internet-of-things devices that typically have access to limited bandwidth, storage, and computation resources, but still want to verify the inclusion of transactions on the blockchain.

Bitcoin has a synchronization mechanism, called simplified payment verification (SPV), that allows clients with limited resources, such as mobile phones and tablets, to verify transactions without downloading the entire blocks. In SPV, instead of downloading all blocks from a full node, an SPV client can download all block headers, which have a much smaller size than the blocks (e.g., 80 bytes per block header vs 1 MB per block in Bitcoin), but still contain enough information to correctly verify that a transaction is included in some block and verify that the block is included at a certain position in the blockchain. Each block header contains the root of a Merkle tree that is constructed over all transactions in the block. The Merkle root of the Merkle tree, along with a Merkle proof sent by the full node for any given transaction, allows the light client to verify the inclusion of the transaction in the block. Due to the hash of the previous block included in each header, the client can also check the validity of every header on the chain one-by-one. This ensures that the header corresponds to a valid block at a certain position in a blockchain of the same length, which the full node has never sent to the light client in full.

SPV clients are the most popular clients in the Bitcoin ecosystem and enable various applications to a broad class of users. This is mainly due to the fact that not many people can afford the technical and physical resources needed to run a full node. For example, Bitcoin's blockchain was recently used to build notary services by allowing users to verify the validity and integrity of documents with SPV clients, see [Open timestamps. https://opentimestamps.org/, 2018] and [Stampery. https://stampery.com/, 2018]. Also, in a recent work known as Catena, see [Alin Tomescu and Srivinas Devadas. Catena: Efficient non-equivocation via bitcoin. In 2017 *IEEE Symposium on Security and Privacy* (*SP*), pages 393-409, May 2017], an authenticated log system leverages Bitcoin's blockchain to allow Internet browsers to fetch and validate HTTPS certificates. Thus, light-weight verification clients are in great demand. SPV proofs can also be used in applications that require cross-ledger verification of transactions, e.g., transferring assets to sidechains.

As the number of block headers increases linearly with the size of the blockchain, the resource constraints for current light clients also increase. For example, as of mid-2018, the Ethereum blockchain has more than 6 million blocks. Given that each block header is of size 528 bytes, an SPV client in Ethereum would have to download and store more than 3 GB of data to be able to verify all events on the Ethereum blockchain. As such, current light clients cannot handle the large amounts of data needed to verify interactions on blockchains as the length of the blockchains increase.

Under one sampling protocol described in PCT/US2018/046101, filed on Aug. 9, 2018. Further, light clients can assume that a full node is honest if the full node responds with a current height of a blockchain consistently with other full nodes in the network. While this can be an effective approach, improvements can be made. For example, a malicious full node could potentially report the same current height of the blockchain, by including fake blocks in the blockchain.

Additionally, a system of light clients and full nodes can have high latency in its communications when a block header sampling protocol includes many rounds of communication. For example, a verification network can include thousands of full nodes and even more light clients. A high latency sampling protocol can slow down the whole verification network, and possibly cause processing bottlenecks.

Embodiments of the invention address these and other problems individually and collectively.

BRIEF SUMMARY

Embodiments are related to methods and systems of efficiently determining that a full node maintains a valid longest blockchain as well as verifying that an interaction is valid and stored in the blockchain.

One embodiment is directed to a method. The method comprises receiving, by a client device, a verification request comprising an interaction identifier; generating, by the client device, a random sampling of a number of block headers, wherein the random sampling is according to a random distribution that is generated based on a probability density function; prior to comparing, querying, by the client device, two or more full nodes for random samplings of block headers from the two or more full nodes; receiving, by the client device, the random samplings of block headers from the two or more full nodes; comparing, by the client device, samplings of block headers received from two or more full nodes, wherein the samplings of block headers are the random samplings of block headers; based on the comparing, verifying, by the client device, at least one block header of the samplings of block headers; and determining that a blockchain maintained by at least one of the two or more full nodes is valid in response to verifying the at least one block header of the samplings of block headers.

Another embodiment is directed to the client device comprising: a processor; and a computer readable medium coupled to the processor, the computer readable medium comprising code, executable by the processor, for implementing a method comprising: receiving a verification request comprising an interaction identifier; generating a random sampling of a number of block headers, wherein the random sampling is according to a random distribution that is generated based on a probability density function; prior to comparing, querying two or more full nodes for random samplings of block headers from the two or more full nodes; receiving the random samplings of block headers from the two or more full nodes; comparing samplings of block headers received from two or more full nodes, wherein the samplings of block headers are random samplings of block headers; based on the comparing, verifying at least one block header of the samplings of block headers; and determining that a blockchain maintained by at least one of the two or more full nodes is valid in response to verifying the at least one block header of the samplings of block headers.

One embodiment is directed to a method. The method comprises receiving, by a full node, a query from a client device including a request for one or more block headers from a blockchain, wherein the full node maintains a copy of the blockchain; generating, by the full node, a sampling of block headers comprising the one or more block headers, wherein the samplings of block headers are random samplings of block headers and wherein the client device generates a random sampling of a number of block headers, wherein the client device generates the random sampling according to a random distribution that is based on a probability density function; and transmitting, by the full node, the sampling of block headers to the client device, wherein the client device compares the sampling of block headers to corresponding block headers from one or more other full nodes, based on the comparison, verifies at least one block header of the sampling of block headers, and determines that the blockchain maintained by at least the full node is valid in response to verifying the at least one block header of the samplings of block headers.

Another embodiment is directed to the client device comprising: a processor; and a computer readable medium coupled to the processor, the computer readable medium comprising code, executable by the processor, for implementing a method comprising: receiving a query from a client device including a request for one or more block headers from a blockchain, wherein the full node maintains a copy of the blockchain; generating a sampling of block headers comprising the one or more block headers, wherein the samplings of block headers are random samplings of block headers and wherein the client device generates a random sampling of a number of block headers, wherein the client device generates the random sampling according to a random distribution that is based on a probability density function; and transmitting the sampling of block headers to the client device, wherein the client device compares the sampling of block headers to corresponding block headers from one or more other full nodes, based on the comparison, verifies at least one block header of the sampling of block headers, and determines that the blockchain maintained by at least the full node is valid in response to verifying the at least one block header of the samplings of block headers.

Further details regarding embodiments of the invention can be found in the Detailed Description and the Figures.

DETAILED DESCRIPTION

Figure 1:
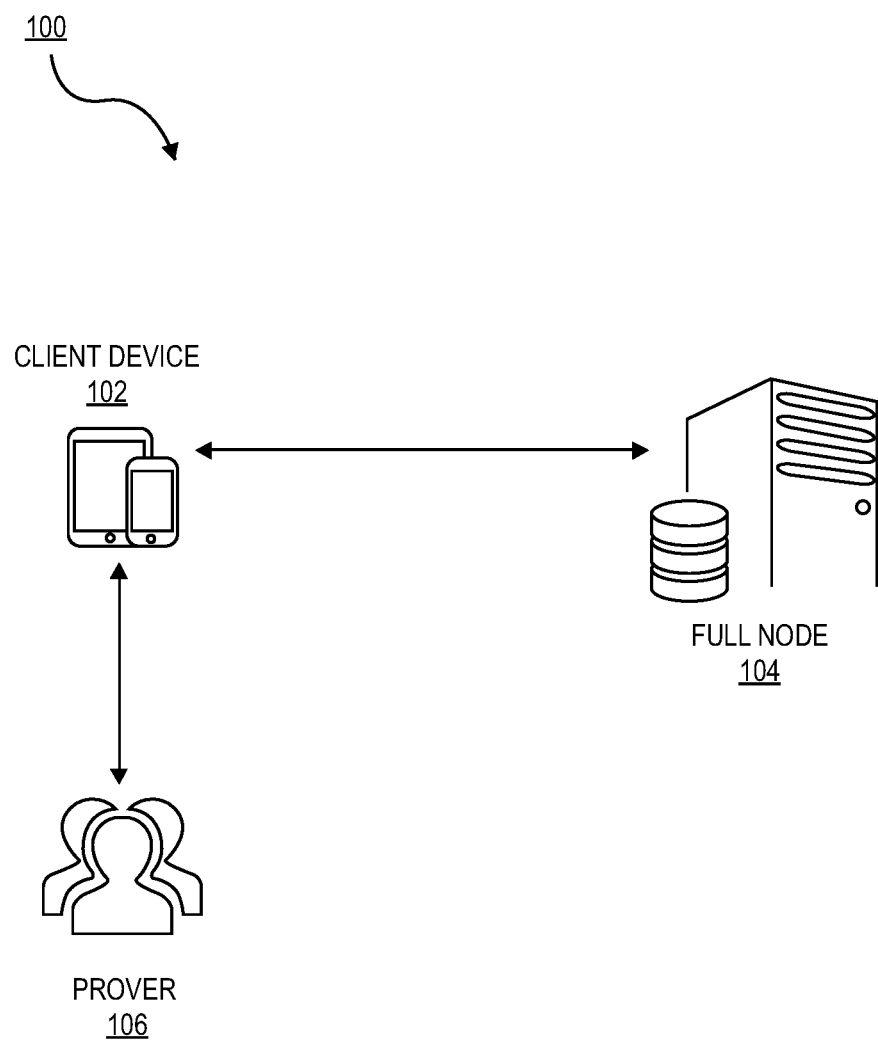
FIG. 1 shows a diagram of a system according to embodiments.

Prior to discussing embodiments, some terms can be described in further detail.

A "user" may include an individual. In some embodiments, a user may be associated with one or more personal accounts and/or mobile devices. The user may also be referred to as a cardholder, account holder, or consumer in some embodiments.

A "client device" may be a computing device capable of transmitting and/or receiving data to and from a server. Examples of client devices may include a mobile phone, a smart phone, a personal digital assistant (PDA), a laptop computer, a desktop computer, a server computer, a vehicle such as an automobile, a light client device, a tablet PC, etc. Additionally, user devices may be any type of wearable technology device, such as a watch, earpiece, glasses, etc. The user device may include one or more processors capable of processing user input. The user device may also include one or more input sensors for receiving user input. The user device may comprise any electronic device that may be operated by a user, which may also provide remote communication capabilities to a network. Examples of remote communication capabilities include using a mobile phone (wireless) network, wireless data network (e.g., 3G, 4G, or similar networks), Wi-Fi, Wi-Max, or any other communication medium that may provide access to a network such as the Internet or a private network.

A "light client" may be an application or software capable of communicating with a verification network. The light client may, for example, be present on a client device. In some embodiments, a light client may communicate with a verification network and verify a longest blockchain and an interaction. In some embodiments, a light client downloads only a small part of a blockchain, allowing users of lowpower or low-storage hardware like smartphones and laptops to maintain almost the same guarantee of security, by sometimes selectively downloading small parts of the state without needing to spend megabytes of bandwidth and gigabytes of storage on full blockchain validation and maintenance.

A "verification network" may be any set of nodes (computer systems and components) configured to provide verification for an interaction. The verification network may comprise a distributed computing environment utilizing several nodes that are interconnected via communication links, using one or more computer networks or direct connections. The verification network may be implemented over any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the verification network can be enabled by wired or wireless connections and combinations thereof. Nodes may be independently operated by third parties and may be added to, or removed from, the verification network on a continuous basis. In some embodiments, a node in a verification network may be a full node.

A "node" may be a point at which lines or pathways intersect or branch or can be a central or connecting point. A node can be a "graph node," which can be a data value in a Merkle tree or a Merkle mountain range. A graph node can include data such as a hash value, which can be equivalent to child graph nodes of the graph node hashed together. A graph node at the bottom of a Merkle tree or a Merkle mountain range can be referred to as a leaf node. A graph node at the top of a Merkle tree or a Merkle mountain range can be referred to as a root node.

A node can also be a "computer node," which can be any computer or device that connects to the verification network. A node that can fully verify each block and interaction in the blockchain can be a full node. A "full node" can store the full blockchain (i.e., each block and each interaction). A "client device" may be a computer node in the verification network. The use of a node as being a graph node or a computer node will be apparent according to the context in which it is used.

The term "verification" and its derivatives may refer to a process that utilizes information to determine whether an underlying subject is valid under a given set of circumstances. Verification may include any comparison of information to ensure some data or information is correct, valid, accurate, legitimate, and/or in good standing.

A "verification request" can be a request message requesting verification of something. In some embodiments, a verification request can comprise an interaction identifier, and the verification request can request verification of the interaction identifier. In some embodiments, the verification request can also comprise a Merkle proof as well as a Merkle mountain range proof. The Merkle proof and the Merkle mountain range proof can be associated with the interaction identifier included in the verification request.

A "verification proof" can be a data item that can be used to verify the truth of a statement. A verification proof can be included in a verification request regarding an interaction. In some embodiments, a verification proof can be a Merkle proof or a Merkle mountain range proof.

A "Merkle tree" can be a data structure that can encode interaction data. A Merkle tree can be a balanced binary tree where the leaf nodes of the tree hold some value, and each non-leaf node can store a hash of a concatenation of the values of at least two children nodes. When a new leaf is added to a Merkle tree, the entire tree can be recomputed. For example, each node in the Merkle tree can be determined to be the hash of at least two children nodes.

A "Merkle proof" can be a proof that an interaction is included in a Merkle tree. A Merkle proof can include a path from a Merkle root of a Merkle tree to a node associated with an interaction identifier as well as sibling nodes of each node in the path. The path can include each node connecting the Merkle root node to the node associated with the interaction identifier.

A "Merkle mountain range" can be a data structure that can encode block headers. For example, a Merkle mountain range can be a type of Merkle tree. A Merkle mountain range M can be a binary hash tree with n leaves, a root r, and the following properties: 1) M can be a hash tree; 2) M can have a depth $\lceil \log_2 n \rceil$; and 3) if n>1, the number of leaves n=$2^i$+j for a maximum integer i such that $2^i$<n, wherein r.left can be a Merkle mountain range with $2^i$ leaves and wherein r.right can be a Merkle mountain range with j leaves. A Merkle mountain range can allow for new leafs to be appended to the Merkle mountain range without recomputing the entire Merkle mountain range. A small number of nodes are recomputed when appending a new leaf to a Merkle mountain range.

A "Merkle mountain range proof" can be a proof that a block header is included in a Merkle mountain range. For example, a Merkle mountain range proof can include a path from a Merkle mountain range root to a node associated with a block header. The path can include each node connecting the root node to the node associated with the block header The Merkle mountain range proof can also include the sibling nodes of each node in the path.

A "sibling node" can denote a relationship between nodes. A node's sibling node can be a node that is in a same hierarchical level under the same parent node in either a Merkle tree or a Merkle mountain range. For example, a node that is a parent node can have two child nodes that are on a lower hierarchical level than the parent node. The two child nodes can be sibling nodes.

A "Merkel root" and a "Merkle mountain range root" can be a node at the highest hierarchical level in a Merkle tree or a Merkle mountain range, respectively. A Merkle root and a Merkle mountain range root do not have any sibling nodes or parent nodes. A Merkle root and a Merkle mountain range root can connect to child nodes.

A "blockchain" can be a distributed database that maintains a continuously-growing list of records secured from tampering and revision. A blockchain may include a number of blocks of interaction records. Each block in the blockchain can contain also include a timestamp and a link to a previous block. Stated differently, interaction records in a blockchain may be stored as a series of "blocks," or permanent files that include a record of a number of interactions occurring over a given period of time. Blocks may be appended to a blockchain by an appropriate node after it completes the block and the block is validated. Each block can be associated with a block header. In embodiments, a blockchain may be distributed, and a copy of the blockchain may be maintained at each full node in a verification network. Any node within the verification network may subsequently use the blockchain to verify interactions.

A "block header" can be a header including information regarding a block. A block header can be used to identify a particular block an a blockchain. A block header can comprise any suitable information, such as a previous hash, a Merkle root, a timestamp, a nonce, and a Merkle mountain range root. In some embodiments, a block header can also include a difficulty value.

An "interaction" may refer to a reciprocal action or influence. An interaction can include a communication, contact, or exchange between parties, devices, and/or entities. Example interactions include a transaction between two parties and a data exchange between two devices. Interactions can also be agreements, contracts, and the like.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "resource provider" may be an entity that can provide a resource such as goods, services, information, and/or access. Examples of resource providers includes merchants, access devices, secure data access points, data providers, transit agencies, governmental entities, venue and dwelling operators, etc. A resource provider may operate a client device. A merchant may typically be an entity that engages in transactions and can sell goods or services, or provide access to goods or services.

A "merchant" may typically be an entity that engages in transactions and can sell goods or services, or provide access to goods or services.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Details of some embodiments of the present invention will now be described.

I. Introduction

Embodiments allow for an interaction verification protocol for light clients in blockchain protocols that grow based on the longest chain principle. In embodiments, a verifier operating a client device can download and store a logarithmic (rather than a linear) number of block headers to verify any interaction stored on a blockchain. Embodiments can utilize a non-interactive probabilistic protocol to sample a small (e.g., logarithmic) set of random block headers from a full node to limit the likelihood of an adversarial full node cheating in the longest-chain verification process, given the adversary's limited computational power in creating valid blocks. A data structure called a Merkle mountain range (MMR) can allow client devices to verify any interaction in a blockchain with a minimal amount of information. The Merkle mountain range can include a Merkle mountain range root that can be stored in the block headers. Further, embodiments can be implemented in current Bitcoin and/or Ethereum networks via a soft fork.

Reducing the number of block headers that a client device has to download from a full node is a security challenge. By downloading the entire chain of block headers, the client device can verify that the events proved by the full node are actually recorded on the longest chain. Without being required to send all block headers to the client device, a malicious prover can potentially take advantage of the client device's smaller computational power (relative to the combined computational power of honest nodes) to create and send only a small (but valid) number of fake blocks tricking the client device to accept a smaller fake chain.

A. Prior Work

Figure 3:
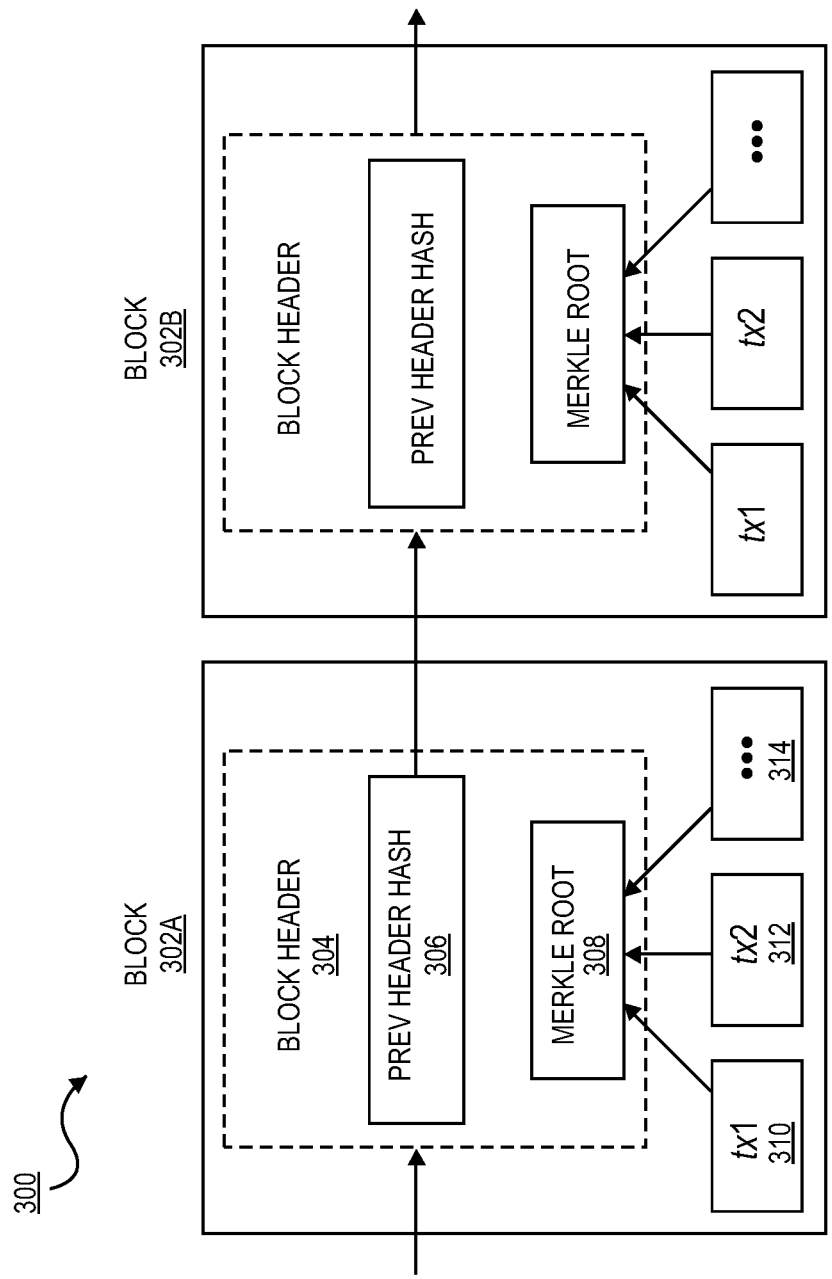
FIG. 3 shows an example blockchain format.

Current blockchain technologies, such as Bitcoin and Ethereum, maintain an append-only ledger in a network. The ledger includes a list of blocks of transaction data, the blocks are cryptographically chained together as depicted in FIG. 3. A block is created by a computationally intensive process called proof-of-work in which valid blocks need to demonstrate a sufficient "difficulty" (i.e., sufficient computation power to create on average). If there are more than one available chains of blocks, then network participants, i.e., nodes, need to download all blocks in all chains and follow the chain which has the highest total difficulty. This mechanism guarantees that, in the long run, the network will agree on a single and valid chain.

Nakamoto [Bitcoin Website. http://www.bitcoin.org/] proposes a simplified payment verification (SPV) protocol to verify Bitcoin transactions with minimal trust on some full nodes. Specifically, a client device downloads all block headers rather than the full blocks, which are much smaller in size. A block header contains a hash of a Merkle root that commits all transactions in the block. Therefore, after downloading all block headers in the blockchain, a client device can verify the existence of any transaction in any block, given that a prover provides a Merkle proof of size logs hashes to the client device, in which s is the number of transactions in the block.

FIG. 3 shows an example blockchain format. For example, the blockchain format shown in FIG. 3 can be used in Bitcoin. A blockchain 300 can comprise a plurality of blocks, for example, block 302A and block 302B. Each block can comprise a block header, e.g., block 302A comprises block header 304. The block header 304 can include multiple data elements, such as a previous header hash 306 and a Merkle root 308. The previous header hash 306 can be a hash of the previous block's header. The Merkle root 308 can be a root of a Merkle tree, which is a tree in which every leaf node is labelled with the hash of a data block, for example, data in a transaction 310-314. Each leaf of the Merkle tree can represent one of the transactions 310-314.

There are two additional solutions to SPVs proposed by Kiayias et. al., see [Kiayias et al, *Proofs of Proofs of Work with Sublinear Complexity*, pages 61-78. Springer Berlin Heidelberg, Berlin, Heidelberg, 2016] and [Kiayias et al, Non-interactive proofs of proof-of-work. 2017]. They propose an SPV protocol, called proofs of proof-of-work (PoPoW), which reduces the required resources of an SPV client to a logarithmic number of blocks. The protocol is based on the observation that a certain number of lucky blocks called superblocks are expected to exist in a proof-of-work (PoW) chain if it has been created honestly. A superblock is a rare block that has a PoW output value (i.e., the block ID) containing more leading zeros than the other valid blocks, and hence, can be used to show that enough work has been done when the chain containing that block was created. It can be shown that, by verifying the validity of a logarithmic number of superblocks, a client device can ensure the validity of the entire chain it receives from a full node with high probability. Inspired by a skip list data structure, PoPoW changes the blockchain structure in such a way that each block, instead of having one reference to the immediate previous block, stores multiple references to previous blocks including the superblocks.

However, PoPoW requires significant modifications to the blockchain structure which can limit its adoption in existing blockchains. Moreover, the practicality of the PoPoW approach is yet to be shown, as the constant factors in the protocol's overhead seems to be large. Each transaction inclusion proof in PoPoW is increased by m log(n)log(log (n)) in size to prove that the block that contains the transaction belongs to the correct chain, where m is a security parameter and where n is the number of blocks in the blockchain. Furthermore, PoPoW increases the size of each proof by a log n factor. In addition, PoPoW is interactive, meaning that the client device has to communicate over multiple sequential rounds with the client device to obtain a validity proof. This incurs a high latency and communication cost for both the client device and the full node.

In a later work, Kiayias et. al., see [Kiayias et al, Non-interactive proofs of proof-of-work. 2017], present an attack against PoPoW, where an adversary can double-spend bitcoins even if it controls a minority of the hashing power. They also propose a non-interactive proofs of proof-of-work (NIPoPoW) protocol that allows succinct (i.e., logarithmic-size) proofs but with the same proof complexity as in PoPoW.

However, the PoPoW and NIPoPoW protocols are vulnerable to a bribing attack, where an attacker offers an incentive to miners in the network who will be lucky and find superblocks, in exchange for not publishing their blocks to the network. The attacker then builds a fake chain containing the superblocks of the bribed miner's superblocks and uses it to pretend possession of the longest chain using a valid PoPoW proof. Such an attack is possible in any protocol that differentiates between mined blocks in a deterministic way, because the adversary knows in advance the type of blocks that it is willing to bribe. The adversary can advertise for the superblocks before the superblocks are mined and published to the network. To prove block inclusion, vector commitments can be employed as described in [Dario Catalano and Dario Fiore. 2013. Vector Commitments and Their Applications. In *Public-Key Cryptography—PKC* 2013, Kaoru Kurosawa and Goichiro Hanaoka (Eds.). Springer Berlin Heidelberg, Berlin, Heidelberg, 55-72].

B. Problem Definition

Consider a blockchain protocol that grows a chain based on the longest (i.e., most difficult) chain rule of PoW-mined blocks (see [Garay et al, The bitcoin backbone protocol: Analysis and applications. In *Annual International Conference on the Theory and Applications of Cryptographic Techniques*, pages 281-310. Springer, 2015]), where honest miners eventually agree on the chain that requires the largest combined mining power to be created. Also, consider an adversary that owns at most a one half fraction of the mining power (e.g., f<½) in the verification network. As shown in FIG. 1, an SPV protocol can be executed between a prover, a client device (i.e., a verifier), and a group of full nodes. The full nodes can claim to hold a valid copy of the blockchain. An adversarial full node may store a non-valid copy of the blockchain. The prover wants to convince the client device that a previously performed interaction is valid and has already been recorded on the blockchain. Embodiments allow the client device to verify the validity of the interaction with the help of the full nodes. Less than half of the full nodes may be controlled by the adversary, and thus collude with a malicious prover. An interaction is said to be valid if it is included in a correctly-mined block of interactions that belongs to the longest chain.

Embodiments can provide for the following security, client efficiency, and non-interactiveness properties. The security property means that the client device can accept an interaction if the interaction is valid (i.e., is an interaction included in a correctly-mined block that belongs to the longest chain with high probability). The client efficiency property means that the client can download and verify a small (e.g., sublinear) number of block headers from a full node, rather than download all block headers in the blockchain. The non-interactiveness property means that no subsequent interactions between the prover, the client, and the full nodes are needed.

To achieve the first property of security, the client device can participate in the process with the prover as well as the full nodes to obtain a proof, denoted by $\pi_{tx}$, that provides the following guarantees: 1) proof of inclusion: the interaction is included in some correctly-mined block B on a chain C; and 2) proof of chain: C is the longest (e.g., most difficult) chain agreed upon by a majority of the nodes in the verification network.

Given that the adversary that can control at most an f fraction of the mining power, the proof $\pi_{tx}$ can provide the following properties: 1) completeness: at the end of the process, the client device can determine that the interaction is valid and 2) soundness: the adversary cannot convince the client device that the interaction is valid.

C. Overview

Embodiments allow for a non-interactive SPV protocol for a client device. In embodiments, a client device can download and store a logarithmic number of blocks using a probabilistic verification method as well as using a structure called Merkle mountain range (MMR), see [Peter Todd. Merkle mountain range. https://github.com/opentimestamps/opentimestamps-server/blob/master/doc/merkle-mountain-range.md]. An MMR allows small inclusion proofs, while including an additive logarithmic factor in addition to the current inclusion proof in Bitcoin and Ethereum. Embodiments use an extra hash (i.e., the MMR root) in the block headers which can be added to existing blockchains (e.g., Bitcoin) via a soft-fork.

Consider a prover (i.e., a full node) that wants to convince a verifier (i.e., a client device) that an interaction tx is recorded properly in some block $B_x$ on a blockchain of length n, where $x \in [1, n]$. To achieve this, the prover can provide the client device with a proof of inclusion which consists of two cryptographic proofs. The proof of inclusion can include a proof of longest chain and a proof of interaction. The proof of longest chain can be that the block $B_x$ is located at height x of the correct (i.e., longest) chain. The proof of interaction can be that the interaction tx is recorded properly in the block $B_x$. The client device can verify that the interaction is included in a block as well as verify that the block is in the longest chain.

To commit to the entire chain of blocks, the prover can maintain a Merkle mountain range over all blocks added to the blockchain so far. In addition to being a Merkle tree, MMR allows for efficient appends at the prover side and efficient block inclusion verifications at the verifier side. At every block height i, the full node appends the hash of $B_{i-1}$ to the most recent MMR and records the new MMR root, denoted by $M_{i-1}$, in the header of $B_i$ (see FIG. 5). As a result, each MMR root stored at every block height can be seen as a commitment by the full node to the blockchain at that specific height.

An MMR tree can allow the client device to efficiently verify any blockchain event (i.e., an interaction) with the latest block header. MMR allows all previous blocks to be efficiently committed to the latest block header in a single hash. The original Merkle tree structure can be used to achieve the same goal, however, updating the Merkle trees with new block headers as the leaves is not efficient. The entire Merkle tree either needs to be restructured, which is inefficient, or the system can use an "unbalanced" tree which may yield a proof size of much larger than log n hashes. MMR is a variant of the original Merkle tree that allows a much more efficient update process, thus the overhead for full nodes when processing blocks becomes negligible. Further, introducing MMR into current blockchain protocols only needs a mild modification.

Given any two blockchains of the same length, one of which is maintained by an adversary with less than one half fraction (i.e., <½) of mining power, embodiments allow client devices to determine, with high probability, which chain is valid and longer by downloading a small (i.e., log n) number of block headers from each chain. In embodiments, this can be done using a novel probabilistic verification protocol in which O(log n) block headers are downloaded by the client device from each chain and verified. Here the concept of length is used to mean the number of blocks, for ease of explanation. Below the problem can be formulated to include the concept of total difficulty, to match with the actual implementation in Bitcoin and Ethereum.

Next, two phases will be discussed. The first phase can be prove, while the second phase is verify. The prove phase can be an interactive protocol performed between the prover and the verifier over O(log n) rounds to submit the proof of inclusion to the verifier for a given interaction tx. In some embodiments, the prove phase can be a non-interactive protocol to minimize latency, which is described in further detail herein. The verify phase can be executed locally by the verifier and does not require any interaction between the prover and the verifier.

To generate a proof of longest chain, the two parties (i.e., the full node and the verifier) can participate in m=O(log n) rounds of a probabilistic block sampling protocol. In each round j∈[1, m], the verifier can send a random number $r_j$ to the full node to request k random blocks from a certain part of the full node's header chain. In some embodiments, the k random blocks can be k=O(1), in other words, k can be a constant number of blocks sampled in each round. The k random blocks can be determined based on the random number $r_j$. For example, if the random number is equal to a value of 001002008010, then the full node can select the four block headers of blocks 1, 2, 8, and 10. As another example, the random number $r_j$ can be equal to a value of 3469. The full node can select the blocks 3, 4, 6, and 9 based on the random number $r_j$. The random number $r_j$ can be in any suitable format. In other embodiments, the full node can use the random value as an input to a function. The full node can then select a number of random block headers based on the output of the function.

If any of the k blocks are invalid, then the client device can abort the process and blacklist the full node. In some embodiments, the client device can verify that it received the correct block headers based on the random number $r_j$, for example, block headers 3, 4, 6, and 9 when the random number $r_j$ is 3469. Otherwise, the client device can proceed to the next round of requests. In round j, the full node can split its chain to $2^{j-1}$ equal-sized partitions. The full node can sample k headers from the last partition, i.e., from the header at height $$n - \frac{n}{2^{j-1}}$$

to the header at height n. For example, if it is the second round, j=2, and the current height of the blockchain is n=100, then the full node can partition the blockchain into $2^{2-1}$=2 partitions. The full node can sample k headers from the most recent partition, i.e., the second partition, ranging from the height $$100 - \frac{100}{2^{2-1}} = 50$$

to the header at height n=100.

The benefit of sampling random block headers from increasingly small partitions of the blockchain, allow the client device to determine that the full node is not controlled by an adversary. As the partitions decrease in size, the full node selects random block headers that are more recent. In this way, the client device, upon receiving the random block headers, can verify more recent block headers than old block headers, thus preventing adversaries from creating small falsified sidechains (e.g., at a forking point in the blockchain).

To verify each block header, the client device can receive an MMR proof from the full node and can then verify the proof using the latest MMR root, $M_{n-1}$, recorded in the header of the last block, $B_n$. To obtain the last proof (i.e., that the block has been included in the longest chain), the client device can verify an MMR proof which can be obtained from the last block header of the longest chain (which is already proved). To obtain a proof that the interaction was included in some block, the client device can verify the Merkle proof provided by the full node against the root of the interaction Merkle tree included the block header. This is described in further detail below.

The intuition behind the probabilistic verification protocol is that given any two blockchains of the same length, one of which is maintained by an adversary with f<½ fraction of the honest mining power, the probability that the adversary can mine the same number of blocks as the honest miners reduces exponentially as the valid chain grows. Thus, if the adversary has mined a certain number of valid blocks in any partition and both chains have equal lengths, the adversary must include a sufficient number of fake blocks to "lengthen" the malicious chain.

Additionally, in some embodiments, a Fiat-Shamir heuristic [Amos Fiat and Adi Shamir. How to prove yourself: Practical solutions to identification and signature problems. In *Conference on the Theory and Application of Cryptographic Techniques*, pages 186-194. Springer, 1986.] using the random oracle assumption can make the probabilistic verification protocol non-interactive. In the non-interactive protocol, the client device no longer sends a random number in every round for the sampling of k block headers, yet it is computationally intractable for the adversary to cheat the client device. The non-interactiveness makes the process more practical since (1) the full nodes can send the same proof to many client devices without any recalculation; and (2) the client device can forward the proof to other new client devices, which can safely verify the correctness of the proof. This reduces both the computation and bandwidth overheads for client devices and full nodes.

The valid chain is the chain that requires more work to find, e.g., the highest total block difficulty. The longest chain rule is a simplified way of determining which chain is valid. In what follows, for ease of explanation, it can be assumed that each block has the same difficulty. However, it is understood that, in some embodiments, each block can have a different difficulty.

D. System

FIG. 1 shows a system 100 comprising a number of components. The system 100 comprises a client device 102, a full node 104, and a prover 106. The client device 102 can be in operative communication with the full node 104 and the prover 106. In some embodiments, the client device 102 can be in operative communication with any suitable number of full nodes, for example, 1, 2, 10, or 100 full nodes. However, for simplicity of illustration, a certain number of components are shown in FIG. 1. It is understood, however, that embodiments may include more than one of each component.

The components in FIG. 1 may be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); Hyper-Text Transfer Protocol (HTTP); Secure Hypertext Transfer Protocol (HTTPS), Secure Socket Layer (SSL), ISO (e.g., ISO 8583) and/or the like.

The client device 102 can be a device capable of communicating with a verification network. In some embodiments, the client device 102 may be operated by a resource provider, and the client device 102 may be a verifier. The client device 102 may also be capable of receiving a verification request comprising an interaction identifier from a prover 106. The client device 102 can also determine a full node 104 that holds the longest blockchain, and can verify that the interaction identifier is in a valid block in the longest blockchain using information, such as an MMR root in the latest block header, from the full node. The client device 102 can also verify that an interaction associated with the interaction identifier is valid, and can transmit a verification response to the prover 106 regarding the validity of the interaction.

The client device 102 can then perform additional processing based on the interaction. Additional processing can include performing an action or operation as indicated in the interaction and/or transferring assets, physical and digital, between the verifier and the prover as outlined in the interaction. For example, the interaction can be a transaction between a resource provider and a customer. The interaction can indicate that the customer transferred assets, physical or digital, to the resource prover. Upon verifying the interaction, as described herein, the resource prover can provide a resource, as described in the interaction, to the customer.

Any computer or device that connects to the verification network can be referred to as a node. A node that can fully verify each block and interaction in the blockchain can be a full node. The full node 104 can store the full blockchain (i.e., each block and each interaction) in a memory, and can be capable of proving that it holds the longest blockchain. The full node 104 can also receive queries for a current height of the blockchain and subsequently determine and return the current height of the blockchain. In some embodiments, the full node 104 can be capable of partitioning the blockchain into a number of partitions and can select random block headers from a particular partition.

In some embodiments, the prover 106 can be a client device operated by a user. It could be, but need not be, a full node in some embodiments. The prover 106 may transmit a verification request regarding a previously performed interaction that was stored on the blockchain to the client device 102. As an example, the prover 106 can be a user or customer that wants to provide an interaction identifier associated with a valid interaction to a resource provider operating a client device 102 in order to prove that the interaction occurred and is valid.

Figure 2:
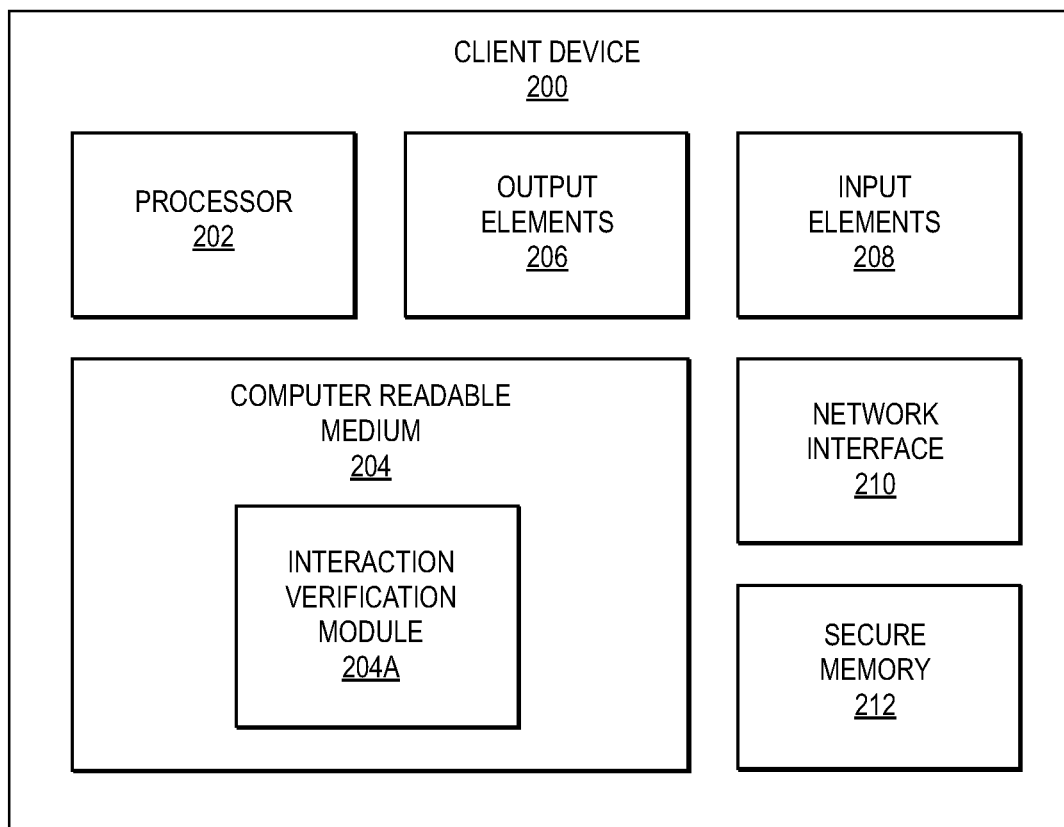
FIG. 2 shows a block diagram of a client device according to an embodiment.

FIG. 2 shows a block diagram of a client device 200 according to some embodiments. The exemplary client device 200 may comprise a processor 202. The processor 202 may be coupled to a non-transitory computer readable medium 204 comprising an interaction verification module 204A, one or more output elements 206, one or more input elements 208, a network interface 210, and a secure memory 212.

The computer readable medium 204 may comprise code, executable by the processor 202, to implement a method comprising: receiving, by a client device, a verification request comprising an interaction identifier; generating, by the client device, a random sampling of a number of block headers, wherein the random sampling is according to a random distribution that is generated based on a probability density function; prior to comparing, querying, by the client device, two or more full nodes for random samplings of block headers from the two or more full nodes; receiving, by the client device, the random samplings of block headers from the two or more full nodes; comparing, by the client device, samplings of block headers received from two or more full nodes, wherein the samplings of block headers are the random samplings of block headers; based on the comparing, verifying, by the client device, at least one block header of the samplings of block headers; and determining that a blockchain maintained by at least one of the two or more full nodes is valid in response to verifying the at least one block header of the samplings of block headers.

The interaction verification module 204A may comprise software code for verifying an interaction. It may comprise software code executable by the processor 202, to implement a method comprising: verifying a Merkle proof received from a prover; verifying a Merkle mountain range proof received from a prover; determining if an interaction identifier corresponds to a valid interaction based on verification of the Merkle proof and the Merkle mountain range proof; and transmitting a verification response indicating whether or not the interaction identifier corresponds to the valid interaction.

The one or more output elements 206 may comprise any suitable device(s) that may output data. Examples of output elements 206 may include display screens, speakers, and data transmission devices.

The one or more input elements 208 may include any suitable device(s) capable of inputting data into the client device 200. Examples of input devices include buttons, touchscreens, touch pads, microphones, etc.

The network interface 210 may include an interface that can allow the client device 200 to communicate with external computers. The network interface 210 may enable the client device 200 to communicate data to and from another device (e.g., resource provider computer, authorization computer, etc.). Some examples of the network interface 210 may include a modem, a physical network interface (such as an Ethernet card or other Network Interface Card (NIC)), a virtual network interface, a communications port, a Personal Computer Memory Card International Association (PCM-CIA) slot and card, or the like. The wireless protocols enabled by the network interface 210 may include Wi-Fi™.

The secure memory 212 may store encrypted access data, key identifiers, public keys, and any other relevant data securely. The secure memory 212 may be in the form of a secure element, a hardware security module, or any other suitable form of secure data storage. In some embodiments, the client device 200 can store information regarding a genesis block (i.e., the first block in a blockchain).

E. Threat Model

An adversary may be present in the verification network according to embodiments. The adversary may be an adaptive (or rushing) adversary. As such, the adversary can choose which full nodes in a verification network to corrupt and which blocks to falsify in the blockchain. The mining power of the adversary can be bounded by a known fraction, e.g., $f(0<f<\frac{1}{2})$.

In some embodiments, it can be assumed that the client device is connected to at least one full node which has the correct view of the blockchain. This assumption is equivalent to assuming that the client device is not vulnerable to eclipse attacks. In some embodiments, it can be assumed that the adversary cannot drop or tamper with messages transmitted between the client device and full nodes. The client device is not assumed to know any state in the chain, except the genesis block (i.e., the first block).

II. Merkle Mountain Range

A data structure called a Merkle mountain range (MMR) can be leveraged to allow a client device to verify any previous interaction using the latest block header. Merkle trees and Merkle mountain ranges will be discussed next.

The need to download all block headers in prior work is, in part, due to the verifications of interactions or events in all previous blocks. After the longest chain has been verified and accepted, with a few block headers downloaded, verification of an interaction in some previous block may include verifying that the block actually belongs to the longest chain. The naive approach is to download all intermediate block headers from the block containing the interaction to the latest block, which inherently requires downloading a linear number of block headers from the chain. However, embodiments improve upon this by allowing for the verification of any interaction (i.e., obtain a proof $\pi_{rec(tx)}$) in the blockchain using the latest block header of the latest block in the blockchain.

In a first solution to achieving this, a global Merkle tree can be built on all interactions in the blockchain, i.e., every interaction is included in the global Merkle tree. The global Merkle tree can be updated after every new block is added to the blockchain. However, such a solution requires miners to maintain all interactions on the blockchain, which the miners often do not do for performance reasons. This block verification also requires full nodes to obtain all interactions and for the full nodes to reconstruct the Merkle tree from scratch to keep the tree balanced.

A Merkle tree can be a balanced binary tree where the leaves of the tree hold some value, and each non-leaf node stores a hash of a concatenation of the values of both children. In Bitcoin and Ethereum, Merkle trees are used to store transaction hashes of a particular block as the leaves, so the root of the tree is a commitment of all interactions in that block. The root is then stored in the header of the block. An SPV proof of an interaction is then the Merkle proof that the hash of the interaction is a leaf in the Merkle tree. Merkle trees and the security of a Merkle proof is discussed as this will extend to a Merkle mountain range. An MMR allows all previous blocks to be efficiently committed to the latest block header in a single hash. MMR is a variant of the original Merkle tree that allows for a more efficient update process, thus the overhead for full nodes when processing blocks becomes negligible. Further, introducing MMR only requires a mild modification to the current Bitcoin and Ethereum protocol.

A Merkle tree can be defined as a balanced binary tree where the leaves have some value, and each non-leaf node holds the value H(left child∥right child), where H is a collision-resistant hash function. A balanced binary tree means a tree with n leaves has a depth of $O(\log_2 n)$.

Given a Merkle tree MT, with a root r, a Merkle proof that k is a node in the Merkle tree MT can be $\Pi_{k \in MT}$. The Merkle proof $\Pi_{k \in MT}$ is a path from the root r to the node k and the siblings of each node in the path. Since the Merkle tree MT has a depth of O(log n), the proof has size O(log n).

A prover verifier model, is defined below, where a verifier knows the root of a Merkle tree and the prover wants to prove to the verifier that a particular node exists in the tree. First, the verifier has access to a root r of some Merkle tree MT. The prover has access to the Merkle tree MT and can send a Merkle proof path of some $k \in MT = \Pi_{k \in MT}$ to the verifier. The verifier can check that the root r is the first value in the proof (i.e., that the verifier was given a proof for the Merkle tree MT), and that the hash of the two nodes at each level in the path (i.e., the hash of a node in the path with the node's sibling node) equals the value of one of the nodes of the previous level. If the Merkle proof is verified to be valid, the verifier can accept the proof, otherwise the verifier can reject the proof.

Let $p'_i$ be a node in a path at level i and $s'_i$ be its sibling, and let $p_i$ and $s_i$ be the true nodes in the path in in the Merkle tree MT where $x=p_i\|s_i$ or $x=s_i\|p_i$ such that $H(x)=p_{i-1}$. In order for the verifier to accept the Merkle proof $\Pi_{k \in MT}$, x' must equal $p'_i\|s'_i$ or $s'_i\|p'_i$ such that $p_{i-1}=H(x')$. Since the sets $\{p_i, s_i\}$ and $\{p_i, s_i\}$ differ by at least one value as stated above, $x \neq x'$, therefore the adversary found a collision of $H(\perp)$.

A more efficient solution leverages the recently introduced data structure called a Merkle mountain range (MMR), see [Peter Todd. Merkle mountain range. https://github.com/opentimestamps/opentimestamps-server/blob/master/doc/merkle-mountain-range.md], to commit to all previous block headers in the latest block. Having this commitment allows a client device to efficiently verify if a previous block belongs to the longest chain based on the latest block header of the blockchain. Thus, the full node can prove that an interaction was included in the longest chain by providing an MMR proof (to prove that a block belongs to the longest chain), in addition to the current Merkle proof (which shows that the interaction is included in the block). Next, an explanation of how MMR works and why it is better than a standard Merkle tree will be discussed.

MMR is a variant of a Merkle tree that allows for efficient appending of new data entries. MMR allows for the tree to be reasonably balanced even when new data entries are appended dynamically without rebuilding the entire tree from scratch. Specifically, MMR appends a new data entry by modifying a few nodes of the existing tree and still bounds the Merkle proof's length for any data entry sitting on a leaf by log n, wherein n is the number of leaves in the tree.

A Merkle mountain range M, can be defined as a binary hash tree with n leaves, a root r, and the following properties: 1) M is a hash tree; 2) M has depth $\lceil \log_2 n \rceil$; and 3) if n>1, let $n=2^i+j$ for the maximum integer i such that $2^i<n$, wherein r.left is an MMR with $2^i$ leaves and wherein r.right is an MMR with j leaves. The Merkle mountain range M is a balanced binary hash tree, i.e., M is a Merkle tree. Therefore, for all nodes $k \in M$, $\exists \Pi_{k \in MT}$.

Appending new nodes to an MMR will now be discussed. Protocol 1, below, shows an example AppendLeaf(r, x) function that can append a new data entry (i.e., x) to an existing MMR (i.e., r). Protocol 1—AppendLeaf(MMR root r, new leaf node x):

```
1: if r.children == a power of 2 then
2:    root = Node
3:    return root
4: else
5:    r.right = AppendLeaf (r.right,x)
6:    r.value = H(r.left||r.right)
7:    r.children + +
8:    return r
9: end if
```

Figure 4:
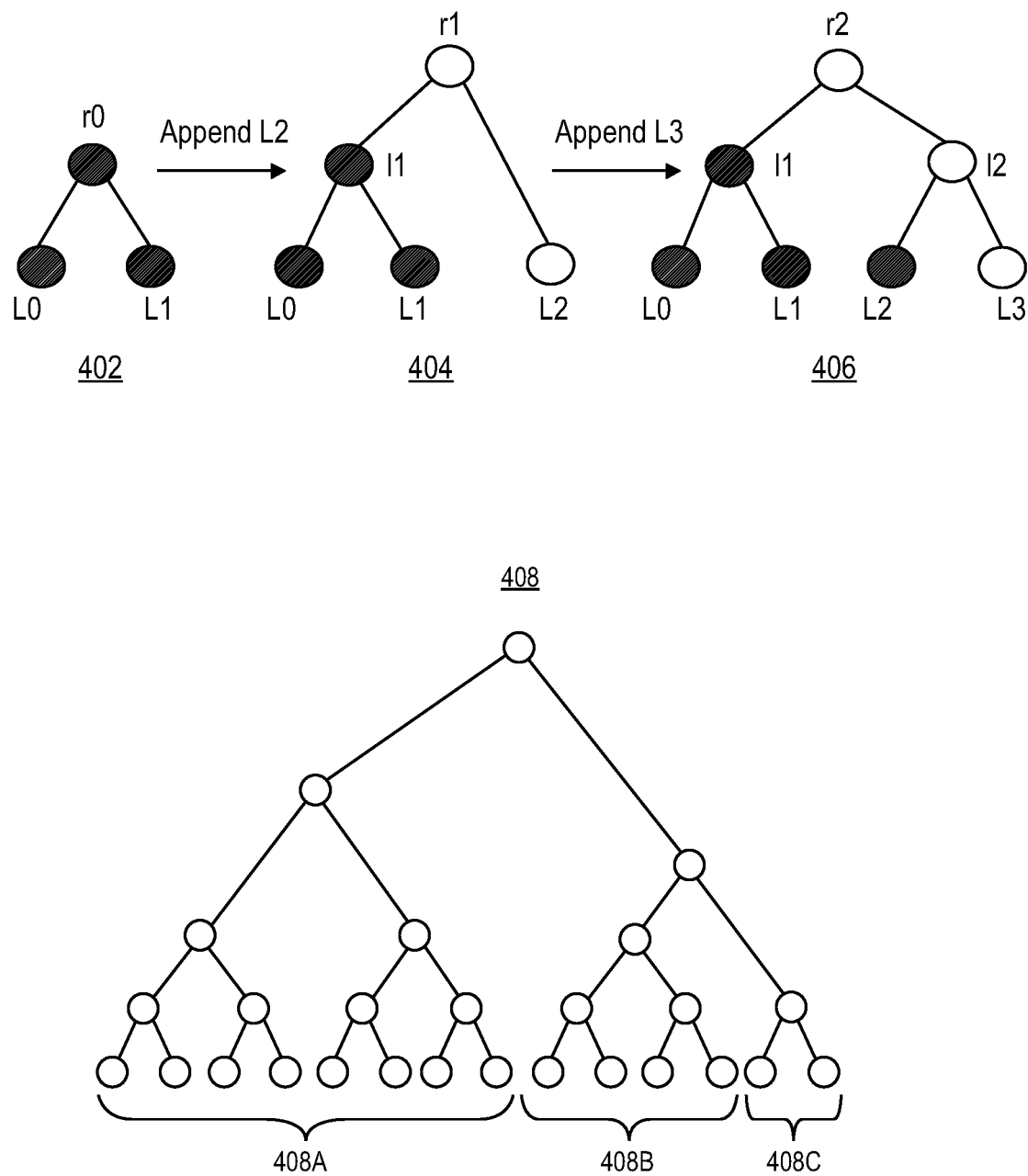
FIG. 4 shows an example of updating a Merkle mountain range when new data entries are appended as new leaves of the Merkle mountain range according to embodiments.

FIG. 4 shows an example of updating a MMR tree when new data entries are appended as new leaves of the tree. FIG. 4 includes a first Merkle mountain range 402, a second Merkle mountain range 404, and a third Merkle mountain range 406. The white nodes can be either new nodes or nodes that are changed due to a new data entry, such as a new block header being appended as described herein. The black nodes can be nodes that are not changed. MMR guarantees that for every update, log n nodes are either created or modified.

The first Merkle mountain range 402 includes a first Merkle mountain range root r0, a first block header L0, and a second block header L1. The first block header L0 and the second block header L1 can be hashed together to determine the first Merkle mountain range root r0.

A third block header L2, corresponding to a new, third block that is added to the blockchain, can be appended to the Merkle mountain range. Specifically, the third block header L2 is appended to the first Merkle mountain range 402 resulting in the second Merkle mountain range 404. The second Merkle mountain range 404 can include the first block header L0, the second block header L1, and the third block header L2. The first block header L0 and the second block header L1 are not altered when appending the third block header L2. Due to this, the hash of the first block header L0 and the second block header L1 is the same in the first Merkle mountain range 402 and the second Merkle mountain range 404. The first block header L0 and the second block header L1 can be hashed together, resulting in an intermediate value (that can be equivalent to the first Merkle mountain range root r0). The intermediate value and the third block header L2 can be hashed together, resulting in the second Merkle mountain range root r1.

A fourth block header L3, corresponding to a new, fourth block that is added to the blockchain, can be appended to the Merkle mountain range. Specifically, the fourth block header L3 can be appended to the second Merkle mountain range 404, resulting in the third Merkle mountain range 406. The third Merkle mountain range 406 can include the first block header L0, the second block header L1, the third block header L2, and the fourth block header L3. The first block header L0, the second block header L1, and the third block header L2 are not altered when appending the fourth block header L3. Due to this, the hash of the first block header L0 and the second block header L1 is the same in the first Merkle mountain range 402, the second Merkle mountain range 404, and the third Merkle mountain range 406. The first block header L0 and the second block header L1 can be hashed together, resulting in a first intermediate value (that can be equivalent to the first Merkle mountain range root r0). Similarly, the third block header L2 and the fourth block header L3 can be hashed together, resulting in a second intermediate value. The first intermediate value and the second intermediate value can be hashed together, resulting in the third Merkle mountain range root r2. Any suitable number of block headers can be appended to the Merkle mountain range in this manner.

FIG. 4 also includes a larger Merkle mountain range 408. The larger Merkle mountain range 408 can be created as new block headers are appended to the third Merkle mountain range 406. The larger Merkle mountain range 408 can be viewed as comprising three smaller Merkle mountain ranges 408A, 408B, and 408C. As an example, the next block header that is appended to the larger Merkle mountain range 408 can be appended to the smaller Merkle mountain range 408C. The three nodes in 408C can be appended similar to how the first third block header L2 is appended to the first Merkle mountain range 402 resulting in the second Merkle mountain range 404.

A set of MMRs can be defined as $M=\{M_1, M_2, \ldots, M_n\}$ created from some list $[x_1, x_2, \ldots, x_n]$, where $M_1$ is a single node with value $x_1$ and $r_i$ is the root node of an i leaf MMR, $M_i=\text{AppendLeaf}(r_{i-1}, x_i)$. A feature of the way MMRs are constructed is that, assuming all $x_i$'s are unique, each $M_i$ has a unique root (otherwise there would be a hash collision), and given the Merkle proof that some $x_k$ is in $M_n$ for k≤n, $\Pi_{x_k \in M_n}$, a verifier can regenerate $r_k$ and that $M_k$ is an ancestor of $M_n$ (i.e., $M_n$ was created from n−k appends to $M_k$).

Unlike classical Merkle trees, MMR's additionally give the ability to prove that an MMR is the previous version of another MMR with a short proof. That is, given the k-th MMR and the nth MMR, a prover can give a proof of size O(log(n)) that convinces a verifier of this fact while the verifier's state is k, n and the root of the k-th and n-th MMRs.

A new block header, according to embodiments, can contain a data field for an MMR root, or the root of the MMR tree that commits the headers of all previous blocks. A full node, upon receiving a new block, can conduct one additional check on the validity of the MMR root. This entails a negligible overhead on the full node.

Figure 5:
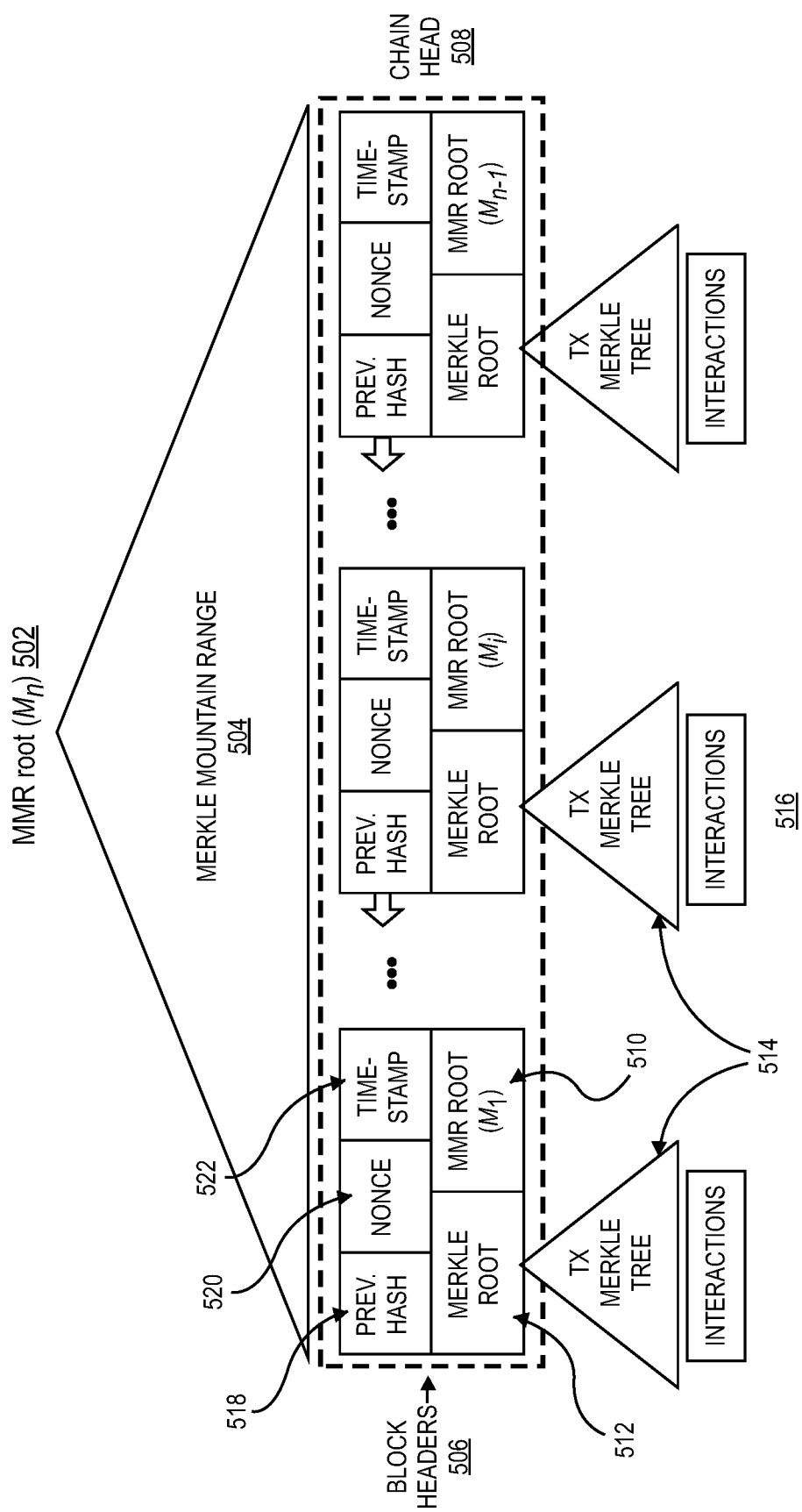
FIG. 5 shows a blockchain structure according to embodiments.

FIG. 5 shows a blockchain structure according to embodiments. An MMR root $M_n$ 502 can represent the latest MMR root that is included in the latest block header (not shown) at the chain head 508. A Merkle mountain range 504 can comprise a number of leaves. Each leaf of the Merkle mountain range 504 can be a block header 506. In FIG. 5, the Merkle mountain range 504 includes three block headers, however, it is understood that the Merkle mountain range 504 can include any suitable number of block headers 506, such as 5 block headers, 10 block headers, 100 block headers, 1,000 block headers, or 100,000 block headers.

The block headers 506 include a plurality of block headers associated with a plurality of blocks. Each of the block headers 506 can comprise a MMR root 510, a Merkle root 512, a previous hash 518, a nonce 520, and a timestamp 522. The chain head 508 can be the block header 506 that is associated with the latest block. The block header at the chain head 508 can be the latest block header (not shown). The nonce 520 can be used to calculate if the previous hash 518 contains a string of leading zeros such that it is lower than a difficulty value. The Merkle root 512, the nonce 520, the previous hash 518, and the timestamp 522 can be inputs to a hash function. In some embodiments, the MMR root 510 can also be an input to the hash function. The output of the hash function is valid if the output is less than or equal to a difficulty value. If the resulting previous hash 518 is lower than the difficulty value, then the block is a valid block. The timestamp 522 can be a sequence of characters or encoded information identifying when a certain even occurred, such as when a block is created and added to the blockchain.

The MMR root 510 can be an MMR root of the MMR that commits the block headers of all of the previous blocks. For example, the MMR root at the chain head 508 (i.e., M) can be the MMR root of the MMR that commits the first block header, the second block header, and the third block header. The Merkle root 512 can be a root of a Merkle tree 514 which is a tree, as described herein, in which every leaf node is labelled with the hash of an interaction 516. Each leaf of the Merkle tree can represent an interaction 516. The interaction 516 can be associated with an interaction identifier. The interaction 516 can be any suitable interaction. For example, a suitable interaction can be a transaction, an agreement, a communication, or any other suitable interaction as described herein. As an example, the interaction 516 can be a transaction that can include information such as the parties involved, a list of transaction inputs, a list of transaction outputs, a fee, a timestamp, a transaction identifier, and/or the like. As another example, an interaction can be an agreement that can include information such as the parties involved, details of the agreement (e.g., text), a digital signature of each party involved, a timestamp, a fee, and/or the like.

III. Probabilistic Verification of Non-Malicious Full Node

In order to reduce the number of block headers that client devices need to download, embodiments can employ a probabilistic verification mechanism by which a client device can randomly sample a logarithmic number of block headers. If these block headers are valid, then the block B belongs to the longest chain with high probability. The client device can determine which block headers to sample to prevent the adversary from sampling fake blocks. The probabilistic verification allows for the client device to detect at least one fake block with high probability, if there is a known fraction $f_b$ of blocks are fake, after randomly sampling enough number of blocks.

A. Naive Approach

If the longer chain was created by a cheating prover and the cheating prover was able to pass an initial fact check, such as verifying a predetermined number of the most recent blocks, then the client device can conclude that the latest possible forking point was on or before height $$\frac{L}{c},$$

wherein L is the predetermined number of the most recent blocks and c is the malicious full node's fraction of the total mining power. Given that $f_b$ is established, probabilistic verification can be conducted to detect at least one fake block in an invalid chain with high probability. Specifically, by randomly sampling K blocks from the invalid chain, the probability that all sampled blocks are valid blocks is $(1-f_b)^K$. Hence, the probability that at least one invalid block is sampled is:

$$1-(1-f_b)^K$$

This probability approaches 1 quickly as K grows. Note that a client device can check if a sampled block belongs to the committed chain (i.e., on the same chain with the L blocks in the initial fact check step) based on the MMR commitment in the last block.

To evaluate the performance of the naive approach, the client device can minimize the sum L+K, i.e., the total number of blocks to download. $O(\sqrt{n})$ is the minimum value of L+K that still gives the client device a high probability guarantee. For example, given the Ethereum blockchain with 4,000,000 blocks, one needs to download 18,000 block headers and their proofs to verify if they are on the correct chain. Given that each block header is of size 500 bytes and its proof is of size 7,000 bytes (log n SHA2 hashes), the total data required to download is still significant (i.e., 120 MB) to client devices.

B. Approach

Although the naive approach significantly reduces the number of block headers to download, it still requires a large number of block headers. A goal is to reduce the number of block headers download by the client device to a much smaller value, for example O(log n) block headers. It can now be shown that this is possible by recursively sampling more and more block headers, by a client device, from different intervals of the blockchain maintained by a full node. The goal is to ensure that in each interval of the chain a cheating prover (i.e., a malicious full node) would have to at least create a fraction of the blocks. However, if this fraction is larger than the fraction of the mining power the malicious full node controls then producing these blocks will take longer than the honest network will take to create the blocks. This ensures that the honest network creates the blocks before the malicious full node If the longest chain was created by a malicious full node and the malicious full node was able to pass the initial fact check, then the client device can determine that the latest possible forking point was on or before height $$\frac{L}{c}.$$

The malicious full node will be unable to include any honest chain's blocks in its own blockchain (other than the genesis block). This can be done by iteratively pushing back the latest block the malicious full node could have forked off of.

In some embodiments, the method defines a fraction k such that k>c. The verifier can sample random blocks out of the first $$\frac{L}{c}$$

blocks to ensure that either a cheating prover will be caught or that the cheating prover had to create at least a fraction of k them honestly. The verifier can sample a constant number of blocks. Concretely, to ensure that with probability $1-2^{-\lambda}$ at least a k fraction of the blocks were created, the prover can sample $\lceil -\log_k(2) \cdot \lambda \rceil$ random blocks. For each block, the verifier verifies that the block's MMR is correctly included in the header's MMR and that the proof of work meets the difficulty value, as described herein.

Assuming that the malicious node created a k fraction of the first $$\frac{L}{c}$$

blocks but had a c fraction of the mining power it can be determined that that it took the malicious full node $$\frac{L \cdot k}{c^2} > \frac{L}{c}$$

honest chain block intervals to do this. This, however, implies that the latest possible forking point from the honest chain was at $$H - \frac{L \cdot k}{c^2}.$$

This process can be repeated m times to ensure that the forking point was before $$H - \frac{L}{c} \cdot \frac{k^m}{c}$$

until it can be ensured that the forking point had to be before the genesis block. This is a contradiction as the genesis block is committed to in the header's MMR and also because the main chain only exists from the genesis block on. Thus, it is not possible for the malicious node to create blocks that occur before the genesis block. Note that this will take $$\log_{\frac{k}{c}}\left(\frac{H \cdot c}{L}\right) = \frac{\log_2\left(\frac{H \cdot c}{L}\right)}{\log_2\left(\frac{k}{c}\right)} = O(\log(H))$$

iterations. In each iteration, a constant number of MMR proof verifications can be performed as well as a constant number of difficulty checks. Since the MMR proof verifications are $O(\log(H))$ in size the asymptotic communication complexity of the protocol is $O(\log(H)^2)$.

Next, the source of randomness will be discussed. Since the probabilistic verification uses randomness for sampling, one solution is for the client device to send the randomness to the full node. The full node can then use the randomness to sample K blocks and send them back to the client device. This prevents the full node from biasing the sampled blocks and avoiding the detection of invalid blocks. However, this mechanism requires interaction between the client device and the full node. Further, the client device and the full node cannot forward the proof to other client devices as the client device and the full node cannot prove that the randomness is actually random. The mechanism to make embodiments non-interactive, i.e., removing the randomness exchange step between the client device and the full node, will be discussed in further detail below.

1. Probabilistic Sampling

Recall that in the probabilistic sampling model the verifier requests the MMR proof for k random block headers in the blockchain from a full node. The full node can successively partition the blockchain in half and queries another random k block headers from the partition that includes the latest block header. The verifier does this until the size of the partition is at most k (i.e., queries all of the last k blocks). The adversary's computing power is less than the honest network's computing power therefore in order to fool the verifier that the malicious full node has a blockchain equal length to an honest full node's blockchain, the malicious full node must insert bad blocks into their chain, i.e., blocks without proper proofs work.

2. Method

Figure 6:
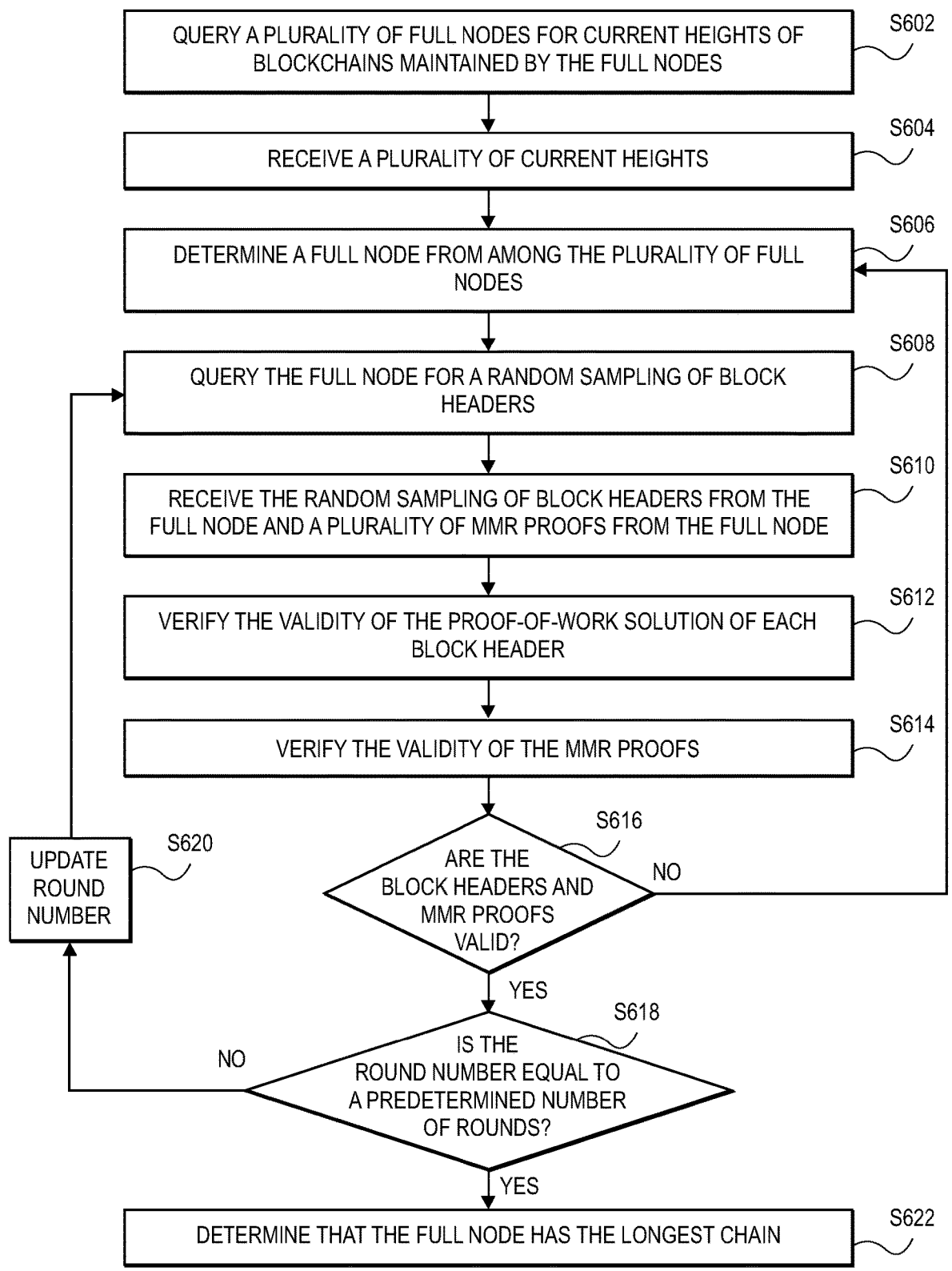
FIG. 6 shows a flowchart of a longest chain verification method.

FIG. 6 shows a flowchart of a longest chain verification method. The method illustrated in FIG. 6 will be described in the context of a client device determining a full node, that maintains the longest blockchain, out of a plurality of full nodes.

Before step S602, the client device can receive a verification request from a prover, such as a full node or another client device. The verification request can comprise an interaction identifier and, in some embodiments, a Merkle proof associated with the interaction identifier. The interaction identifier can be a unique identifier for an interaction. The interaction identifier (ID) can be, for example, a string of alphanumeric characters, a randomly assigned number, a sequentially assigned number, values corresponding to an interaction, a combination thereof, and/or the like. The Merkle proof can include a path from a Merkle root of a Merkle tree of interactions to a node associated with the interaction identifier as well as siblings of each node in the path, as described herein. In some embodiments, the verification request can further comprise a Merkle mountain range proof including a path from a Merkle mountain range root to a leaf node associated with a block header containing the Merkle tree as well as siblings of each node in the path, as described herein.

Figure 10:
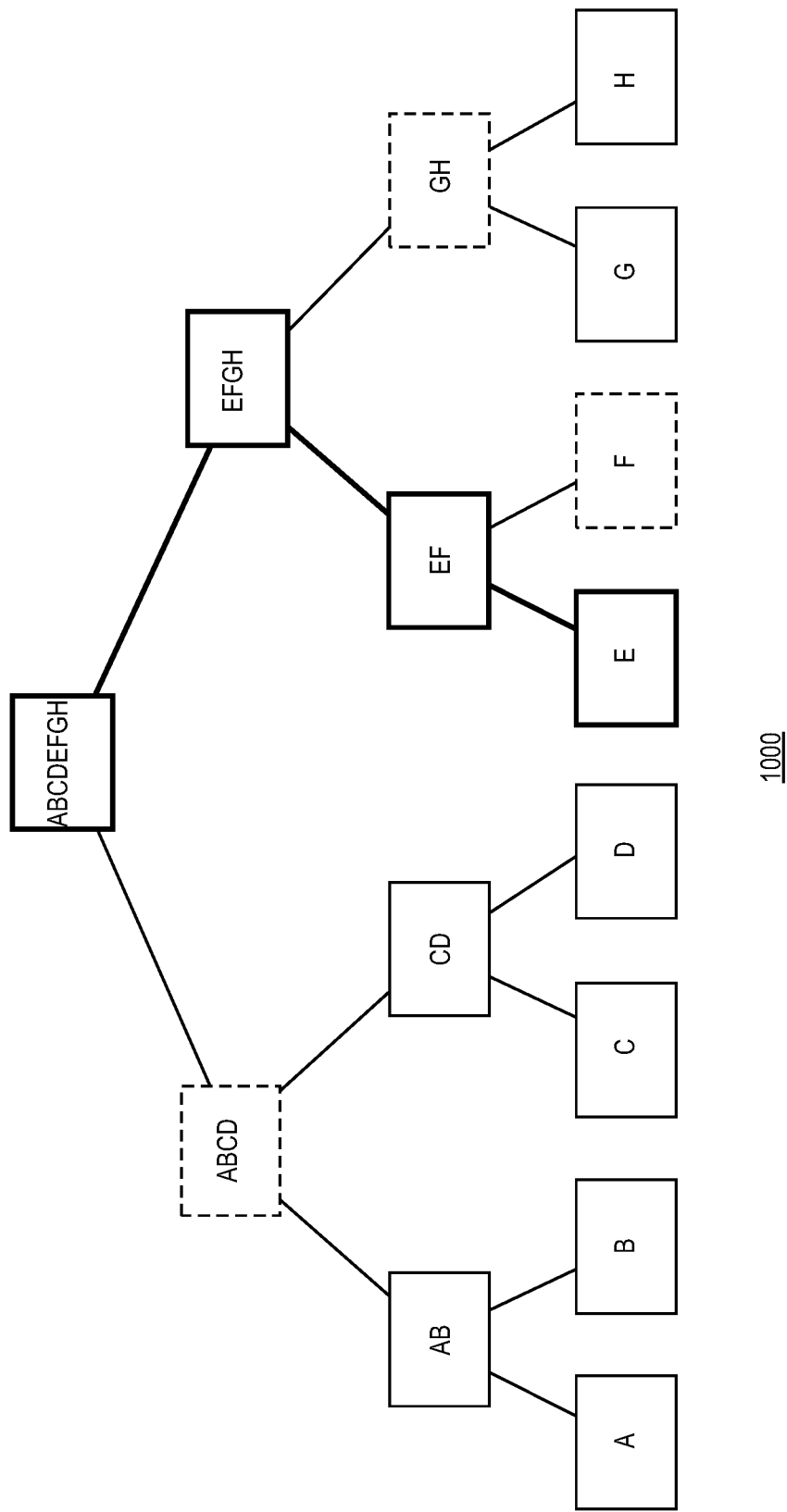
FIG. 10 shows a Merkle tree according to embodiments.

A Merkle tree 1000 is shown in FIG. 10. The Merkle tree 1000 can comprise a number of leaf nodes such as A, B, C, D, E, F, G, and H. A Merkle proof for an interaction identifier associated with the leaf node E can include a path from the Merkle root ABCDEFG to the leaf node E including the nodes ABCDEFG, EFGH, EF, and E (shown in as the bolded nodes and connection lines in FIG. 10). The Merkle proof can also include the sibling nodes of the nodes in the path. In this example, the sibling nodes include the nodes ABCD, GH, and F (indicated in FIG. 10 by dashed lines).

After receiving the verification request from a prover, the client device can determine a full node that has the longest chain on the blockchain. To determine which full node of a plurality of full nodes has the longest chain, the client device can perform the following steps.

At step S602, the client device can query the plurality of full nodes for current heights of the blockchains maintained by the full nodes. The client device can request the current height of the blockchain n from any suitable number of full nodes in the verification network. The current height of the blockchain n can be the current number of blocks in the blockchain (e.g., 100 blocks, 500 blocks, 1000 blocks, 10,000 blocks, or any other suitable number of blocks). A height of a blockchain can also be referred to as the length of the blockchain. In some embodiments, the client device may query every full node in communication range of the client device. In other embodiments, the client device can query a predetermined number of full nodes, for example, 10 full nodes, 100 full nodes, 500 full nodes, 1000 full nodes, or any suitable number of full nodes. The current height of the blockchain n may be different at each full node. A malicious full node can arbitrarily choose the current height of the blockchain n.

At step S604, after querying the plurality of full nodes for the current height of the blockchain n, the client device can receive a plurality of current heights of the blockchain from the full nodes.

At step S606, the client device can determine a full node from among the plurality of full nodes. The client device can determine which full node reported the correct current height of the blockchain n. In some embodiments, more than one full node may have reported the correct current height of the blockchain n. To determine the correct current height of the blockchain n, the client device can determine a most frequent height of the plurality of current heights. For example, the client device can receive 10 values for the current height of the blockchain n from ten different full nodes, 7 of which can be equal to a height of n=100, 1 of which can be equal to a height of n=95, and 2 of which can be equal to a height of n=101. The client device can determine the most frequent height to be n=100. After determining the most frequent height, the client device can select a full node of the plurality of full nodes that reported the current height comparable to the most frequent height, i.e., a full node with a current height of n=100.

At step S608, after determining the full node, the client device can query the full node for a random sampling of block headers. The query can include a random number $r_j$ and a round number. The random number $r_j$ can be any suitable random number. The round number can correspond to the number of times the client device has requested the random sampling of block headers from the full node. The round number can be any suitable integer. For example, the round number can be 1 for the first time that the client device transmits a request to the full node. The full node can determine the random sampling of block headers, as described herein, and transmit the random sampling of block headers to the client device. In some embodiments, after the full node receives the query for the random sampling of block headers, the full node can partition the blockchain maintained by the full node into an equally sized number of partitions based on the round number. The full node can then select the random sampling of block headers from a most recent partition based on the random number, and then transmit the random sampling of block headers to the client device. The partitioning of the blockchain is described in further detail below.

At step S610, the client device can receive the random sampling of block headers from the full node. In some embodiments, the client device can receive a plurality of Merkle mountain range proofs from the full node. The random sampling of block headers can be determined by the full node as described herein. Each MMR proof of the plurality of MMR proofs can be include a path from a Merkle mountain range root to a node in the MMR associated with one of the block headers of the random sampling of block headers, as well as include a sibling node of each node in the path.

For example, in reference to the third Merkle mountain range 406 of FIG. 4, the client device can receive a block header of a fourth block in the blockchain (i.e., the fourth block header L3) as a part of the random sampling of block headers. The client device can also receive an MMR proof for the fourth block header L3 that includes a path from the MMR root r2 to the fourth block header L3. The path can include each of the white nodes in the third Merkle mountain range 406 of FIG. 4; this includes the MMR root r2, I2 (i.e., the hash of the third block header L2 and the fourth block header L3), as well as the fourth block header L3. The MMR proof also includes the sibling node to each node in the path. The MMR root r2 does not have a sibling node, as it is the root of the third Merkle mountain range 406. The sibling node of I2 (i.e., the hash of the third block header L2 and the fourth block header L3 is I1 (i.e., the hash of the first block header L0 and the second block header L1. The sibling node of the fourth block header L3 is the third block header L2. In the example of the third Merkle mountain range 406 in FIG. 4, the client device receives each node in the third Merkle mountain range 406 except the two nodes of the first block header L0 and the second block header L1.

At step S612, after receiving the random sampling of block headers from the full node, the client device can verify the block headers. In some embodiments, the client device can verify the block headers by verifying the validity of the previous hash value and the nonce (e.g., the PoW solution) of each block header, as described herein. The nonce can be used to calculate if the previous hash contains a string of leading zeros such that it is lower than a difficulty value. If the resulting previous hash is lower than the difficulty value, then the client device can determine that the block header is a valid block header. The Merkle root, the nonce, the previous hash, and the timestamp included in the block header can be inputs to a hash function. In some embodiments, the MMR root can also be an input to the hash function. The output of the hash function is valid if the output is less than or equal to a difficulty value.

At step S614, after verifying the validity of the PoW of each block header of the random sampling of block headers, the client device can verify the validity of the MMR proof for each block header. The client device can verify that each node in the path with two child nodes is equal to the hash of that node's two child nodes. For example, the client device can verify that the node I2 is equal to the hash of both the third block header L2 and the fourth block header L3. The client device can also verify that the MMR root r2 is equal to the hash of I1 and I2. In this way, the client device verifies that each block header of the random sampling of block headers is in the blockchain at the full node. The client device can also verify that the start of the path in the MMR proof is the MMR root in the latest block header.

At step S616, the client device can determine if all of the block headers of the plurality of random block headers and the plurality of Merkle mountain range proofs are valid. If any one of the block headers or the Merkle mountain range proofs is not valid, then the client device can perform steps S606 to S616 again with a different full node, for example, with a second full node. In some embodiments, the client device can add the full node to a stored list of malicious full nodes, for example by adding an IP address, or other full node identifier, of the malicious full node to a list. The client device can determine not to communicate with full nodes that are in the list of malicious full nodes.

If the block headers and the Merkle mountain range proofs are valid, then the client device can proceed to step S618. At step S618, the client device can determine if the round number is equal to a predetermined number of rounds. The predetermined number of rounds can be any suitable integer. In some embodiments, the predetermined number of rounds can be log n rounds, as described herein, wherein n is the current height of the blockchain. If the round number is less than the predetermined number of rounds, the client device can proceed to step S620. If the round number is equal to the predetermined number of rounds, the client device can proceed to step S622.

At step S620, the client device can update the round number. For example, if the round number is equal to 1, then the client device can update the round number to be equal to 2. The client device can then perform steps S608 to S618 again.

At step S622, after determining that the round number is equal to the predetermined number of rounds, the client device can determine that the full node has the longest chain, as the client device has verified block headers during each round with the full node.

Figure 7:
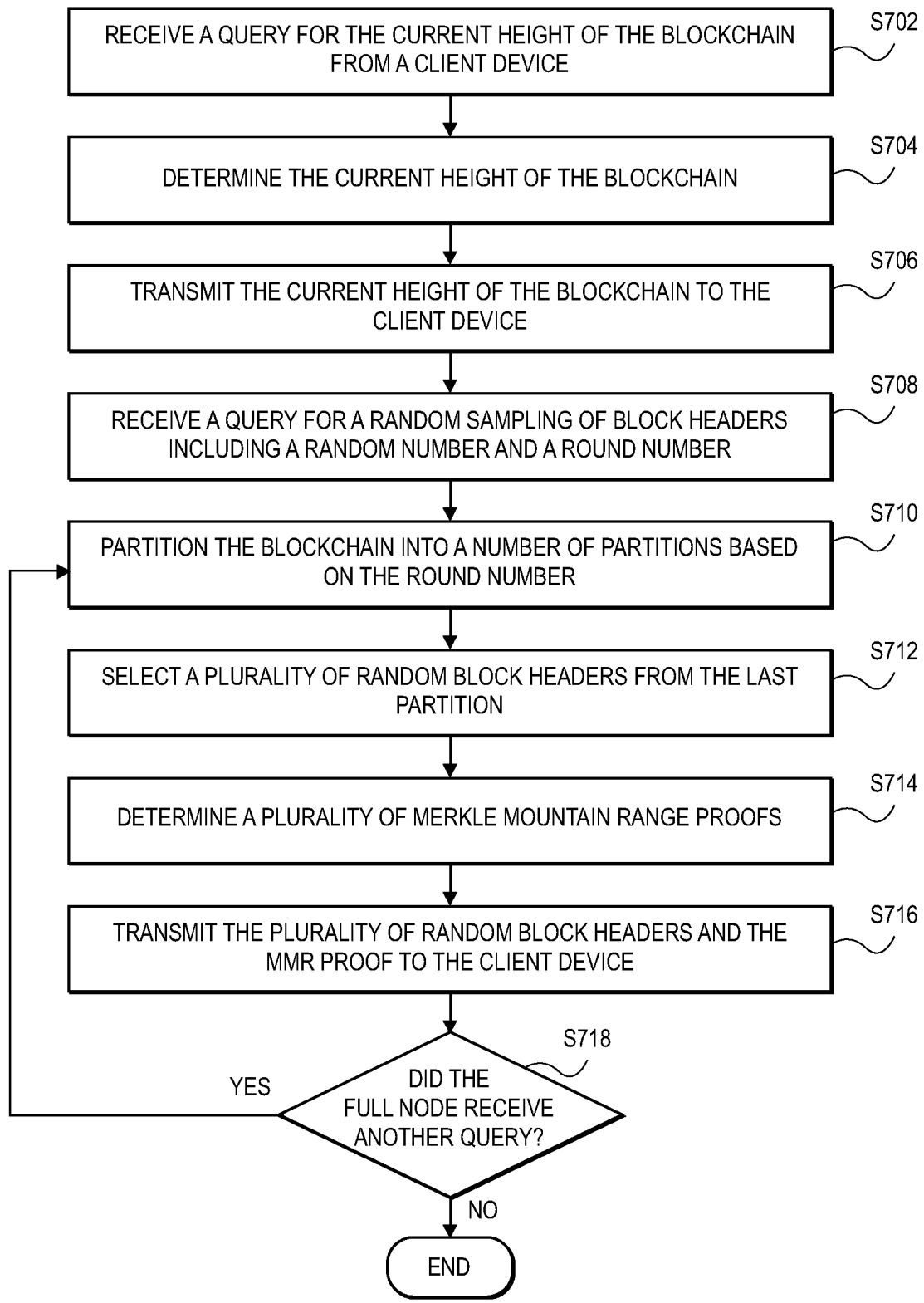
FIG. 7 shows a flowchart of a longest chain verification method.

FIG. 7 shows a flowchart of a longest chain verification method performed by a full node. The method illustrated in FIG. 7 will be described in the context of a full node receiving queries from a client device. It is understood, however, that embodiments can be applied to other circumstances such as a full node proving that it holds the longest blockchain.

At step S702, the full node can receive a query for the current height of the blockchain n from a client device. At step S704, after receiving the query for the current height of the blockchain n, the full node can determine the current height of the blockchain n. The full node can determine the current height of the blockchain n in any suitable manner. For example, the full node can determine the number of blocks in the blockchain. In some embodiments, the full node can determine the number of block headers in the blockchain.

At step S706, after determining the current height of the blockchain n, the full node can transmit the current height of the blockchain n to the client device. The client device, after receiving the current height of the blockchain n, can then determine that the current height of the blockchain reported by the full node is comparable to the most frequent height of a plurality of heights received by the client device from a plurality of full nodes.

At step S708, the full node can receive a query, from the client device, for a random sampling of block headers. The query can include a random number. In some embodiments, the query can include a random number and a round number (i.e., an iteration number).

At step S710, the full node can partition the blockchain into a number of partitions based on how many queries for the random sampling of block headers have been received. In some embodiments, the full node can partition the blockchain into a number of partitions based on the round number received by the client device. Each partition of the blockchain can contain the same number of blocks, for example, three partitions each including 10 blocks. In some embodiments, each partition of the blockchain can contain a comparable number of blocks, for example, a first partition including 100 blocks and a second partition including 101 blocks. If the round number is equal to 1, for example, the full node can partition the blockchain into 1 partition, i.e., the partition will include the full blockchain.

At step S712, after partitioning the blockchain into a number of partitions, the full node can select a plurality of random block headers from the last partition. The last partition can be the partition that includes the latest block header. The plurality of random block headers can comprise any suitable number of random block headers. The full node can determine the number of random block headers based on the random number received from the client device. For example, if the random number is equal to a value of 7, then the full node can select 7 random block headers. In other embodiments, the full node can use the random value as an input to a function. The full node can then select a number of random block headers based on the output of the function.

If the round number is equal to 5 and the current height of the blockchain is n=300, for example, then the full node can partition the blockchain into 5 partitions, each of the 5 partitions including 60 blocks. The full node can select a plurality of random block headers from the last partition of 60 blocks. In the next round, the round number will be equal to 6. During this round, the full node can partition the blockchain into 6 partitions, each of the 6 partitions including 50 blocks. The full node can then select a plurality of random block headers from the last partition of 50 blocks. In a certain round (e.g., a final round), the last partition of blocks will include the same number of blocks that the full node is selecting as the random block headers. Due to this, the full node will select the most recent number of block headers, including the latest block header. This method of random sampling allows the full node to select and transmit random block headers to the client device as well as the most recent number of block headers, including the latest block header.

In each subsequent round (i.e., iteration), the full node samples from a smaller and more recent partition of the blockchain. An adversary (i.e., malicious full node) could falsify chain of blocks by creating a fork from the longest chain. The more blocks that the adversary includes in the falsified chain requires more computing power. An adversary may not have large amounts of computing power, and may only be able to falsify shorter chains. These shorter chains will have forks closer to the latest block in the blockchain. As such, the iterative random block header sampling, described herein, allows the client device to verify an increasing number of newer block headers as the partition decreases in size over each iteration. In this way, the client device is likely to catch a falsified shorter chain. During the last round, the client device can receive and verify the most recent number of block headers.

At step S714, the full node can determine a plurality of Merkle mountain range proofs, one MMR proof for each of the random block headers. The full node can determine each node in the MMR that is in a path from the MMR root to the random block header. The path can include each node that is between the MMR root and the random block header in the MMR. The MMR proof can also include the sibling node of each of the nodes in the path. The full node can determine each sibling node of each node in the path in the MMR. The full node can include the path and the sibling nodes in the MMR proof.

At step S716, after determining the plurality of Merkle mountain range proofs, the full node can transmit the plurality of random block headers and the plurality of Merkle mountain range proofs to the client device. At step S718, the full node can determine if another query has been received. The full node can receive another query for a random sampling of block headers. This next query can include a round number equal to a value of 1 larger than the previous round number. The full node can repeat steps S708 to S716 any suitable number of times, as described herein.

If the full node does not receive another query for a random sampling of block headers, then the full node can end the process.

Figure 8:
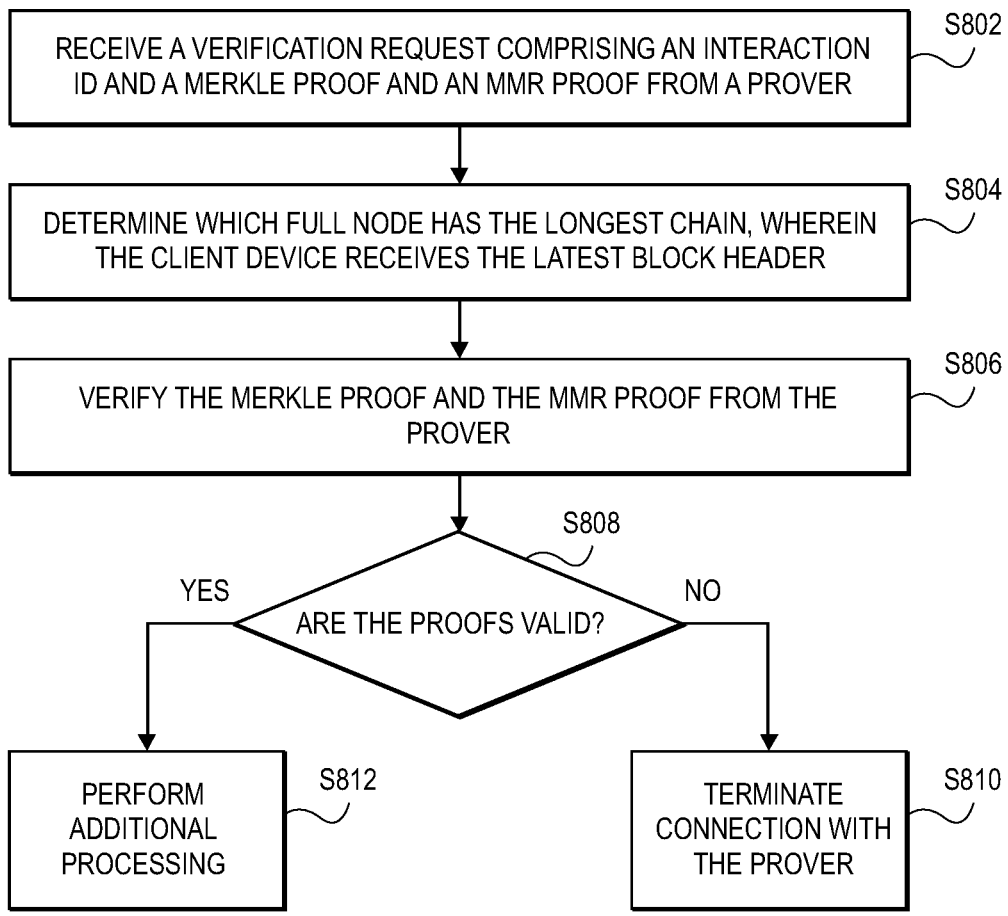
FIG. 8 shows a flowchart of an interaction verification method.

FIG. 8 shows a flowchart of an interaction verification method. The method illustrated in FIG. 8 will be described in the context of a client device receiving a verification request from a prover and proceeding to determine that an interaction is valid. It is understood, however, that embodiments can be applied to other circumstances (e.g., verifying that an interaction such as an agreement, contract, transaction, or the like is valid, etc.).

At step S802, the client device can receive a verification request. The verification request can be received from a prover. In some embodiments, the prover can a full node. In other embodiments, the prover can be a client device. The verification request can comprise an interaction identifier and, in some embodiments, a Merkle proof and a Merkle mountain range proof. The interaction identifier can be a unique identifier for an interaction. The interaction identifier (ID) can be, for example, a string of alphanumeric characters, a randomly assigned number, a sequentially assigned number, values corresponding to an interaction, a combination thereof, and/or the like. The Merkle proof can include a path from a Merkle root to a node associated with the interaction identifier as well as siblings of each node in the path, as described herein. The Merkle mountain range proof can include a path from a Merkle mountain range root to a node associated with a block header containing the Merkle tree as well as siblings of each node in the path, as described herein.

In some embodiments, the verification request can include a Merkle proof comprising a first path and a first plurality of sibling nodes. The first path can include a first plurality of nodes in a Merkle tree from a Merkle root to a first node. The first node can be associated with the interaction identifier. The verification request can also include a Merkle mountain range proof comprising a second path and a second plurality of sibling nodes. The second path can include a second plurality of nodes in a Merkle mountain range from a Merkle mountain range root to a second node. The second node can be associated with a block header containing the interaction identifier.

At step S804, after receiving the verification request, the client device can determine a full node that has the longest chain on the blockchain, as described herein, during which, the client device can receive the latest block header during the last round of querying for the sampling of random block headers.

At step S806, after determining the longest chain maintained by an honest full node as well as receiving the latest block header, the client device can verify the Merkle proof received in the verification request. The client device can verify the Merkle proof by verifying that each node in the path, included in the Merkle proof, with two child nodes is equal to the hash of that node's two child nodes, as described herein. The client device can also verify that the interaction identifier is the leaf node of the path.

The client device can verify the MMR proof received in the verification request, as described herein. The client device can verify the MMR proof by verifying that each node in the path, included in the MMR proof, with two child nodes is equal to the hash of that node's two child nodes. The client device can also verify that the block header is the leaf node of the path, wherein the block header contains the Merkle root of the Merkle tree.

At step S808, if either the Merkle proof or the Merkle mountain range proof are not valid, the client device can proceed to step S810. At step S810, the client device can determine that the prover has provided an incorrect proof and terminate the connection with the prover. In some embodiments, the client device can add the IP address, or other suitable identifier, of the prover to a list of known malicious devices.

If the Merkle proof and the Merkle mountain range proof are valid, the client device can proceed to step S812. The client device can determine that the interaction identifier provided by the prover corresponds with a valid interaction. At step S812, the client device can perform additional processing. Additional processing can include performing an action or operation as indicated in the interaction and/or transferring assets, physical and digital, between the verifier and the prover as outlined in the interaction.

Figure 9:
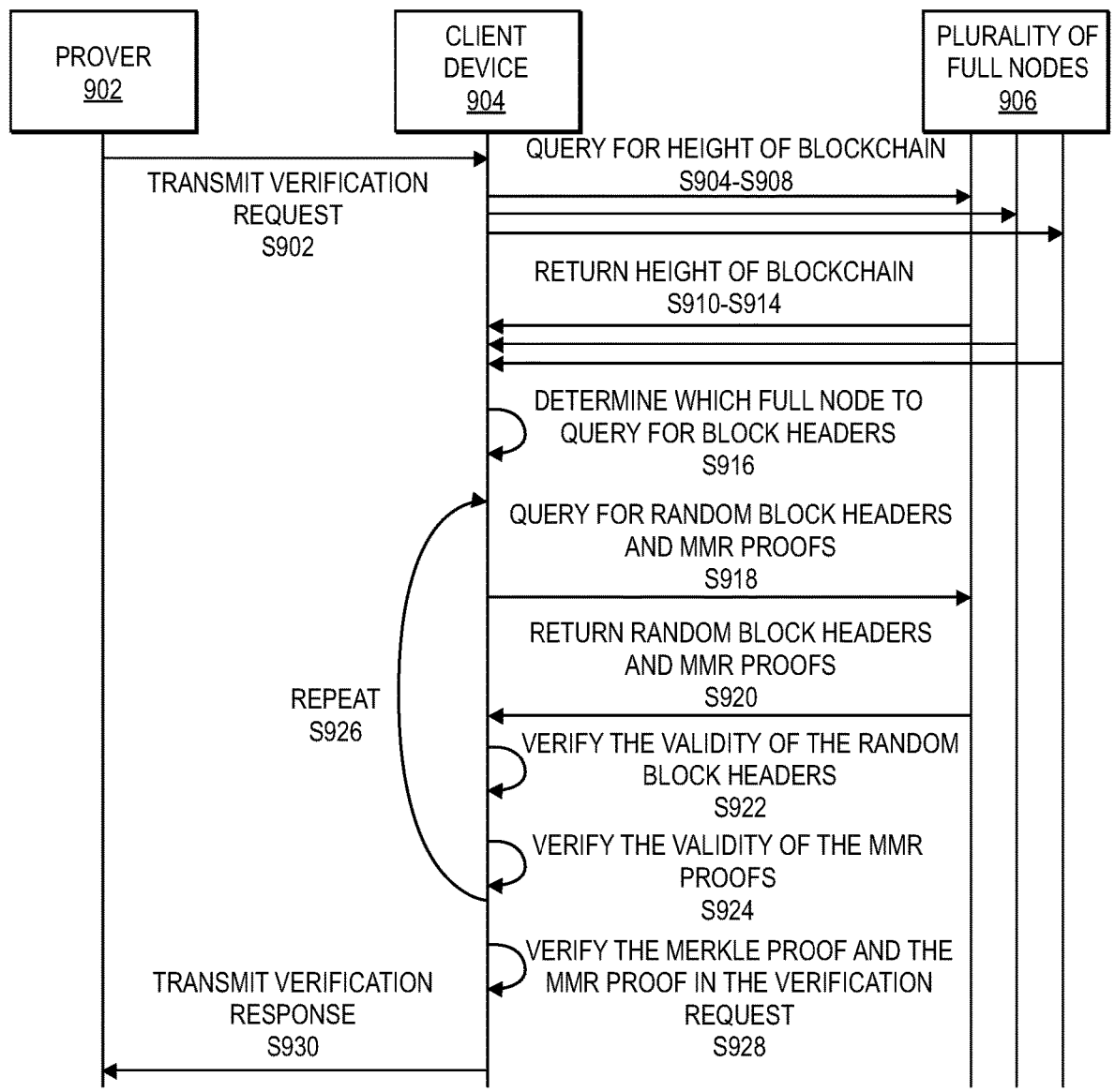
FIG. 9 shows a flow diagram of verifying a longest chain and an interaction.

FIG. 9 shows a flowchart of a longest chain verification method according to an embodiment. The method illustrated in FIG. 9 will be described in the context of a client device determining a full node, that maintains the longest blockchain, out of a plurality of full nodes, and then verifying an interaction associated with an interaction identifier received from a prover.

The method in FIG. 9 can be performed by a prover 902, a client device 904, and a plurality of full nodes. The prover 902 can be a client device or a full node. In some embodiments, the prover 902 can be a full node that the client device 904 communicates with during steps S918-S928.

At step S902, the prover 902 can transmit a verification request to the client device 904. The verification request can comprise an interaction identifier, a Merkle proof, and a Merkle mountain range proof. The interaction identifier can be associated with a previously performed interaction, which may, in some embodiments, be an interaction that was performed between the prover 902 and the client device 904. The Merkle proof can comprise a path and sibling nodes as described herein. The Merkle proof can be used to determine if an interaction is in a block. The Merkle mountain range proof can comprise a path and sibling nodes as described herein. The Merkle mountain range proof can be used to determine if a block is in a blockchain.

At step S904-S908, after receiving the verification request, the client device 904 can query a plurality of full nodes 906 for current heights of blockchains maintained by the full nodes.

At step S910-S914, after the plurality of full nodes 906 receive the query for the current height of the blockchain, each of the full nodes of the plurality of full nodes 906 can return the height of the blockchain. The client device 904 can receive a plurality of current heights.

At step S916, after receiving a plurality of current heights, the client device 904 can determine a full node from among the plurality of full nodes 906. The client device 904 can determine that the full node returned a current height that is consistent with a most frequently returned current height from the plurality of full nodes 906.

At step S918, the client device 904 can query the full node for a random sampling of block headers as well as a plurality of MMR proofs, one MMR proof for each of the block headers of the random sampling of block headers.

At step S920, the client device 904 can receive the random sampling of block headers as well as a MMR proof for each of the block headers.

At step S922, after receiving the random sampling of block headers, the client device 904 can verify the validity of each block header of the random sampling of block headers. The client device 904 can verify that the proof-of-work solution of each block header is valid. For example, the client device 904 can verify that the nonce and the previous hash value solve a hash function such that the solution is less than a predetermined number such as a difficulty level.

At step S924, the client device 904 can verify the validity of the plurality of MMR proofs received from the full node. The client device 904 can verify the validity of the MMR proof for each block header. The client device can verify that each node in the path with two child nodes is equal to the hash of that node's two child nodes, as described herein. The client device 904 can also verify that the start of the path in the MMR proof is the MMR root in the latest block header.

At step S926, after verifying the random block headers and the plurality of MMR proofs, the client device 904 can repeat steps S918-S924 any suitable number of times until a round number is equal to a predetermined number of rounds, for example, 5 rounds, 15 rounds, 40 rounds, or any other suitable number of rounds. In some embodiments, the client device 904 can repeat steps S918-S924 until the client device 904 receives the most recent block header.

At step S928, after repeating steps S918-S924, the client device 904 can determine that the full node maintains the longest (i.e., correct) blockchain. The client device 904 can then verify the Merkle proof and the MMR proof received from the prover 902 in the verification request. The client device can verify the Merkle proof and the MMR proof in any suitable method described herein.

At step S930, after verifying the Merkle proof and the MMR proof, the client device 904 can transmit a verification response to the prover 902. If the Merkle proof and the MMR proof are both valid then the client device 904 can determine that the interaction identifier is associated with a valid interaction. The client device can transmit a verification response indicating that the interaction is valid to the prover 902.

After and/or concurrently with transmitting the verification response, the client device 904 can perform additional processing as described herein. For example, additional processing can include performing an action or operation as indicated in the interaction and/or transferring assets, physical and digital, between the verifier and the prover as outlined in the interaction.

If the client device 904 determines that either the Merkle proof or the MMR proof is invalid, then the client device 904 can transmit a verification response indicating that the interaction is invalid to the prover 902. In some embodiments, the client device 904 may not transmit the verification response if either the Merkle proof or the MMR proof is invalid, in this case, the client device 904 can blacklist the prover 902 and terminate communication therewith.

IV. Non-Interactive

Embodiments can allow for a Fiat-Shamir protocol to remove the interaction between the client devices and the full nodes. Specifically, a full node can figure out locally which random blocks it should send to a client device for the verification without any initial randomness from the client device (e.g., in the form of a random number), yet the client device can verify the correctness of the proof and is guaranteed that the full node is not cheating. The Fiat-Shamir protocol is discussed in further detail herein.

In some embodiments, all of the verifier's messages, such as queries, are random from some known distribution. Concretely, in some embodiments these messages are block numbers in some predefined intervals. It is possible to turn an interactive protocol into a non-interactive protocol whose security holds in the random oracle model, see [Amos Fiat and Adi Shamir. How to prove yourself: Practical solutions to identification and signature problems. In *Conference on the Theory and Application of Cryptographic Techniques*, pages 186-194. Springer, 1986.]. Every message of the verifier can be replaced by the result of a query to a random oracle H which in practice is replaced by a hash function such as SHA-3. H can be queried at the current transcript and the oracle's answer is mapped into the verifier's message space. In other words, for some embodiments the queries are for the hash(es) of all the previously returned block headers.

V. Analysis

The overhead incurred on full nodes to i) generate new block headers (due to generating the MMR root) and ii) verify the new block headers (due to verification of the MMR root), can be evaluated. We report the experimental results on Table 1, below.

Table 1, below, shows a comparison between embodiments and previous works. H is the size of a hash (i.e., 256 bits for SHA256) and B is the size of a block header (i.e., 80 bytes in Bitcoin and 528 bytes in Ethereum). c and m can be constants.

TABLE 1

| | Chain proof size | Event proof size | Interactive | Extra block data |
|---|---|---|---|---|
| PoPoW | mlogn · loglogn · B | mlogn · loglogn · B + logs · H | Yes | logn |
| NIPoPoW | mlogn · loglogn · B | mlogn · loglogn · B + logs · H | No | logn |
| Embodiments | clognlogn · B | log(n · s) · H | No | 1 · H |

As the number of block headers increases linearly with the size of the blockchain, the resource constraints for current SPV clients also increase. For example, the Ethereum blockchain currently has 6 million blocks, given that each block header is of size 528 bytes, a light client in Ethereum would have to download and store approximately 3 GB to be able to verify all events on the Ethereum blockchain. Such requirements are not trivial for current client devices, such as mobile phones and tablets. Embodiments of the invention include an efficient client device which requires less resource constraints, but still offers high security (e.g., secure against a polynomial-time adversary).

Embodiments of the invention provide for a number of advantages. For example, a client device can download less data than previous light clients (e.g., a light client in Ethereum, described above). A light client in Ethereum downloads approximately 3 GB of data to be able to verify all events on the Ethereum blockchain. According to embodiments of the invention, the client device can download 12 MB, when conservative security parameters are set. As such, compared to Ethereum, client devices according to embodiments of the invention can receive 250 times less data to verify an interaction on the blockchain.

As another example, a client device can download a logarithmic number of block headers, rather than every block header in a blockchain, in order to verify a given block and interaction in the blockchain. This significantly reduces the amount of data transmitted from a full node to a client device, thus not only reducing storage and performance requirements of resource-limited devices, but also reducing network traffic.

Another advantage is that embodiments of the invention are not vulnerable to bribing attacks as in PoPoW. Embodiments of the invention are not vulnerable to bribing attacks, because embodiments do not differentiate between blocks in any way before the blocks are mined. The set of blocks selected to serve as a proof to the client device are determined only after those blocks are mined via a randomness chosen by the client device during transaction verification. Therefore, the adversary will not be able to bribe miners in the verification network to build a blockchain of fake, but valid, blocks.

VI. Optimizations

Some embodiments provide additional optimizations. Further optimizations of can include optimized block header sampling methods. In some embodiments, an optimized block header sampling method can be configured to handle variable difficulty in the blockchain. To handle variable difficulty, difficulty values can be stored in a Merkle mountain range (MMR). Additionally, further details of the above embodiments may be described in PCT Application No. US2018/046101 filed Aug. 9, 2018, which is herein incorporated by reference in its entirety for all purposes.

A. Overview of Optimizations

An exemplary optimized system can comprise a client device and two or more full nodes. In some embodiments, this system can be referred to as having two provers (i.e., full nodes) and a verifier (i.e., client device). The client device may be connected to (i.e., in operative communication with) two full nodes, where one of the two full nodes may be malicious. The client device may be in operative communication with any suitable number of full nodes.

Each full node can maintain a copy of a blockchain. If the full nodes do not agree on a block and/or a block header on the blockchain, then one of the full nodes holds an invalid chain. The client device can challenge both full nodes with a probabilistic sampling protocol, as described in detail herein, to find out which full node(s) hold the honest chain. The combined hash power of all malicious miners (e.g., malicious full nodes) can be a c<1 fraction of the honest full nodes, the probability that the adversary can mine the same number of blocks as the honest full nodes reduces exponentially as the honest chain grows. Thus, the adversary may insert a sufficient number of invalid (i.e., fake) blocks to make the malicious full node's blockchain as long, or more accurately, as difficult as the honest chain.

In a probabilistic sampling method, according to some embodiments, a client device can sample a logarithmic number of block headers from both full nodes using a probability density function g(x) that can specify, for every height x in each blockchain, the likelihood that the block located at height x of the blockchain is sampled. An optimal g(x) that maximizes the probability of catching the invalid chain given the adversary's optimal strategy, is found using differential analysis below. The probability of a single query catching the adversary, independent of the adversary's forking strategy, can have a concrete lower bound. By repeatedly sampling block headers, the client device can reduce the adversary's success probability to a negligible probability.

With MMR commitments in block headers, as described herein, each full node can begin by sending the header of the last block in its chain (i.e., the header of block $B_n$ that includes the MMR root $M_n$ where n is the length of the blockchain). Next, the client device can sample a number of random blocks from the full node(s). In some embodiments, the client device can sample a number of random blocks from the full node(s) according to a probability distribution g(x). For each sampled block, the full node can provide the corresponding block header and an MMR proof that the block is located at the correct height of the blockchain committed by $B_n$. Further, in some embodiments, the client device can check that the MMR root stored in each sampled block correctly commits to a correct subchain of the chain committed to in $B_n$. If the PoW solution of the MMR proofs of any of the sampled blocks is invalid, then the client device can reject the proof. Otherwise, the client device can accept $B_n$ as the last block of the honest chain. To ensure that tx is included in some block in the honest blockchain, the client device can verify the Merkle proof provided by the full node against the root of the transaction Merkle tree included the block header along with another MMR proof that the block is in the MMR rooted at $M_n$.

Table 1, below, shows a comparison of proof sizes (measured in KB) for previous SPV clients as well as embodiments implemented in the Ethereum blockchain at various block heights assuming an adversary that has a hash power of at most c=½ of the honest hash power and succeeds with probability less than $2^{-50}$.

| Block Height | 10,000 | 100,000 | 1,000,000 | 7,000,000 |
| --- | --- | --- | --- | --- |
| Previous SPV | 4,961 KB | 49,609 KB | 496,094 KB | 3,472,656 KB |
| Embodiments | 154 KB | 261 KB | 389 KB | 484 KB |

B. Design of Optimizations

First, a brief review of notation and terminology will be described. n can denote the blockchain length which can be the number of blocks in the blockchain at the time of proof generation and verification. c can denote the ratio of the computational power of the adversary to the combined computational power of all honest miners. An adaptive (i.e., rushing) adversary who can choose which full nodes to corrupt and which blocks to "fake" in the blockchain is considered. However, the adversary's mining power can be bounded by the known fraction 0<c<1 of the combined mining power of honest nodes. Additionally, an event can occur with high probability if it occurs with probability $1-O(\frac{1}{2^\lambda})$, where $\lambda$ is the security parameter. Further notation is shown in the table below.

| Notation | Usage |
| --- | --- |
| n | Chain length |
| c | Fraction of malicious hash power to honest power |
| a | Fork point |
| f | Sampling probability distribution |
| k | Fraction of blocks/weights queried from the tip (i.e., end) of the chain |
| L | Number of blocks queried at the tip of the chain |
| Q | Total number of queries |

In cryptocurrencies such as Bitcoin and Ethereum, a valid chain is the one that requires more computational work to create, and hence is the one that has the highest total block difficulty. While the most difficult chain rule is the accurate way of determining which chain is the valid one, the notion of the longest chain provides a simplified way that makes protocol analysis easier. Therefore in this section, it can be assumed that all blocks have the same difficulty, however, it is understood that the blocks may not have the same difficulty. Below, in section VI.C.5, the case of variable difficulty throughout the chain will be discussed.

In some embodiments, a client device can perform the following steps while communicating with two full nodes which want to convince the client device that they hold a valid chain of length n+1. At least one of the full nodes can be honest. 1) Both full nodes can send, to the client device, their last block headers in their chains. Each header can include a commitment value representing the root of an MMR created over the first n blocks of the corresponding chain. 2) For j≤O(log n) rounds: 2a) the client device can query k random block headers from each full node based on a probabilistic sampling method described in section VI.C. 2b) For each queried block, $B_i$, located at position i of either chain C, the full node can send, to the client device, the header of $B_i$ along with an MMR proof $\Pi_{B_i \in C}$ that $B_i$ is the i-th block in C. 2c) The client device can check the PoW for each block header as well as the validity of $\Pi_{B_i \in C}$. If any of the checks fail, then the client device can reject the full node. 3) If the full node has not been rejected, then the client device can accept C as the valid chain.

In other embodiments, a client device can query a full node for the header and MMR proof for a single block k in the full node's chain of n+1 blocks. For example, the following steps may be performed. The client device can perform the steps: 1) store the root of the MMR of n blocks stored in the n+1 block's header; 2) query a full node for the header of block k and for $\Pi_{k \in n}$; 3) verify that the hashes of $\Pi_{k \in n}$ hash up to the root of $MMR_n$; 4) calculate the root of the MMR of k-1 blocks from $\Pi_{k \in n}$ by calling Get_Root ($\Pi_{k \in n}$, n, k); 5) compare the calculated root with the root in the header of block k; 6) if each calculation is valid, the client device can accept the block proof. The full node can perform the steps: 1) store a chain of n+1 blocks and the MMR of the first n blocks; 2) receive a query for block k from the client device; 3) calculate $\Pi_{k \in n}$ from $MMR_n$ by calling MMR_Proof($MMR_n$, n, k); and 4) send the header of k and $\Pi_{k \in n}$ to the client device.

C. Proof of Honest Chain

It is advantageous to have a system and method that can allow an honest full node to convince a client device of the validity of its chain, while preventing malicious full node that has a dishonest chain from convincing the client device that it has a valid chain.

Figure 11:
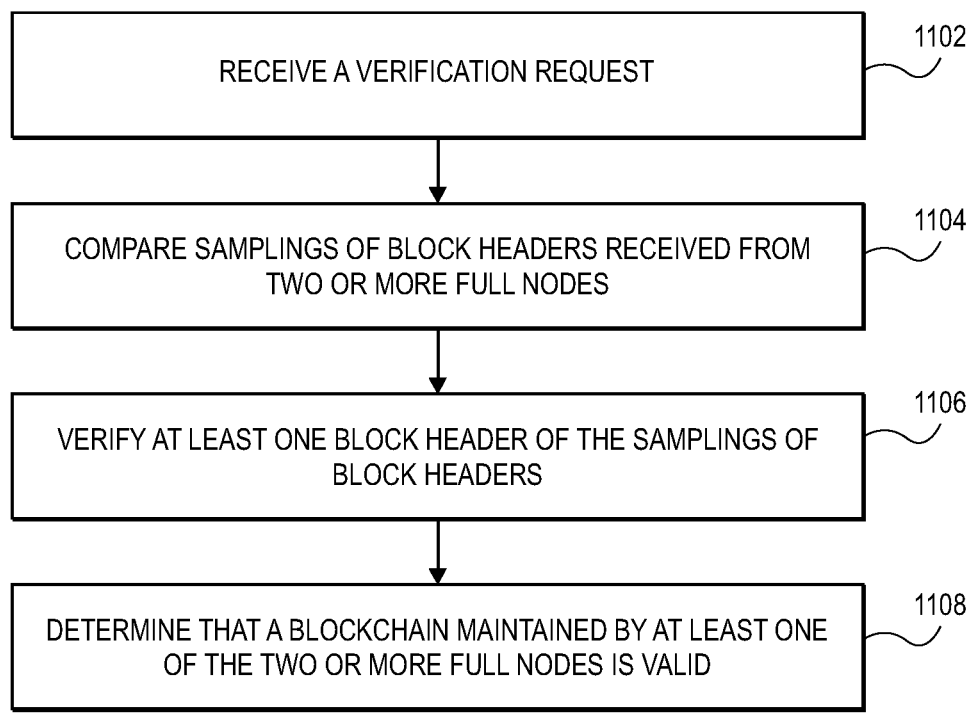
FIG. 11 shows a flow diagram of a blockchain verification method according to embodiments.

FIG. 11 shows a flowchart of a blockchain verification method according to an embodiment. The method illustrated in FIG. 11 will be described in the context of a client device determining whether or not full node(s) maintain an honest blockchain. It is understood, however, that embodiments can be applied to other circumstances.

At step 1102, a client device can receive a verification request. from a prover. Step 1102 may be similar to step S902, as described above. The verification request can comprise an interaction identifier, a Merkle proof, and a Merkle mountain range proof. The interaction identifier can be associated with a previously performed interaction, which may, in some embodiments, be an interaction that was performed between the client device and another entity, such as a resource provider.

At step 1104, after receiving the verification request, the client device can compare samplings of block headers received from two or more full nodes. For example, the client device can query two or more full nodes for a sampling of block headers. The query can include the client device requesting block headers from the full node(s). The client device can query each full node for the same block headers. After receiving the samplings of block headers from the two or more full nodes, the client device can compare the block headers received from the two or more full nodes. The client device can query the two or more full nodes for the sampling of block headers as further described herein.

The client device can compare the samplings of block headers using any suitable method. For example, the client device can compare each block header in the sampling of block headers received from one of the full nodes to the sampling of block headers received from another full node. Each block header of a first sampling of block headers can correspond to a block header of a second sampling of block headers.

For example, the client device can receive a first sampling of block headers from a first full node including block headers for block numbers 10, 40, 66, and 90. The client device can also receive a second sampling of block headers from a second full node including block headers for block numbers 10, 40, 66, and 90. The client device can compare the two block headers for block number 10. If the two block headers are the same (i.e., match), then the client device can compare the next two block headers (i.e., block headers for block number 40). In some embodiments, if the client device compares two block headers and determines that they do not match, the client device can proceed to step 1106. In other embodiments, if the client device determines that the sampling of block headers from one full node matches the sampling of block headers from a second full node, the client device can determine that the blockchains maintained by both full nodes are valid.

At step 1106, after comparing the samplings of block headers, the client device can verify at least one block header of the samplings of block headers. For example, if the client device determines that block headers for a particular block number do not match, then the client device can verify the block headers that did not match.

The client device can verify a block header by verifying the proof of work of that block header as described in detail herein. Additionally, the client device can verify that the block header corresponds to a correct block number as indicated in a MMR root stored in the latest block header, which may be stored by the client device, as described in detail herein.

In some embodiments, the client device can verify a plurality of block headers. For example, if the client device determines that block header number 40 received from a first full node does not match block header number 40 received from a second full node, then the client device can query the two or more full nodes for a sampling of block headers around block number 40 (e.g., query for block headers numbered 41-50, 32-19, 20-60, etc.).

At step 1108, after verifying at least one block header, the client device can determine that a blockchain maintained by at least one of the two or more full nodes is valid. The client device can determine that the blockchain maintained by at least one of the two or more full nodes is valid in response to verifying the at least one block header of the samplings of block headers. For example, if the client device determined that each block header of the sampling of block headers from a first full node match the corresponding block headers of the sampling of block headers from a second full node, then the client device can determine that both full nodes maintain valid blockchains (i.e., the same blockchain).

1. Naive Approach

Several approaches for probabilistic sampling methods are described below. One approach is for the client device to request a uniformly-random set of multiple blocks from each full node. Since the malicious full node has only a limited computation power, it can, at best, correctly mine a subset of all the blocks. Thus, the client device may need to sample enough blocks to ensure that at least one of them is invalid (i.e., an incorrectly-mined block). The method may begin with each full node providing the client device with the header of the last block in the full node's chain, where this header can contain the root of an MMR tree built over all blocks in the chain. Whenever the client device requests a block from a full node, the full node can also provide a Merkle proof that the block is a leaf in the MMR of the last block. From the MMR inclusion proof, the client device can recreate the MMR root for that block and verify that it is the same root in the header of the block (therefore included in the proof of work for the block).

As shown in Corollary 2, below, once a malicious full node forks off from the honest chain, it cannot include any of the later honest blocks in its chain since the MMR root in those blocks would not match the chain. With this setup, if the client device makes enough queries, it can eventually query the malicious full node for a block that the malicious full node has not mined (i.e., an invalid block).

To determine how many blocks the client device should query to achieve a desired probability of success in catching a malicious full node, the malicious computing power can be bounded to a c fraction of the honest computing power. After the adversary forks from the honest chain, it can correctly mine up to only a c fraction of the blocks in the rest of the chain. If the adversary forked at some block $B_a$, then for each random block the client device requests after $B_a$, there is a probability of $(1-c)$ that the sampled block is invalid (i.e., incorrectly mined) as the adversary has to "lengthen" its fork to have a chain of equal length to the honest chain. Thus, with k queries after the fork point, the client device has a success probability of $(1-c^k)$ in catching the malicious full node. In some embodiments, the value k can be chosen arbitrarily (e.g., a constant) to bound the protocol's failure probability according to a security parameter $\lambda$.

However, this approach has several limitations. Since the client device does not know where in the chain the adversary started the fork, the client device has to sample a large number of blocks to increase its chance of catching the malicious full node, especially if the fork point is located near the end of the chain (i.e., the fork is short). Below, the client device sampling a smaller number of blocks such that it can find the fork point a will be discussed.

2. Binary Search Approach

In some embodiments, the client device can perform a binary search probabilistic sampling method. Since at least one of the full nodes is honest, the client device can search for the fork point by querying two or more full nodes at the same time to find the first block at which they disagree. The client device can do this by performing a binary search over the entire chain as follows.

Figure 12:
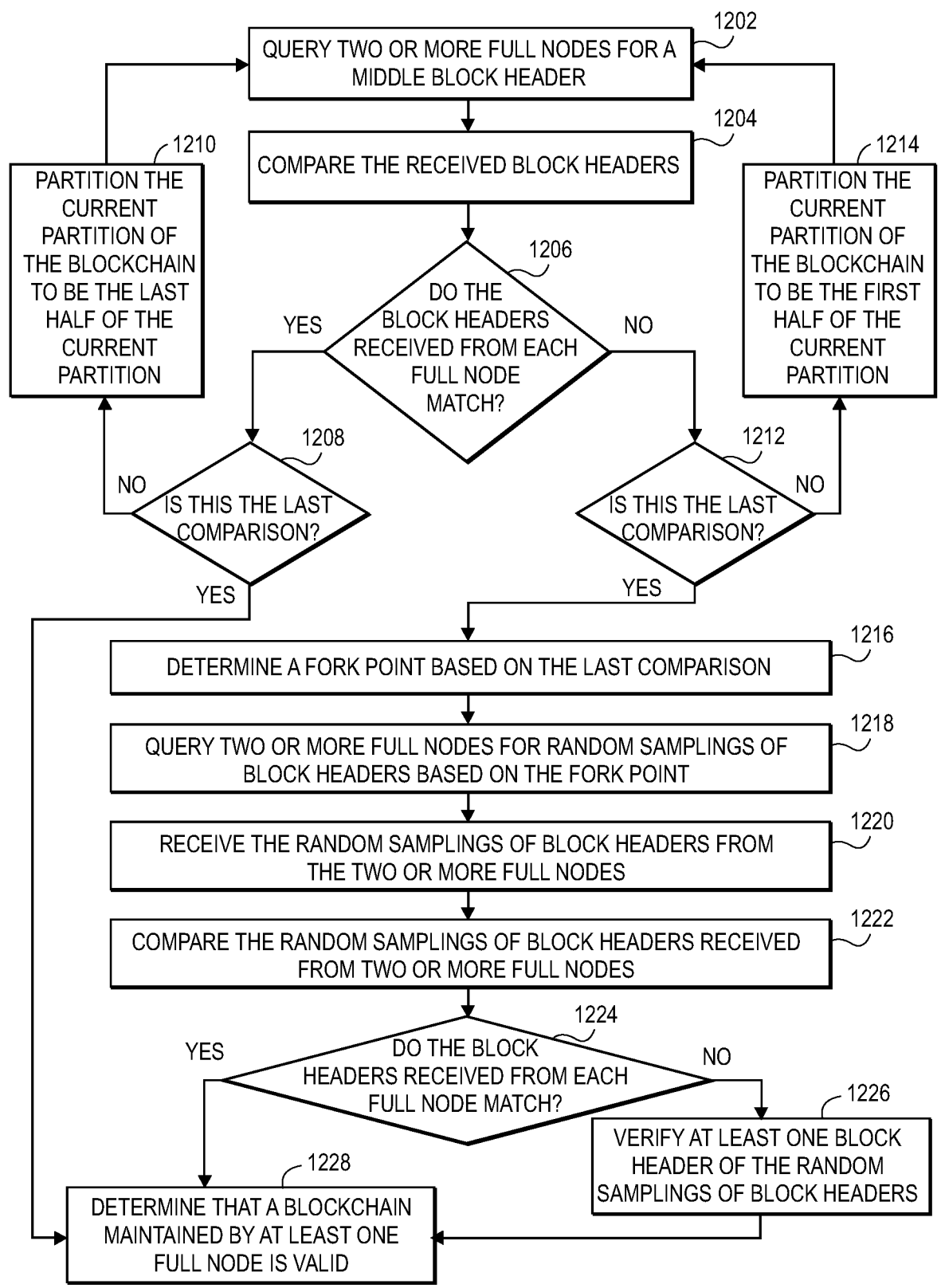
FIG. 12 shows a flow diagram of a binary search probabilistic sampling method according to embodiments.

FIG. 12 shows a flowchart of a binary search probabilistic sampling method according to an embodiment. The method illustrated in FIG. 12 will be described in the context of a client device querying block headers from two or more full nodes using a binary search probabilistic sampling method.

The client device can start by querying each of the two full nodes for the block header in the middle of its chain to the client device. The middle block header can be the block header located at the middle point of the current partition of the blockchain. The current partition may be the current portion of the blockchain that the client device is evaluating. For example, the second half of the blockchain may have a middle block header that corresponds to the block header located at a point ¾ of the way through the full blockchain.

At step 1202, the client device can query the two or more full nodes for a middle block header. The client device can query a first full node as well as a second full node for the block header in the middle of the blockchain maintained by the full nodes. For example, the blockchains maintained by the first and second full nodes may be of a length of 10,000 blocks. The first and second full nodes can respond to the client device with the middle block header (e.g., block header number 5,000).

A full node of the two or more full nodes can receive a first middle block query from the client device requesting a block header from a block in the middle of a first partition of the blockchain. The first partition can be determined by the client device. The full node can transmit a first middle block header of the first partition of the blockchain to the client device. Each full node of the two or more full nodes can transmit the middle block header to the client device.

At step 1204, after receiving the middle block headers, the client device can compare the received block headers from the two or more full nodes. The client device can compare two or more block headers in any suitable manner. For example, the client device can determine that the contents of one block header is the same as the contents of a second block header. The client device can compare the data in the block headers such as a timestamp, none, Merkle root, previous header hash, etc.

At step 1206, the client device can determine whether or not the block headers received from each full node match. If the client device determines that the block headers do not match, then the client device can proceed to step 1212. If the client device determines that the block headers do match, then the client device can proceed to step 1208.

If the two middle block headers are the same, then the client device can recurse on the second half of the current partition (i.e., the half with higher block numbers), otherwise the client device can recurse on the first half of the current partition. In other words, the client device can partition the blockchain in half and can evaluate the first or second half of the blockchain.

At step 1208, after determining that the block headers received from each full node do match, the client device can determine whether or not this is the last comparison between block headers. If the client device determines that this is the last comparison, then the client device can proceed to step 1228. If the client device determines that this is not the last comparison, then the client device can proceed to step 1210. The client device can determine that this is the last comparison by determining a fork point. The fork point can be the smallest block number at which the two or more full nodes disagree on the block header. In some embodiments, the client device can determine that this is the last comparison by performing a predetermined number of rounds, as described herein.

At the fork point the malicious blockchain can begin to differ from the honest blockchain. The blocks, and thus the block headers, may be the same between the malicious blockchain and the honest blockchain before the fork point. Once the client device determines that a particular block is the fork point, then the client device may consider all previous blocks as being the same, and honest, before the fork point.

At step 1210, after determining that there are more comparisons to perform, the client device can partition the current partition of the blockchain to be the last half of the current partition. For example, the client device can move from evaluating the full blockchain to the last half of the blockchain.

After partitioning the current partition of the blockchain to be the last half of the current partition, then the client device can query the two or more full nodes for a middle block header, such as at step 1202. The client device can then compare the middle block headers, similar to step 1204.

This can be repeated until the client device finds the fork point which is the smallest block number where the two full nodes disagree. Once the client device finds the fork point, the client device can sample blocks randomly from both full nodes after the fork point, with each sample having a probability of (1−c) in catching the dishonest full node in a lie (i.e., supplying an incorrect block header and/or block, etc.). Thus, the client device can sample 2 log n blocks to find the fork point (n being the chain length) plus 2k blocks to have a probability of $(1-c^k)$ in determining which of the two full nodes is dishonest, if one is.

At step 1206, the client device can determine that the block headers do not match and proceed to step 1212. At step 1212, the client device can determine whether or not this is the last comparison between block headers. Step 1212 may be similar to step 1208 described above. If the client device determines that this is the last comparison, then the client device can proceed to step 1216. If the client device determines that this is not the last comparison, then the client device can proceed to step 1214. In some embodiments, the client device can repeat the steps of querying, comparing, and partitioning, until the fork point is found.

At step 1214, after determining that there are more comparisons to perform, the client device can partition the current partition of the blockchain to be the first half of the current partition. For example, the client device can move from evaluating the last half of the blockchain to the first half of the last half (i.e., from the middle of the whole blockchain (½) to the middle of the last half of the blockchain (¾)). After partitioning the current partition of the blockchain to be the first half of the current partition, then the client device can query the two or more full nodes for a middle block header, such as at step 1202.

At step 1216, after the client device determines that this is the last comparison (e.g., at step 1212), then the client device can determine a fork point based on the last comparison. For example, in some embodiments, the fork point can be the smallest block number where the two or more full nodes respond with different block headers (i.e., the block headers do not match).

At step 1218, the client device can query the two or more full nodes for random samplings of block headers based on the fork point. The client device can perform any suitable sampling method as described herein to sample block headers after the determined fork point. For example, in some embodiments, the full node can query the two or more full nodes for a predetermined number of uniformly-randomly distributed block headers from the block headers after the fork point.

At step 1220, after querying the two or more full nodes, the client device can receive the random samplings of block headers from the two or more full nodes. At step 1222, after receiving the random samplings, the client device can compare the random samplings of block headers received from the two or more full nodes. The client device can compare the respective block headers from each random sampling of block headers using any suitable method described herein.

At step 1224, the client device can determine whether or not the block headers received from each full node match, as described herein. If the block headers received from each full node match, then the client device can proceed to step 1228. If the block headers received from each full node match, then the client device can proceed to step 1226.

At step 1226, the client device can verify at least one block header of the random samplings of block headers. For example, the client device can verify block headers which did not match at step 1224. In some embodiments, the client device can verify each of the block headers received in the random samplings of block headers.

At step 1228, the client device can then determine that a blockchain maintained by at least one full node is valid. For example, the client device can verify a block header number 7,000 received from a first full node and can verify a block header number 7,000 received from a second full node. The PoW of block header 7,000 from the first full node may be incorrect, whereas the PoW of the block header 7,000 from the second full node may be correct. The client device can determine that the first full node is malicious as it is responding with invalid blocks. The client device can also determine that the blockchain maintained by the second full node is valid (with high probability).

However, this binary search approach has several limitations. For example, this approach is inherently interactive and can use multiple rounds of communication between the client device and the full nodes, resulting in higher verification latencies. This limitation will be further discussed and improved upon below.

3. Bounding the Fork Point

The next approach involves bounding a fork point. A client device can determine the fork point by sampling blocks from each full node in a single attempt while still achieve a high probability of success. Finding the exact location of the fork point by sampling a small number of blocks in only one attempt is challenging. This requirement can be relaxed such that the client device can "bound" the proximity where the fork point is located while still sampling in one round. A goal is to ensure that the client device makes sufficient queries after the fork point. Rather than searching for the fork point, the client device can iterate through intervals from which it samples blocks. If in at least one of the intervals the client device has a sufficiently-high probability of catching the malicious full node, then the client device can succeed with high probability in the whole method.

Figure 13:
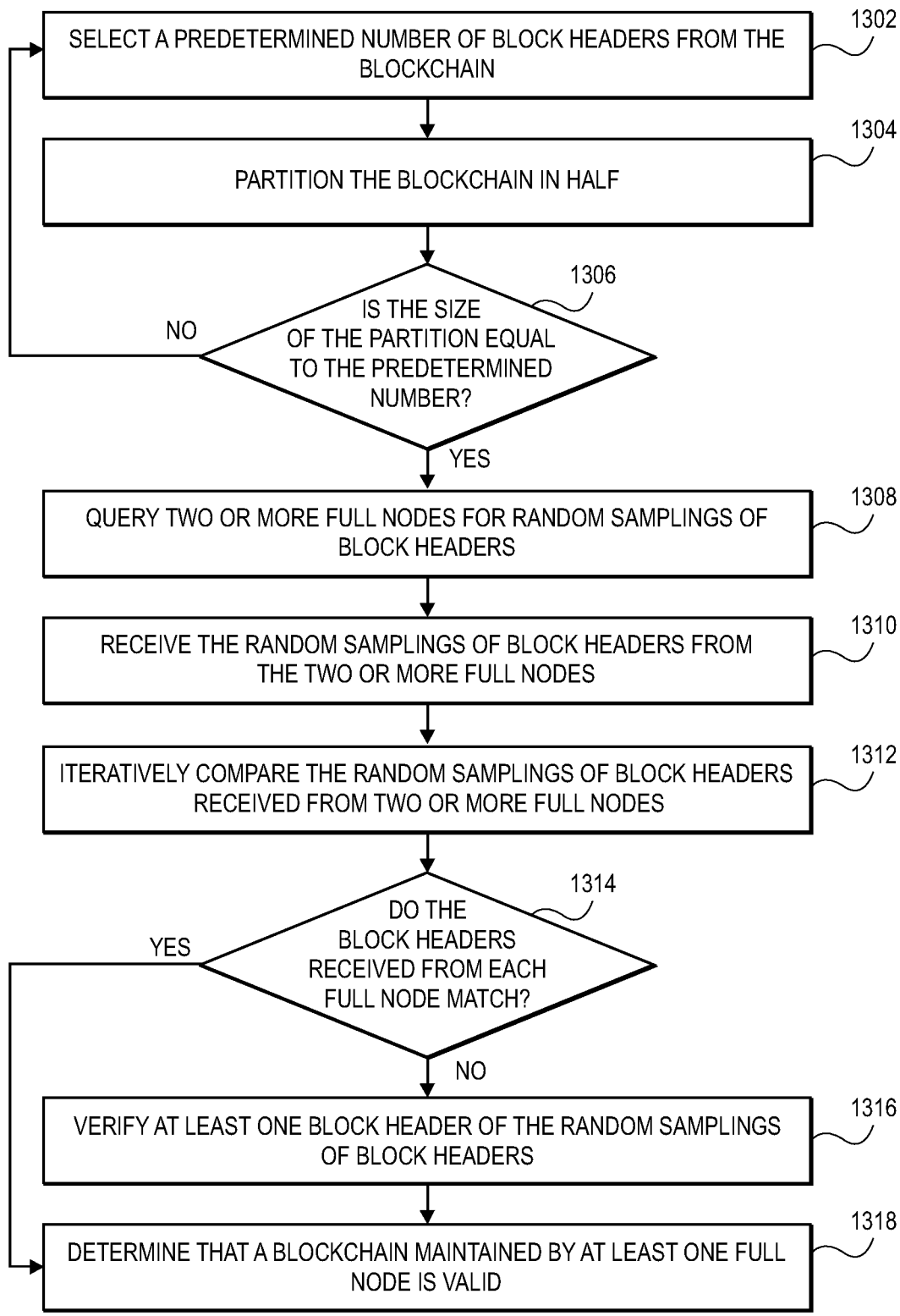
FIG. 13 shows a flow diagram of a bounding a fork point probabilistic sampling method according to embodiments.

FIG. 13 shows a flowchart of a random distribution sampling method according to an embodiment. The method illustrated in FIG. 13 will be described in the context of a client device querying block headers from two or more full nodes using a bounding the fork point probabilistic sampling method.

In some embodiments, prior to step 1302, a client device can request a block header of the last block (i.e., the most recently created block).

At steps 1302-1306, the client device in communication with two or more full nodes can generate a random distribution for sampling a number of block headers. At step 1302, the client device can randomly select a predetermined number of block headers k from the blockchain. For example, the client device can select 5, 10, 20, 50, etc. block headers from the blockchain. The client device can first sample k random blocks from the entire chain from each full node.

At step 1304, after randomly selecting the k block headers, the client device can partition the blockchain in half. For example, the client device can partition the blockchain to include the last half of the current partition. After each time that step 1304 is performed, the partition can decrease by half. In other words, the client device can successively split (i.e., partition) the chain (or the current interval/partition) in half and can query another random k blocks from the last half (i.e., the interval ends with the tip of the chain). More precisely, for every integer j∈[0, log n), the client device queries k blocks from the last $n/2^j$ blocks of the chain. This can be repeated until the size of the interval is at most k (i.e., the last k blocks are sampled). In other words, the client device can repeat partitioning the blockchain in half and selecting the predetermined number of block headers until a number of selected block headers is equal to the predetermined number multiplied by a logarithm of a total length of the blockchain.

At step 1306, after partitioning the current partition in half, the client device can determine whether or not the partition includes the same number of block headers as the predetermined number of block headers k. If the partition includes more block headers than the predetermined number of block headers k, then the client device can repeat steps 1302 and 1304 until the partition includes k block headers. In which case, in some embodiments, the client device can also select the last k block headers. In some embodiments, the client device can then select the predetermined number of block headers from a remaining half of the blockchain.

A random distribution can include the above selected block headers. In some embodiments, the client device can create the random distribution which can include k*log(n) block headers, as there may be log(n) rounds of steps 1302-1306.

As an example, the blockchain has a length of n=100 blocks, and the predetermined number of block headers is k=10. In the first round, the client device can select block headers numbered 3, 20, 34, 39, 42, 59, 71, 83, 87, and 93 from blocks 1 to 100. In the second round, the client device can select from the last half of the blockchain (i.e., from blocks numbered 50-100); the client device can select block headers numbered 56, 62, 68, 72, 75, 82, 88, 91, 94, and 99. In the third round, the client device can select from the last fourth of the blockchain (i.e., from blocks numbered 75-100); the client device can select block headers numbered 77, 79, 82, 85, 86, 89, 91, 93, 97, and 98. In the fourth round, the client device can select from the last eighth of the blockchain (i.e., from blocks numbered 87-100); the client device can select block headers numbered 87, 88, 89, 90, 92, 93, 94, 95, 97, and 98. In the fifth round, and in this example, final round, the client device can select the last k=10 block headers. In some embodiments, the client device may remove duplicate block headers (i.e., block headers selected more than one time).

At step 1308, after generating the random distribution, the client device can query two or more full nodes for random samplings of block headers based on the random distribution. At step 1310, the client device can receive the random samplings of block headers from the two or more full nodes.

In some embodiments, the data structure of the random sampling of block headers can reflect the iterative block header selection process performed in steps 1302-1306. The block headers selected from a round may be grouped together in any suitable data format. For example, the block headers selected in the first round, or more accurately the number of the block headers, may be included in a tuple. Each round may correspond with a tuple of values (i.e., numbers of block headers).

As an example, the above selected block headers can be included in a data structure sent to the two or full nodes as a query. The data structure can be:

((3, 20, 34, 39, 42, 59, 71, 83, 87, 93), (56, 62, 68, 72, 75, 82, 88, 91, 94, 99), (77, 79, 82, 85, 86, 89, 91, 93, 97, 98), (87, 88, 89, 90, 92, 93, 94, 95, 96, 98)).

The bolded block header numbers indicate block headers that may be not requested (i.e., removed from the random distribution by the client device), in some embodiments, due to duplicate block headers selected in steps 1302-1306.

At step 1312, after receiving the random samplings of block headers, the client device can iteratively compare the random samplings of block headers received from two or more full nodes. For example, the client device can receive at least block headers (3, 20, 34, 39, 42, 59, 71, 83, 87, 93) (corresponding to the block headers selected in the first round above) from both a first and second full node. The client device can first compare the smallest valued (i.e., oldest) block header received from the first full node to the block header received from the second full node. For example, the client device can compare the block header corresponding to block number 3 received from the first full node to the block header corresponding to block number 3 received from the second full node.

If the block header received from the first full node matches the block header received from the second full node, then the client device can compare the next block headers (e.g., the block header corresponding to block header number 20). The client device can iteratively compare the received block headers from each successive round above, as included in the data structure of the query.

At step 1314, the client device can determine whether or not the block headers received from each full node match, as described herein. If the client device determines that all of the block headers received from the two or more full nodes match, then the client device can proceed to step 1318. If the client device determines that at least one block header received from the two or more full nodes does not match, then the client device can proceed to step 1316.

In some embodiments, if the client device determines that one of the block headers received from the first full node does not match the corresponding block header received from the second full node, then the client device can determine not to compare the not yet compared block headers and proceed to step 1316.

At step 1316, the client device can verify at least one block header of the random samplings of block headers, as described herein. The client device can verify the block headers received from the two or more full nodes which do not match. To verify a block header, the client device can verify that the proof-of-work solution of each block header is valid. For example, the client device can verify that the nonce and the previous hash value solve a hash function such that the solution is less than a predetermined number such as a difficulty level. In some embodiments, the client device can further verify the validity of an MMR proof associated with the block header received from the full node, as described in detail herein.

At step 1318, the client device can determine that a blockchain maintained by at least one full node is valid, as described herein. For example, if the client device determines that all of the block headers received from the two or more full nodes match, then the client device can determine that the two or more full nodes maintain valid copies of the blockchain. In other embodiments, the client device can determine that one or more block headers received from the two or more full nodes do not match. The client device can then evaluate the block headers with higher scrutiny by verifying the block headers which do not match. The client device can determine that the proof-of-work solution in the block header provided by one of the full nodes is invalid (i.e., not computed correctly). The client device can determine that the full node is a malicious full node. The client device can further determine that the other full nodes of the two or more full nodes are honest full nodes which maintain a valid copy of the blockchain.

The above strategy succeeds with high probability. To show this, the probability that the client device samples at least one invalid block from the malicious full node can be calculated, based on the observation that the adversary has to insert a sufficient number of invalid blocks into its fork to obtain an overall chain of equal length to the honest chain.

Lemma 1. The probability that the client device fails to sample any invalid block is at most $$\left(\frac{1+c}{2}\right)^k.$$

Proof. Let n denote the length of the chain (not counting block n+1 which the client device has already sampled) and c denote the fraction of the adversary's computing power relative to the honest computing power. At any interval j, the client device samples from the interval between block $$\frac{(2^j-1)n}{2^j}$$

and n. Let $h_j$ denote the number of invalid blocks the adversary has inserted in the j-th interval. The probability that the client device fails to sample an invalid block in this interval is $$P_j = \left(\frac{\frac{n}{2^j} - h_j}{\frac{n}{2^j}}\right)^k = \left(\frac{n - 2^j h_j}{n}\right)^k.$$

Thus, the probability that the client device fails is $\Pi_{j=0}^{\log n} P_j$. Since $P_j \leq 1$, if one $P_j$ is sufficiently small, then the total probability of failure is also sufficiently small.

Letting a denote the forking point, there is some integer j such that $$\frac{(2^j-1)n}{2^j} \leq a < \frac{(2^{j+1}-1)n}{2^{j+1}}.$$

In other words, there is some sampled interval of size $n'=n/2^j$ in the protocol where the fork point lies between the start and the middle of the interval. Let l denote the length from a until n (i.e., the length of the fork, $$l > \frac{n'}{2}).$$

The number of invalid blocks in the interval is $$h_j = (1-c)l \geq (1-c)\frac{n'}{2}.$$

Thus, the probability that the client device fails to catch the invalid chain is at most equal to the probability that the client device fails at step j, i.e., $$Pr[\text{fail}] \leq Pr[fail at j] \leq \left(\frac{n' - (1-c)\frac{n'}{2}}{n'}\right)^k = \left(\frac{1+c}{2}\right)^k.$$

Note that if l≤k, the client device can sample all of the adversary's invalid blocks and Pr[fail]=0.

However, this bounding the fork point approach has several limitations. In the analysis, it is calculated that the probability of success based on the likelihood of success in at least one of the log n intervals. However, the method samples other blocks that are not considered in the analysis, but could increase the client device's success probability. The method described below can achieve a better bound by further taking these blocks into account.

4. Distributional View

The sampling method can be even further optimized. The following sampling method can achieve a better bound by further taking the sampled blocks into account. While presented as an iterative method, it is important to note that all of the steps can be independent. In other words, the client device's samples do not depend on the full node's responses to previous queries. This means that the order of samples can be altered to create an isomorphic protocol with the same security and efficiency properties. This can be used to examine the probability that a given block is sampled. In some embodiments, the protocol can sample later blocks with higher probability. In other words, the probability grows inversely with the relative distance of a block to the end of the chain (i.e., the most recent block).

Figure 15:
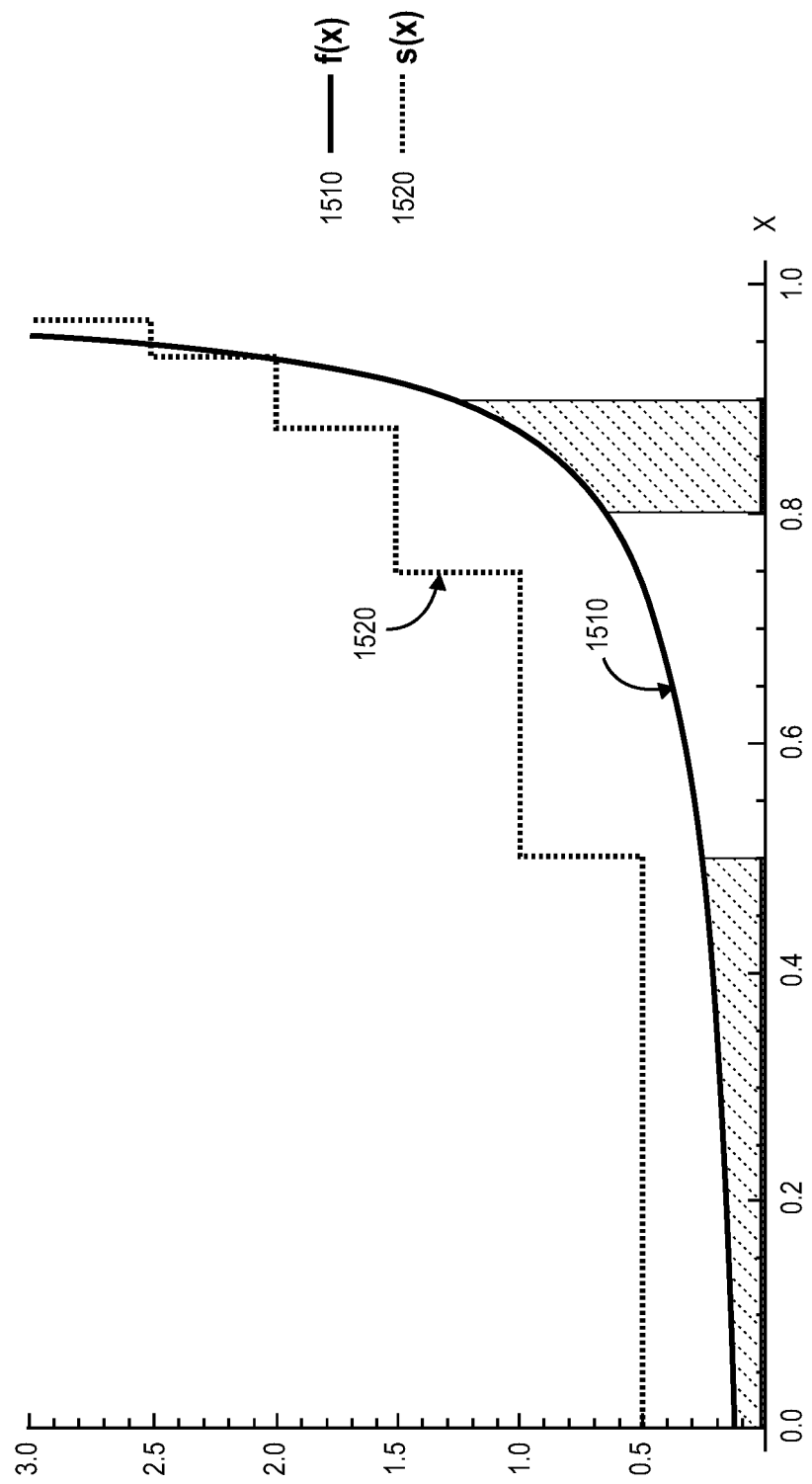
FIG. 15 shows a plot of a probability density function according to embodiments.

These probabilities can be used to determine a probability distribution of the methods. FIG. 15 shows plots of probability density functions (pdf) f(x) 1510 and s(x) 1520. The function s(x) 1520 corresponds to the bounding the fork point method. The function f(x) 1510 corresponds to the following distributional view method. The client device can be configured to select one of the intervals uniformly at random (e.g., from the bounding the fork point approach section) and can sample a block uniformly at random from that interval.

First, consider a protocol that simply repeats the sampling steps q times. If the adversary is caught with probability at least p given one sample, then the adversary will be caught with probability at least $1-(1-p)^q$ after q independently and identically-distributed samples. This distributional approach can enable a simple analysis of the protocol as only the success probability of a single query needs to be bounded. Furthermore, it allows us to optimize the protocol by finding a query distribution that maximizes p. As shown in FIG. 15, the distribution introduced by the bounding the fork point probabilistic sampling method is not smooth. In the following, it is shown that a different and smoother distribution (f(x)) performs better.

Now, the optimal sampling distribution can be found. The sampling distribution can be a distribution over the blocks. The optimal sampling distribution can maximize the probability of catching the adversary given that the adversary chooses the optimal strategy. This can be done by finding the sampling distribution that maximizes the probability of catching the adversary with only a single query. Given this probability, the adversary's success probability can be directly bounded after q queries. As a simplifying assumption, the number of blocks can be described as a continuous space between 0 and 1. That is, the last block is at 1 and the genesis block is at 0. This simplified analysis produces a good distribution for the discrete case, which is shown herein.

As a first step, the probability density function (pdf) of the optimal sampling distribution will be shown to be increasing. A pdf f defined over the continuous range [0,1] is increasing if, for all a, b∈[0,1], b>af(b)≥f(a). For any distribution defined by a pdf that is not increasing, there exists a distribution that results in an equal or greater probability of catching the adversary.

Lemma 2 (non-increasing sampling distribution). A sampling distribution over the blocks defined by a non-increasing pdf f is not uniquely optimal (i.e., there exists another distribution with equal or higher probability of catching the adversary).

Proof. The statement can be proved by contradiction. Given f, there exists another pdf f' that with a single query succeeds in catching a given adversary with slightly higher probability.

Given that f is non-increasing, there exist numbers $x_1$, $x_2$, d∈[0,1] and intervals $I_1=[x_1, x_1+d]$ and $I_2=[x_2, x_2+d]$ such that $x_1+d \le x_2 \le 1-d$ and f(x)>f(x'), for all $x \in I_1 \wedge x' \in I_2$. Any adversarial strategy can be defined by a fork point a∈[0,1] and by the ranges of blocks which are invalid after a. Note that given a fork point, the adversary can freely decide which blocks (i.e., which intervals, to make invalid and which ones to honestly mine). For any strategy which produces an invalid block in $I_1$ but valid blocks in $I_2$ there exists a strategy which creates an additional invalid block in $I_2$ and one more valid block in $I_1$ without changing any other part of the strategy. Note that the converse is not true. If the fork point a>$x_1$ then it may not be possible to move invalid blocks to the first interval. Given that the querying probability of any point in $I_2$ is lower than the probability of any point in $I_1$ the adversary is always better off by moving all possible invalid blocks to $I_2$. $I_2$ must therefore contain no less invalid blocks than $I_1$ in any strategy which is optimal for the adversary.

Consider the probability distribution f' which is equal to f on all points but $x \in I_1 \cup I_2$. There exists an ε>0 such that for any point $x \in I_2$, f'(x)=f(x)+ε and for any point in $I_1$, f'(x)=f(x)−ε and the following condition holds: for all adversaries, a single query drawn from the distribution defined by f' has a slightly higher probability of querying an invalid block than a single query drawn from the distribution defined by f. This is because f' queries with higher probability in $I_2$ which must contain no less invalid blocks than $I_1$ for any optimal adversary.

Since all non-increasing distributions yield a non-unique optimal sampling distribution, a search can be focused on sampling distributions defined by increasing pdfs that sample later blocks with higher probability than earlier blocks. For such distributions, if the adversary forks off from the main chain at some point 0≤a<1, the adversary's best strategy can be to put all of its correctly-mined (i.e., valid) blocks at the end of its chain so they are the most likely to be sampled. If the adversary has a c fraction of the honest mining power, and 1−a is the length of the adversary's fork, then the adversary can mine a (1−a)c fraction of the chain. Thus, in its best strategy, the section of the adversary's chain from a to 1−(1−a)c does not contain valid blocks.

To catch the malicious full node, a client device can sample a block header in this interval. Hence, the probability that an adversary who forks at some point a is caught with one sample is $$\frac{\int_a^{1+ac-c} f(x)dx}{\int_0^1 f(x)dx},$$

where f(x) is proportional to the probability density function of the sampling distribution. Considering all points where the adversary could fork from, the probability that the adversary is caught is:

$$p = \min_{0 \le a < 1} \frac{\int_a^{1+ac-c} f(x)dx}{\int_0^1 f(x)dx}$$

The distribution that maximizes this quantity can be used to find the optimal protocol. The optimal protocol can be a sampling distribution which makes the adversary indifferent about which fork point to use. Otherwise, queries could be wasted on blocks which an optimal adversary would not make invalid anyway. Concretely, an f(x) can be found that satisfies $$\int_0^{1-c} f(x)dx = \int_a^{1+ac-c} f(x)dx.$$

In other words, if the adversary forked from the beginning of the chain or any other point, the client device has the same probability of catching it.

Through differential analysis, it can be found that $$f(x) = \frac{1-c}{c(1-x)}$$

satisfies this condition, i.e., $$\int_a^{1+ac-c} f(x)dx = \frac{(c-1)\ln(c)}{c}.$$

In FIG. 15, f(x) and this property is displayed visually.

How close f(x) is to the optimal sampling distribution can now be determined. First compute the normalized probability density function by normalizing f(x) by an $\int_0^1 f(x)dx$ factor. Unfortunately, f(x) goes to infinity as x approaches 1 and $\int_0^1 f(x)dx=\infty$. The querying domain can be restricted from 0 to 1−δ and a client device can check the final δ fraction of the blocks directly. Later the optimal value for δ will be discussed. Let $$g(x) = \frac{f(x)}{\int_0^{1-\delta} f(x)dx} = \frac{1}{(x-1)\ln(\delta)}.$$

The probability of catching the adversary can then be equal to $$p = \min_{0 \le a \le \frac{c-d}{c}} \int_a^{1+ac-c} g(x)dx = \int_0^{1-c} \frac{1}{(x-1)\ln(\delta)}dx = \log_\delta(c).$$

This probability takes into account that the last δ blocks can be manually verified by the protocol with probability 1. Any fork after $$\frac{c-d}{c}$$

can contain a manually-checked block, and thus be caught with probability 1.

Next, it will be shown that g(x) defines an optimal sampling distribution by showing that no sampling distribution can achieve a higher p value, i.e., a higher probability of catching the adversary with a single query. Note that the sampling strategy is optimal for an optimal adversary. The optimal adversary can adapt the placement of invalid blocks after learning the querying strategy.

Theorem 1 (optimal sampling distribution). Given that the last $\delta = c^k \in (0,1]$, $c \in \mathbb{N}$ fraction of the chain contains only valid blocks and the adversary can at most create a c fraction of valid blocks after the fork point a, the sampling distribution defined by the pdf $$g(x) = \frac{1}{(x-1)\ln(\delta)}$$

maximizes the probability of catching an adversary that optimizes the placement of invalid blocks.

Proof: Let $\delta = c^k$, for some $k \in \mathbb{N}$, then $$p = \frac{1}{k}$$

and that as k increases the success probability decreases. Hence, the smaller δ is set, the fewer the blocks that are always checked near the tip of the chain but the worse the probability of catching the adversary with a sample anywhere else. Therefore, a smaller δ leads to more samples from the rest of the chain.

g*(x) can be a probability density function of the best sampling distribution. Note that given Lemma 2, g*(x) is increasing and therefore for an optimal adversary the success probability is denoted by $$p^* = \min_{a, 0 \le a \le \frac{c-d}{c}} \int_a^{1+ac-c} g^*(x) dx.$$

g*(x), therefore, maximizes p*. The optimality condition implies that $\int_{1-c^i}^{1-c^{i+1}} g^*(x)dx \ge p^*$, for all integer $i \in [0, k]$, where $a = 1 - c^i$ is a possible forking point. Further, $\int_0^{1-c^k} g^*(x) dx = 1$ since g*(x) is a pdf. Further, $\int_0^{1-c^k} g^*(x) dx = \sum_{i=0}^k \int_{1-c^i}^{1-c^{i+k}} g^*(x) dx = 1 \ge k \cdot p^*$. This implies that $$p^* \le \frac{1}{k}.$$

Note that g(x) as a candidate distribution achieves $$p = \frac{1}{k}$$

and is, therefore, optimal.

Optimizing the proof size: given g(x) and p, $p_m$ can be defined as $$p_m = \left(1 - \frac{1}{k}\right)^m$$

as the probability of not catching the optimal adversary after m independent queries. Note that without loss of generality, $k \ge 1$ as otherwise $\delta > c$, implying that a sufficient fraction of blocks are checked to catch any adversary. If $p_m \le 2^{-\lambda}$, then $$m \ge \frac{\lambda}{\log_{1/2}\left(1 - \frac{1}{k}\right)}.$$

Now, assume that the client device checks L final blocks, $\delta n = c^k n = L$, thus $$k = \log_c\left(\frac{L}{n}\right) \text{ and } m \ge \frac{\lambda}{\log_{1/2}\left(1 - \frac{1}{\log_c\left(\frac{L}{n}\right)}\right)}.$$

This means that m approximates $\lambda \log_c(\frac{1}{2})\ln(n)$, i.e., $$\lim_{n \to \infty} \frac{m}{\lambda \log_c\left(\frac{1}{2}\right)\ln(n)} = 1.$$

As long as L is a constant, e.g., 1, the number of queries are linear in the security parameter λ and logarithmic in the size of the blockchain n.

Despite the already-good asymptotic, the optimal L that minimizes the proof size can be determined. Let B denote the number of hashes per block header. The proof size is approximately proportional to $|\pi| = m \cdot (B + \log_2 n) + L \cdot B$ (the average inclusion proof consists of $\log_2 n$ hashes). L' can then be determined by $L' = \arg\min_L |\pi|$ (i.e., the value of L for which $|\pi|$ attains its minimum). While it is difficult to analytically minimize $m \cdot (B + \log_2 n) + L \cdot B$, the optimal L can be found numerically. Alternatively, it can be approximated that $m \cdot (B + \log_2 n) + L \cdot B$. In particular, let $$h(n) = \lambda(B\ln 2 + \ln n)\log_c\left(\frac{L}{n}\right) - \frac{1}{2}\lambda(B\log 2 + \log n) + BL + \frac{1}{12}\lambda\ln c$$

Then, $\lim_{n \to \infty}(|\pi| - h(n)) = 0$, i.e., in the limit h(n) perfectly approximates $|\pi|$. Since h(n) is analytically simpler to minimize, it can be found that $$L' = \arg\min_L h(n) = \Lceil\log_{\frac{1}{c}}\left(2n^{\frac{1}{B}}\right)\Rceil.$$

Plugging L' into $|\pi|$ yields $|\pi| = \Theta(-\lambda \log(n)\log_c(n))$.

For realistic Ethereum values of $\lambda=50$, $n=2^{22}$, $c=\frac{1}{2}$, $B=16$, this leads to a proof size of 660 KB. Note that the real proof size for 4 million blocks in Ethereum is a bit smaller at less than 400 KB (see section VI.D.). This is because not all blocks have the same difficulty and later blocks have higher difficulty leading to better values for $\delta$.

Figure 14:
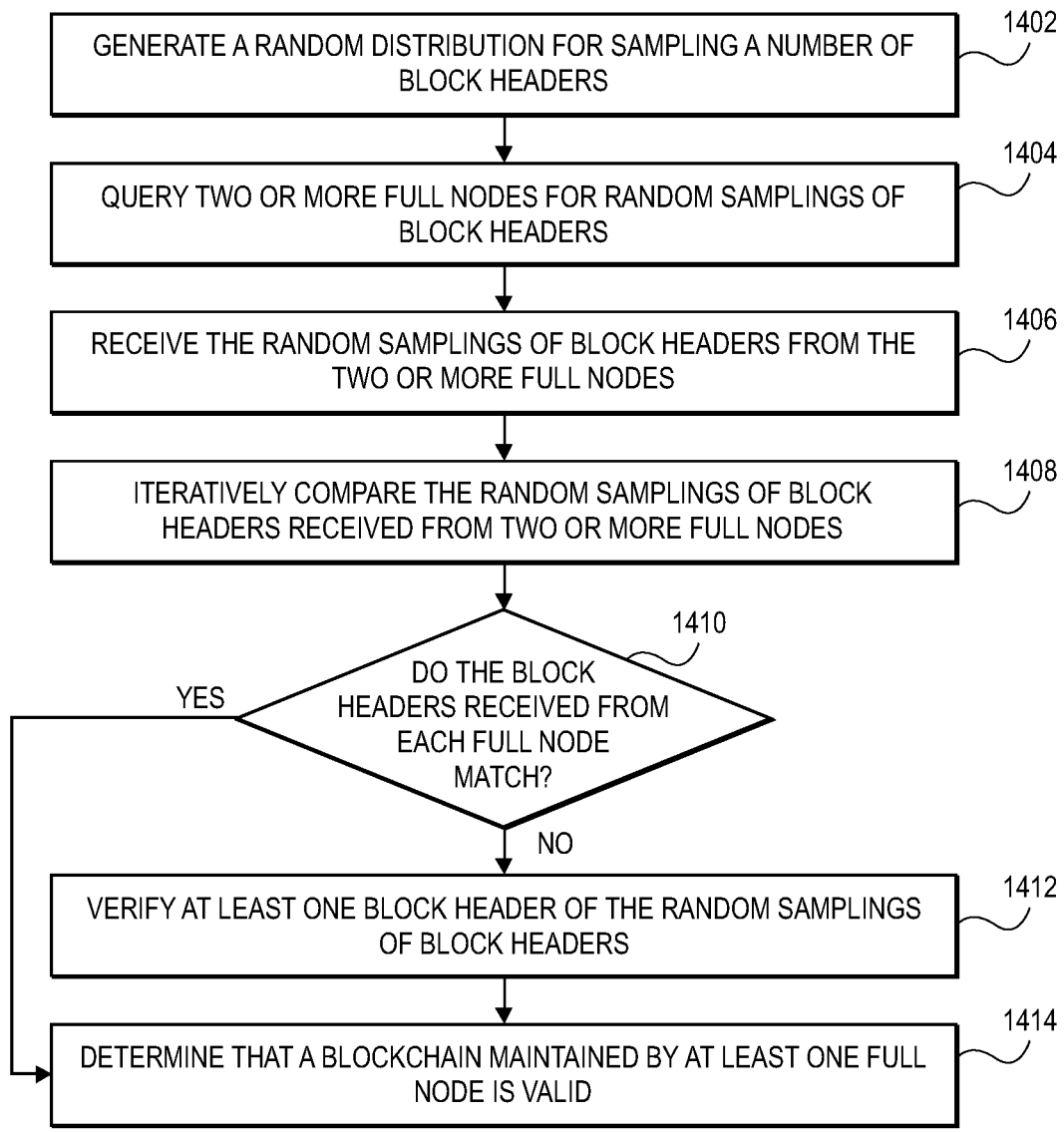
FIG. 14 shows a flow diagram of a distributional view probabilistic sampling method according to embodiments.

FIG. 14 shows a flowchart of a random distribution sampling method according to an embodiment. The method illustrated in FIG. 14 will be described in the context of a client device querying block headers from two or more full nodes using a distributional view probabilistic sampling method.

At step 1402, the client device can generate a random distribution for sampling a number of block headers. The client device can generate the random distribution based on a probability density function. In some embodiments, the probability density function is inversely related to block header number and inversely related to a natural log of a final number of block headers. For example, the client device can generate the random distribution based on:

$$g(x) = \frac{1}{(x-1)\ln(\delta)}.$$

In some embodiments, as described in section VI.C.5 below, the probability density function can be inversely related to an aggregate difficulty and inversely related to a natural log of a final number of block headers.

At step 1404, after generating the random distribution, the client device can query two or more full nodes for random samplings of block headers, as described herein. At step 1406, the client device can receive the random samplings of block headers from the two or more full nodes.

At step 1408, after receiving the random samplings of block headers, the client device can iteratively compare the random samplings of block headers received from two or more full nodes, as described herein.

At step 1410, the client device can determine whether or not the block headers received from each full node match, as described herein. If the client device determines that all of the block headers received from the two or more full nodes match, then the client device can proceed to step 1414. If the client device determines that at least one block header received from the two or more full nodes does not match, then the client device can proceed to step 1412.

At step 1412, the client device can verify at least one block header of the random samplings of block headers, as described herein. At step 1414, the client device can determine that a blockchain maintained by at least one full node is valid, as described herein.

Figure 16A:
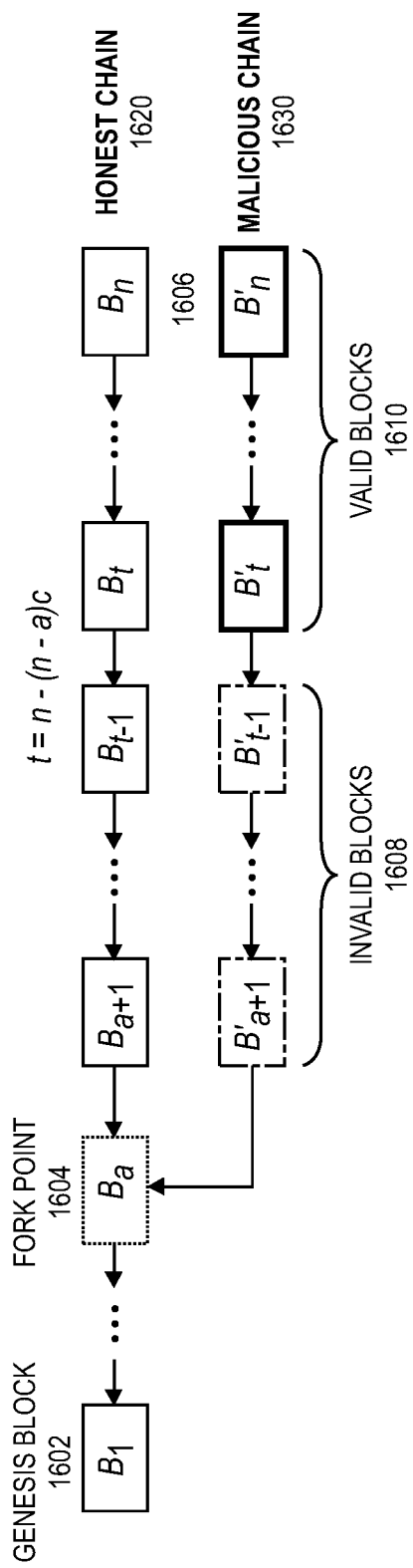
FIG. 16A shows a block diagram illustrating a fork point according to embodiments.
Figure 16B:
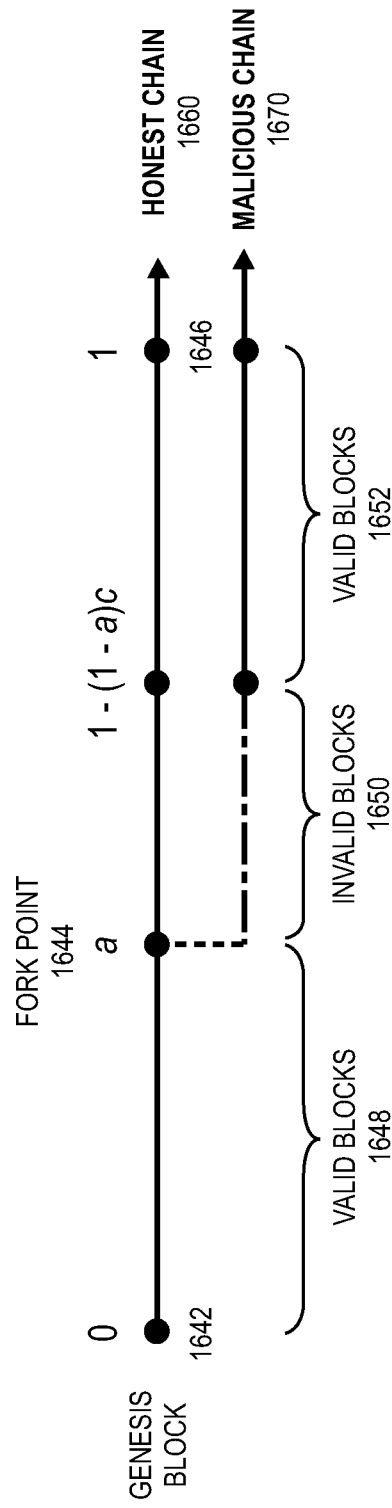
FIG. 16B shows a block diagram illustrating a fork point according to embodiments.

FIGS. 16A and 16B show block diagrams illustrating a fork point in a blockchain. FIG. 16A shows the blocks of the blockchain, whereas FIG. 16B shows a continuous representation of the blockchain from 0 to 1.

FIG. 16A shows a blockchain including a genesis block 1602 at block $B_1$ and a last block 1606 at block $B_n$. The blockchain can also include a fork point 1604 at block $B_a$. The fork point 1604 can be a point at which a malicious party attempts to create a fake blockchain. The malicious party can create a malicious chain 1630 which can differ from the honest chain 1620. The malicious party can be capable of mining false blocks that it can include into the malicious chain 1630, these blocks can be referred to as valid blocks 1610 as they can include valid PoW solutions. It is advantageous for the malicious party to include the valid blocks 1610 at the end of the blockchain since the client device can verify the last k block headers from the blockchain. Since the malicious party has limited computational power it cannot create as many blocks as the honest parties in the verification network. The malicious party can create invalid blocks 1608 to make the malicious chain 1630 longer. FIG. 16B can show a similar blockchain as FIG. 16A, however, the blockchain shown in FIG. 16B portrays the blockchain as continuous values rather than discrete blocks.

In some embodiments, after determining the fork point 1604, as described herein, the client device can query the two or more full nodes for random samplings of block headers from at least the section of the blockchain determined to possibly have the invalid blocks 1608. For example, the client device can sample block headers $B_{a+1}$ to $B_{t-1}$ from a first full node and can sample block headers $B'_{a+1}$ to $B'_{t-1}$. The client device can verify at least one block header received from each full node. For example, the client device can verify $B'_{a+1}$ from the second full node, but determine that the proof-of-work was falsified to create the block header for block $B'_{a+1}$. The client device can also verify $B_{t-1}$ from the first full node and determine that the block header is valid.

5. Handling Variable Difficulty

So far, the case that all blocks have the same difficulty has been considered. However, the distributional view allows the system to directly handle variable difficulty as well. The sampling distribution can remain the same as described above:

$$g(x) = \frac{1}{(x-1)\ln(\delta)},$$

but now x may indicate the relative aggregate weight and $\delta$ the relative weight of the blocks which are queried with probability 1. For example $x=\frac{1}{2}$ is the point in the chain where half of the difficulty has been amassed. And $g(\frac{1}{2})$ is the probability density at that point. Note that $x=\frac{1}{2}$ may be a recent block for chains with high difficulty growth. The proof size can be bounded in the case of variable difficulty. Note that each block can contain at least $\frac{1}{2}^\lambda$ of the total difficulty. This follows from the total difficulty being bounded by $2^\lambda$ and each block having at least difficulty 1. Even still the proof size grows as $\lambda^2 \log_c(\frac{1}{2})(B \ln(2)+\ln(n))$ as $\lambda$ goes to infinity. For the same worst case conditions and Ethereum parameters $c=0.5$, $n=2^{22}$, $\lambda=50$, $B=16$, described above, the estimated proof size is still just 1.85 MB. This is an upper bound for the proof size at these parameters. This analysis shows that embodiments of the invention are efficient even under the worst possible difficulty distribution.

Figure 17:
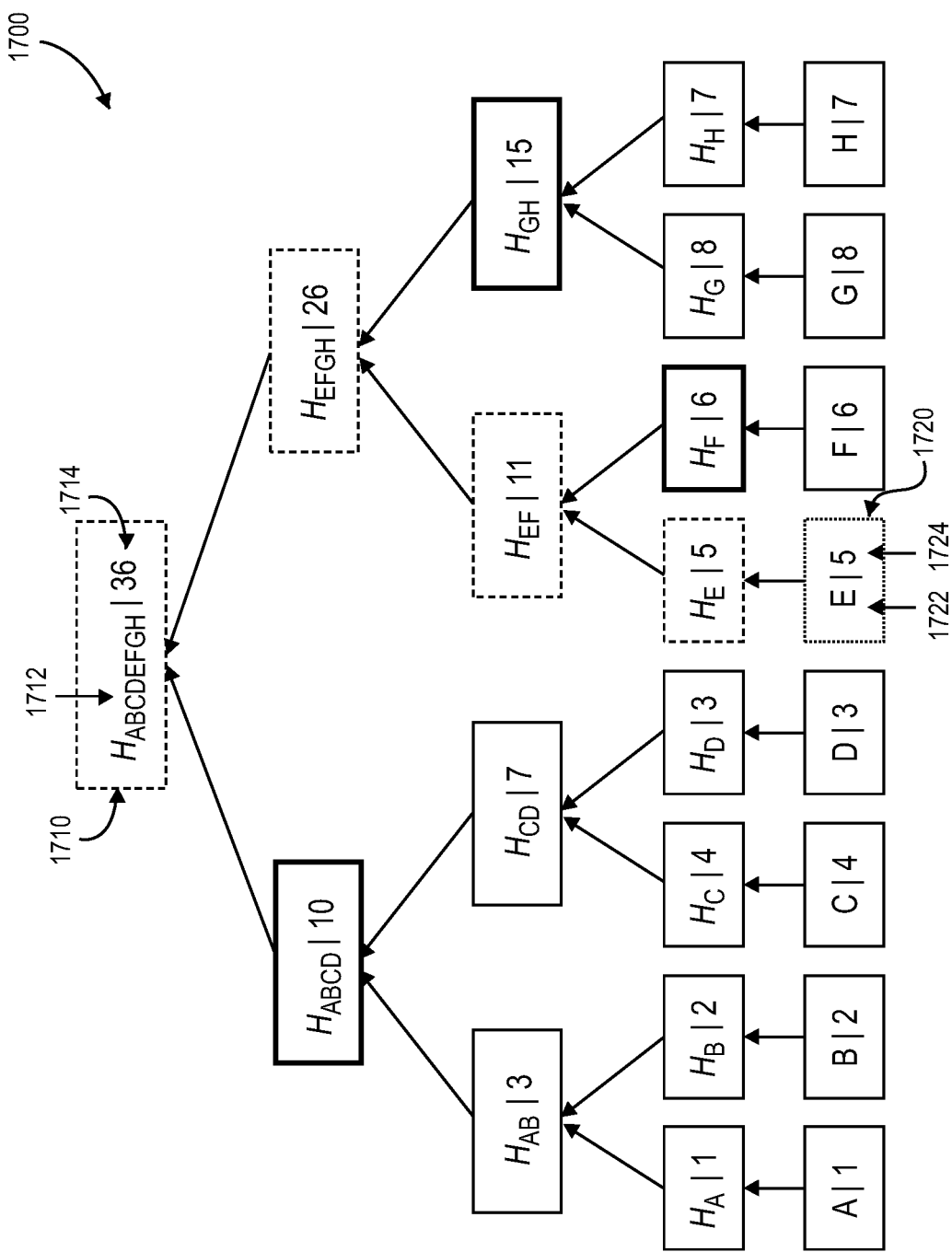
FIG. 17 shows a block diagram of a Merkle mountain range including difficulty values according to embodiments.

In some embodiments, the client device can verify which block has which total amassed difficulty. To allow for this, the MMR chain commitment can be slightly amended as depicted in FIG. 17. The Merkle mountain range shown in FIG. 17 shows the MMR further including aggregate difficulty values, also referred to as aggregate weights. The node 1720 includes a block header 1722 corresponding to block "E" as well as a difficulty value 1724 of "5" of the block "E." Each node can be hashed with its sibling node, as described in detail herein. The MMR root 1710 can include the hashed headers 1712 of child nodes and an aggregate difficulty value 1714.

Each node in the tree can contain an aggregate weight of all leaves below it. The root of the MMR can contain the total difficulty. A client device can check whether an inclusion proof is internally consistent within the MMR. For every node (in the MMR), the two children's weights can sum up to the node's weight. For example, the MMR root 1710 includes a weight (i.e., aggregate difficulty value) which can be the sum of the weights of the two children nodes including hashes of $H_{ABCD}$ and $H_{EFGH}$. In every Merkle tree inclusion proof, both children can be provided for every internal node. Each header can contain the total aggregated difficulty up to that block. The client device can check that the provided node is indeed at the x-th percentile of the total weight.

The check can be performed by the client device as follows. 1) $\Pi_k$ can be the Merkle proof for the k-th node which is claimed to be at the x-th weight percentile. 2) $d_k$ can be the difficulty of the node k. 3) Determine that node k indeed satisfies difficulty $d_k$. 4) Verify the Merkle proof and ensure that each node's difficulty is positive and the sum of its children's difficulty. 5) d can be the total difficulty of all left nodes in $\Pi_k$. 6) t can be the total difficulty indicated in the root. 7) Ensure that d/t≤x and that $$\frac{d + d_k}{t} > x.$$

6. Non-Interactive

Since the probabilistic verification method uses a randomness for the sampling, one solution to make the method non-interactive can be to have the client device to send the randomness to the full node. The full node can then uses the randomness to sample k blocks and can send them back to the client device. This can prevent the full node from biasing the sampled blocks and avoiding the detection of invalid blocks. However, this mechanism can include interaction between the client device and the full node. Moreover, the client device and the full node cannot forward the proof to other client devices as they cannot prove that the randomness is actually random. In this section, a mechanism to make embodiments non-interactive by removing the randomness exchange step between the client device and the full node will be discussed.

A protocol can be an interactive public-coin protocol [S Goldwasser and M Sipser. 1986. Private Coins Versus Public Coins in Interactive Proof Systems. In *Proceedings of the Eighteenth Annual ACM Symposium on Theory of Computing* (STOC '86). ACM, New York, N.Y., USA, 59-68.] if a client device's messages are chosen randomly from some known probability distribution. Concretely, in embodiments, these messages can be block numbers in some predefined intervals. Fiat and Shamir [Amos Fiat and Adi Shamir. 1986. How to prove yourself: Practical solutions to identification and signature problems. In *Conference on the Theory and Application of Cryptographic Techniques*. Springer, 186-194], show that it is possible to turn any interactive public-coin protocol into a non-interactive protocol which is sound in the random oracle model. To achieve this, every message of the client device can be replaced by the result of a query to a random oracle H, which in practice, is represented by a hash function such as SHA-3. H can be queried at the current transcript and the oracle's answer can be mapped into the client device's message space. Concretely, the queries can be computed by applying H to the block header.

The Fiat-Shamir heuristic turns the statistical soundness of the protocol described in section VI.B. into computational soundness as a full node can receive new samples by recomputing the final block header. On the other hand, recomputing the final header requires solving a new PoW puzzle, which itself requires a high number of queries to the hash function. In fact, the security assumptions herein give a concrete bound on the number of PoW puzzles the adversary can solve, which is c·n. Let $p_m$ be the soundness of the protocol described in section VI.B. and $2^{-\lambda}$ be the desired failure probability (e.g., $2^{-50}$). Using the union bound, it can be concluded that the non-interactive methods of embodiments, are secure as long as $$p_m < \frac{2^{-\lambda}}{c \cdot n}.$$

To make the probabilistic sampling method non-interactive, the Fiat-Shamir heuristic can be applied, see [Amos Fiat and Adi Shamir. 1986. How to prove yourself: Practical solutions to identification and signature problems. In *Conference on the Theory and Application of Cryptographic Techniques*. Springer, 186-194]. The randomness can be generated from the hash of the head of the chain. The client device now simply receives the full proof and checks that it is correct and that the randomness was derived correctly. The non-interactiveness makes embodiments more practical since (1) the full nodes can send the same proof to many client devices without any recalculation; (2) the client can forward the proof to other new client devices and the new clients can safely verify the correctness of the proof. This reduces both the computation and bandwidth overheads for both the full nodes and the client device.

A major benefit of the non-interactive proofs is that they are transferable. A single full node can produce a proof and other users can relay the proof without any additional computation. The relayed proof can still be convincing to a client device. A full node, therefore, can create a proof which many other client devices and/or full nodes can use. Moreover, by applying the Fiat-Shamir heuristic to the head of the chain it can be enforced that there only exists a single valid non-interactive proof for a given chain. It therefore suffices if a single party produces the proof for the valid chain and forwards it to all full nodes and/or client devices.

Another benefit of the non-interactive proofs is that they allow clients to re-sync to a chain that has grown since the last time they were given a proof for it, by only needing to download a shorter proof for the section of the chain they haven't seen. Once a client device has received a proof for a chain of n blocks (or D cumulative difficulty), they can be convinced that at the point in time when they received the proof for that chain it was the honest chain. Suppose that at a later point in time the chain has grown to n' blocks (or D' difficulty), the client device may need to only verify that this new section is honest and thus only a proof logarithmic in the size of the new section. Note that the full node must also provide a single MMR proof that block n is in the MMR of block n', meaning the previous chain is a prefix of the new chain.

Theorem 2 (Subchain proofs). A client device that was given a valid proof for a chain of length n at a time when the honest chain had length n, and when the honest chain has length n' is given a subproof for the subchain from n to n' including a Merkle proof that block n is in the MMR of block n', would not accept another chain if they were instead given the full proof for a chain of length n'.

Proof. Consider two strategies that the adversary may choose: (1) It forks from the honest chain after block n, this is as if the genesis block were set to block n and the subproof from block n to n' is a whole proof for a chain of n'−n blocks. (2) The adversary forks from the honest chain before n, by the security of the proof for the first n blocks, the client device would not accept the adversary's chain up to n so their subproof from n to n' would fail because the client device's block n is not in the MMR of the adversary's new chain. The client device that receives the whole proof would also not accept the adversary's proof based on the security of a proof for n' blocks.

A subchain proof may not have to be created specifically for the subchain, a client device can take a proof for a chain of n' blocks and only check the blocks after n. This allows for a client device to use only the part of a transferable n' chain proof which it has not yet verified. This can be a convenient option for client devices that may be running on cell phones or other data-limited devices and do not want to use data to re-check sections of chains they have already verified. Subchain proofs can also introduce the option of select checkpoint proofs, meaning that proofs can be created for select points in the chain and a client device can request the precomputed proof they need, minimizing the computation overhead for full node full nodes and proofs can be more easily reused.

D. Evaluation of Optimizations

Next, an experimental setup will be discussed. In order to measure characteristics of embodiments, the protocol was implemented and evaluated computationally in two different scenarios. The comparisons are focused on the proof size, as both creating and verifying proofs is fast. Even in the unoptimized implementations, it takes less than a second overall for the tested parameters.

First, embodiments will be compared with NIPoPoW in the scenario that all blocks have the same difficulty. NIPoPoW cannot handle variable difficulty chains. It is shown that both NIPoPoWs proofs and proofs according to embodiments are logarithmic in the chain length and that embodiments outperform NIPoPoW over all parameters. Additionally, the performance of embodiments on the actual Ethereum blockchain, which has widely varying difficulty, are presented. Embodiments significantly outperform standard SPV clients especially for longer chains. The evaluations assume a block header of size 508 bytes and a hash output of 32 bytes. Additionally, the MMR nodes contain 8 bytes to store the difficulty.

Embodiments are implemented as a proof-of-concept in Python. The implementation supports the production and verification of proofs and does not verify state transitions. A hard fork is assumed (i.e., that each block header contains the MMR root of all previous blocks). Several optimizations are performed to minimize the proof size. First, the smallest proof size is optimized by varying different values of δ. The security holds for arbitrary values of δ so a full node can choose a δ which minimizes the proof size. Note that some of the analytical optimizations from above may not directly apply as the difficulty is variable in this implementation. However, it can provide a good starting point for a numerical optimization of proof size.

Figure 19:
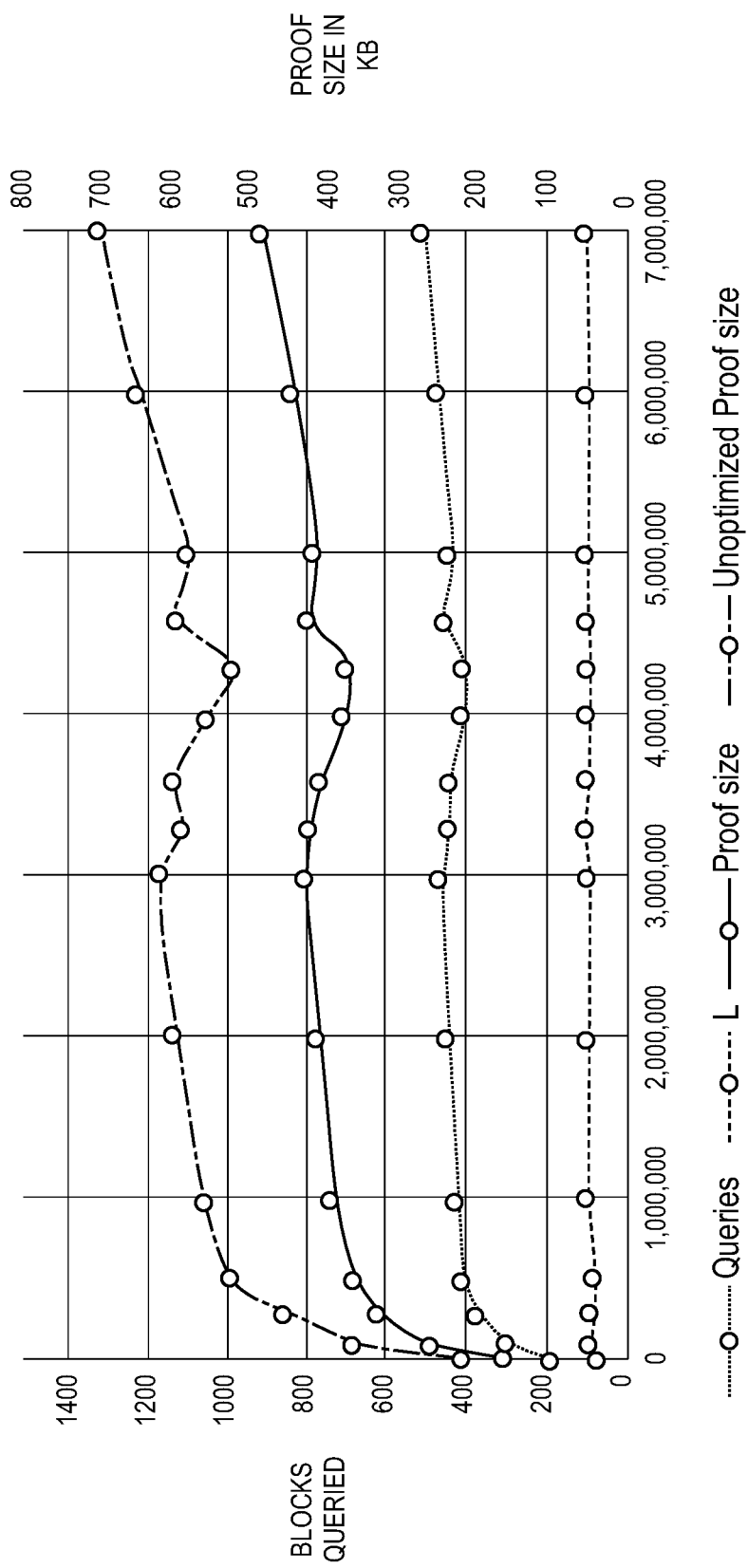
FIG. 19 shows a plot illustrating an implementation of embodiments.

The proof size can be reduced by not duplicating overlapping MMR proof elements. Note that overlaps can be fairly common as the sampling distribution samples late blocks with significantly higher probability. The client device can easily detect which nodes in a proof are shared and therefore does not query the duplicated information from a full node. The efficiency of this optimization is displayed in FIG. 19. It can be seen that it reduces the proof size by around 30%. Additionally the plot shows the number of manually checked blocks vs. the number of randomly sampled blocks. Even at a chain length of 7,000,000 the methods as described herein inspect around 600 blocks, which is a large improvement. Additionally, the number of manually inspected blocks, L, hardly grows with increased chain length.

1. Comparison with NIPoPoW

NIPoPoW promises short proofs of proof of work for client devices. Embodiments are compared with NIPoPoW by analytically computing NIPoPoWs proof size. The security level of NIPoPoW and embodiments are matched such that for security parameter λ an attacker who controls a c fraction of the main chain's mining power succeeds with probability $2^{-\lambda}$. Concretely, in NIPoPoW both the number of blocks checked at the end of the chain (k) and the length of each super-chain m are set to $$\log_{\frac{1}{c}}(2)\lambda.$$

Figure 18:
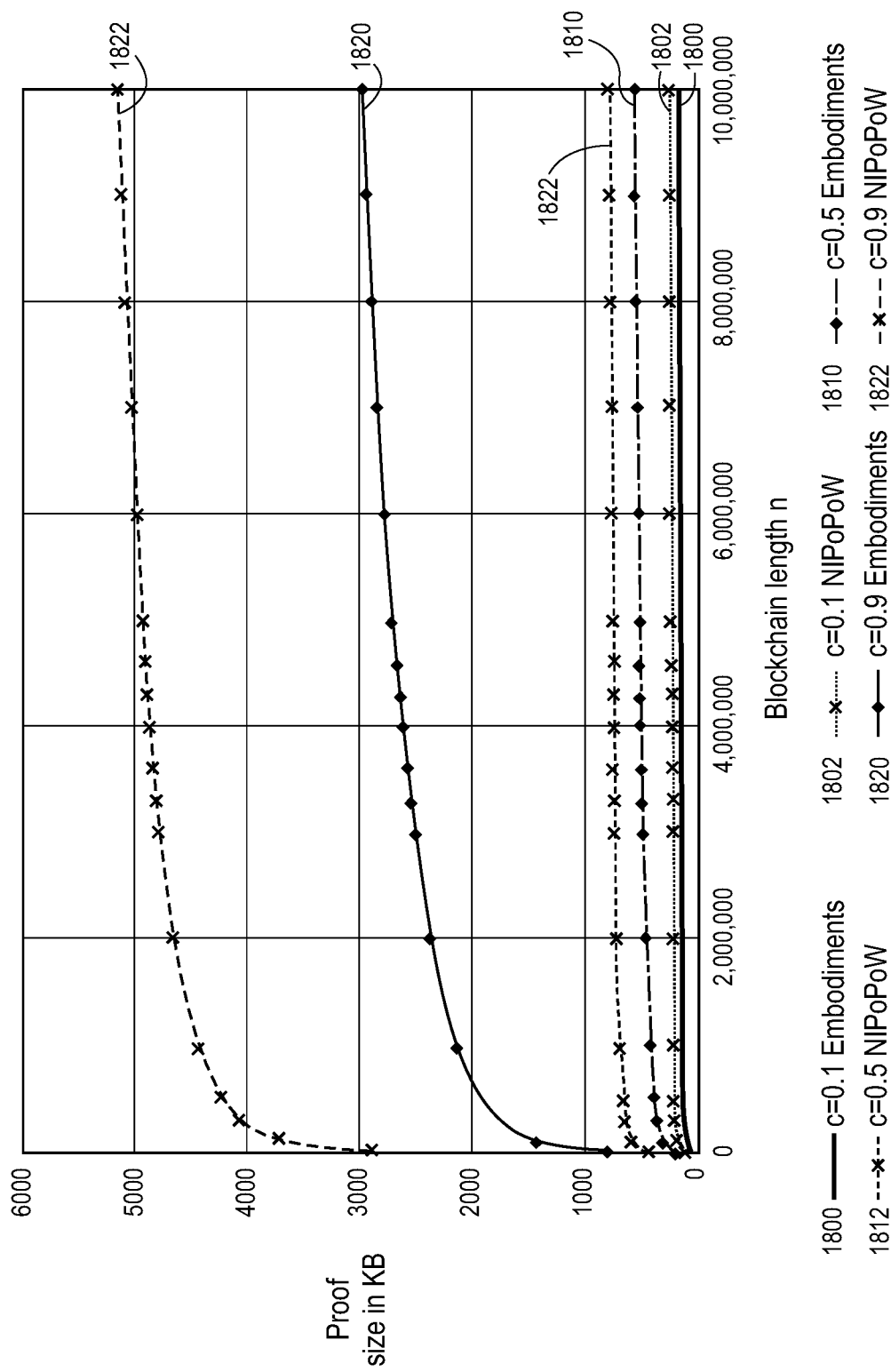
FIG. 18 shows a plot illustrating proof size comparing embodiments to previous methods.

The total NIPoPoW proof size is $$\log_{\frac{1}{c}}(2)\lambda \cdot ((\log_2(n)+1) \cdot B + \log_2(n) \cdot \lceil \log_2(\log_2(n,2),2) \rceil \cdot |H|),$$

for B=508 bytes being the size of each block and |H|=32 bytes being the size of a hash. The two client device approaches are compared in FIG. 18. The evaluation uses a security parameter of λ=50 and 3 different parameterizations of c. c can be a bound on the fraction of the honest mining power that an adversary controls.

$$\frac{c}{1+c}$$

can be the fraction of the total mining power that the adversary controls. For c=0.9 this is 47.3%. Both proofs are very efficient producing proofs under 6 MB even for the largest parameters. Embodiments outperform NIPoPoW over all parameters but especially for large values of c, yielding an almost 40% improvement in proof size. This validates the optimization approach for finding an optimal client device design. Note that for n=10,000,000, an SPV client would have required a 4.9 GB proof over 1000 times more than the corresponding proof according to embodiments for c=0.9.

2. Implementation with Variable Difficulty

Figure 20:
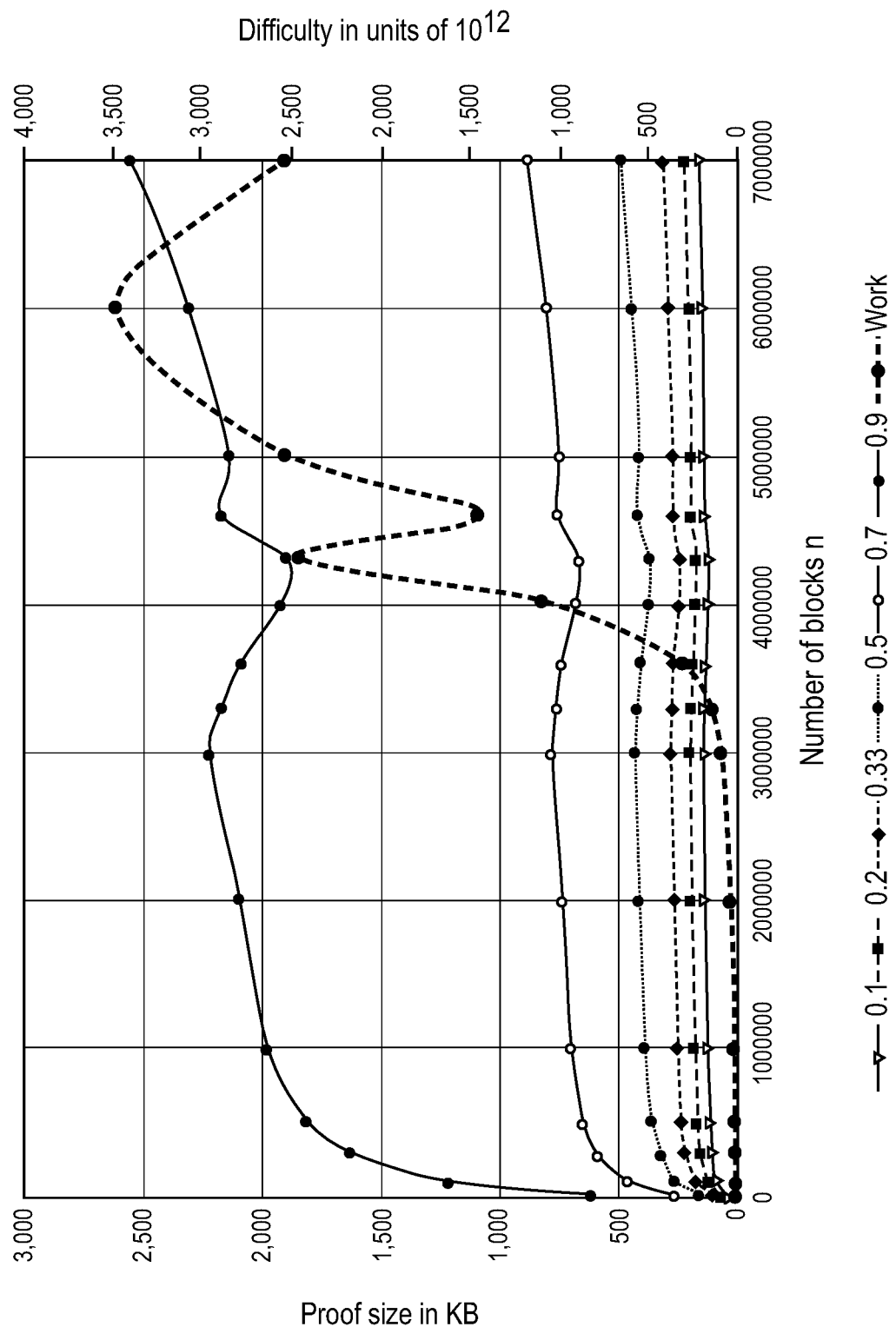
FIG. 20 shows a plot illustrating an amount of blocks queried according to embodiments.

Embodiments are further implemented for the Ethereum blockchain where experiments can measure its performance at different chain lengths (i.e., at different historic data points). Ethereum's PoW difficulty is not constant but varies widely and has historically been increasing. Embodiments include the first proof of proof-of-work design that achieves succinct proof sizes for variable difficulty chains. The efficiency of embodiments are shown in FIG. 20. For c=0.5 (i.e., the adversary with less than a third of the total mining power the proofs are less than 1 MB even for 7,000,000 Ethereum blocks). This compares to a 3.4 GB SPV proof size for the same chain. The mining difficulty is also plotted in the same figure. Interestingly, the proof size decreases from 3 to 4 million blocks as the difficulty rapidly grows. This is because with high difficulty growth the manually checked blocks contain a larger fraction of the overall difficulty. This reduces the number of blocks that need to be sampled from the rest of the chain. From 3 to 4 million blocks, a so-called difficulty bomb [Rakesh Sharma. What Is Ethereum's "Difficulty Bomb" ? https://www.investopedia.com/news/what-ethereums-difficulty-bomb/. (August 2018). (Accessed on Feb. 5, 2019)] resulted in a rapid increase of proof size. This "bomb" was removed at around 4.3 million blocks which led to a drastic decrease in difficulty and accordingly a slightly higher proof size.

VII. Additional Details of Embodiments

A. Merkle Trees

A Merkle tree is a balanced binary tree where the leafs hold some value, and each non-leaf node stores a hash of both of its children. Such a structure allows proving the inclusion of any value in the tree with only a logarithmic number of hashes, known as a Merkle proof, as described herein. Definition 2: (Merkle Tree) Given a list of values, a Merkle tree is a balanced binary tree, where each leaf node stores some value, and each non-leaf node holds the value $H(LeftChild \| RightChild)$, where H is a collision-resistant hash function. Balanced binary tree here means a tree with n leaves that has depth less than or equal to $\lceil \log_2 n \rceil$.

Definition 3: Given a Merkle tree, MT, with root r, a Merkle proof that x is the kth node in MT, $\Pi_{k \in MT}$, are the siblings of each node on the path from x to r. Since MT has depth at most $\lceil \log_2(n) \rceil$, the proof length is at most $\log_2(n)+1$ as each node in the path can be calculated from it's two children so we only need the siblings and the 2 leaf nodes.

The system comprising two or more full nodes and a client device, as described herein can perform the following process regarding a Merkle tree. The client device knows the root of a Merkle tree and the full node wants to convince the client device that a particular node exists in the tree. The full node-client device model can include: 1) the client device has access to r=root of some Merkle tree, MT; 2) full node can have access to MT and generates a Merkle-Proof path of some $x \in MT = \Pi_{k \in MT}$ using Protocol 4 and sends it to the client device; 3) the client device uses the proof and x to build up the path to r' using Verify_Merkle_Proof, described below, and checks that r'=r; 4) if the checks pass, the client device accepts the proof, otherwise it rejects the proof.

Theorem 3: Given a Merkle tree, MT, a polynomial-time adversary cannot produce a valid proof $\Pi_{k \in MT}$ for a k not in MT. [Soundness of Merkle-proofs]. Proof. Assume the adversary can produce a valid proof $\Pi_{k \in MT}$. Let r be the root of MT, any proof must start with r, otherwise the client device can reject it. Since $k \notin MT$, the path the adversary gives must have some initial depth i at which it differs from any true path in MT.

Let $p'_i$ be the node in the path at level i and $s'_i$ be its sibling, and let $p_i$ and $s_i$ be the true nodes in a path in MT where $x = p_i \| s_i$ or $x = s_i \| p_i$ such that $H(x) = p_{i-1}$. In order for the client device to accept $\Pi_{k \in MT}$, x' must equal $p'_i \| s'_i$ or $s'_i \| p'_i$ such that $p_{i-1} = H(x')$. Since the sets $\{p_i, s_i\}$ and $\{p'_i, s'_i\}$ differ by at least one value as stated above, $x \neq x'$ therefore the adversary found a collision of H ($\bot$).

Theorem 4: Given a Merkle tree, MT, and a node $k \in MT$, a polynomial-time adversary cannot generate a proof $\Pi_{k \in MT}$ that is not a true path in MT. [Completeness of Merkle proofs]. Proof. Same as the proof of soundness, if there is some point in the path that differs from a true path in MT, in order for it to be valid, the adversary must have found a hash collision.

Algorithm 3 Merkle_Proof (Merkle root r, index k) → MMR Proof $\Pi_k$ for leaf k.

1. if r.leaves = 0 then
2.     return [ ]
3. end if
4. if k ≤ r.left.leaves the
5.     Π ← Merkle_Proof( r.left, k)
6.     return Π∥r.right.value
7. else
8.     Π ← Merkle_Proof( r.right, k-r.left.leaves)
9.     return Π∥r.left.value
10. end if Algorithm 4: Verify_Merkle_Proof (Merkle tree root r, number of leaves in the Merkle tree n, index k, element x, Merkle proof $\Pi_{k \in n}$). Note: This algorithm can be written recursively since every subtree of an MMR is also an MMR.

1.    y ← H(x), k' ← k − 1, n' ← n − 1
2.    if $|\Pi_{k \in n}| \neq \lceil \log_2(n') \rceil$ then
3.            return reject
4.    end if
5.    for z ∈ $\Pi_{k \in n}$ do
6.       if k'mod2 = 0 ∧ k' + 1 ≤ n' then
7.           y ← H(y∥z)
8.       else
9.           y ← H(z∥y)
10.      end if
11.    $k' \leftarrow \left\lfloor \frac{k'}{2} \right\rfloor, n' \leftarrow \left\lfloor \frac{n'}{2} \right\rfloor$ B. Merkle Mountain Ranges Definition 4: A Merkle Mountain Range, M, is defined as a tree with n leaves, root r, and the following properties: 1) M is a binary hash tree; 2) M has depth $\lceil \log_2 n \rceil$; and 3) If n>1, let $n = 2^i + j$ such that $\lfloor i = \log_2(n-1) \rfloor$, then 3a) r.left is an MMR with $2^i$ leaves, and 3b) r.right is an MMR with j leaves. Note: M can be a balanced binary hash tree, i.e., M is a Merkle tree. Therefore, for all nodes $k \in M$, $\exists \Pi_{k \in M}$.

AppendLeaf can be the O(log n) algorithm used to append new nodes to an existing MMR with n leaves. Algorithm 5: AppendLeaf(MMR root r, new leaf node x): Returns new MMR root r'.

1. if r.leaves = $2^i$ for i ≥ 0 ∈ Z then
2.     Node r'
3.     r'.left ← r
4.     r'.right ← x
5.     r'.value ← H(r∥x)
6.     r'.leaves ← r.leaves + 1
7.     return r'
8. else
9.     r.right ← AppendLeaf (r.right, x)
10.    r.value ← H(r.left∥r.right)
11.    r.leaves ← r.leaves + 1
12.    return r
13. end if Theorem 5: Given an MMR, M, with root r and n leaves, AppendLeaf(r, x) can return an MMR, M', with n+1 leaves (the n leaves of M plus x added as the right-most leaf).

Algorithm 6: Get_Root(number of leaves in the MMR n, proof for block k $\Pi_{k \in n}$): Given $\Pi_{k \in n}$, the algorithm returns the root for the MMR of the tree with k−1 blocks, i.e., the root stored in the header of block k.

```
1.      k' ← k - 1, n' ← n - 1, r = ⊥
2.      for y ∈ Π_{k∈n} do
3.          if k'mod2 = 1 ∨ k' + 1 > n' then
4.              if r = ⊥ then
5.                      r = Π[i]
6.              else
7.                      r = H(y||r)
8.              end if
9.          end if
10.         k' ← ⌊k'/2⌋, n' ← ⌊n'/2⌋
11.     end for
12.     if y = r then
13.         return 1
14.     else
15.         return 0
16.     end if
```

A set of MMRs can be defined as $M=\{M_1, M_2, \ldots, M_n\}$ created from some list $[x_1, x_2, \ldots, x_n]$, where $M_1$ is a single node with value $x_1$ and $r_i$ is the root node of an i leaf MMR, $M_i$=AppendLeaf$(r_{i-1}, x_i)$, as described herein. Theorem 6: For k≤n, given $\Pi_{x_k \in M_n}$, i.e., the Merkle proof that leaf $x_k$ is in $M_n$, a client device can regenerate $r_k$, the root of $M_k$.

Corollary 1: If $x_1, \ldots, x_n$ are the hashes of blocks 1 through n of chain $C_n$, $r_n$ commits the first n blocks to $x_n$, and $\Pi_{k \in M_n}$ for any k commits $x_1, \ldots, x_k$ as the blocks of the chain $C_k$, where chain $C_k$ is a prefix of chain $C_n$.

Corollary 2: If an adversary changes any block i in the chain in any way, then it's hash $x_i$ will also change, so any MMR $M_k$ for k≥i with root $r'_k$ that contains the new block $x'_i$ will have that $r'_k \neq r_k$.

Definition 5: A valid block $B_x$ for a chain ending in block $B_n$ with MMR root $M_{n-1}$, is a header with PoW and for which a $\Pi_{x \in M_{n-1}}$ exists. Definition 6: An honest chain $B_0, B_1, \ldots, B_n$ of length n, is an ordered list such that each $B_i$ is valid. Theorem 7: Given an MMR, M, with root r and n leaves, AppendLeaf(r,x) can return an MMR, M', with n+1 leaves (the n leaves of M plus x added as the right-most leaf).

Proof. Induction on n. Base case: (n=1) M is a single node r with depth 0. r.children=0, so AppendLeaf returns a new node with left=r and right=x, and value=H(x||r). This is a balanced binary hash tree with 2 leaves and depth $1=\log_2 2$.

Induction step: assume theorem holds for all M with <n leaves. Let M be an MMR with n leaves and root r, AppendLeaf(r,x) can return the following: 1) if $n=2^i$ for some i∈ℕ, AppendLeaf returns a new node, r', with left=r, right=x and value=H(r||x). M' is the new tree with the 3 properties of an MMR; 1a) since M is a hash tree, so is M'; 1b) since the depth of $M=\log_2 n$, the depth of $M'=\log_2 n+1=\lceil \log_2(n+1) \rceil$; 1c) $n'=2^i+1$—r'.left=M, a MMR with $n=2^i$ leaves—r'.right=x, a MMR with 1 leaf.

The leaves of M' are the leaves of M plus x added as the new right-most leaf. Otherwise, $\exists i,j \in \mathbb{N}$ s.t.

$$n = \max_i 2^i + j,$$

AppendLeaf returns r with r.left the same, and r.right=AppendLeaf(r.right, x), and value=H(r.left||r.right). M' is the new tree with the following MMR conditions satisfied. (1,3) r'.left is an MMR by definition with 2 leaves, r'.right is an MMR by the induction hypothesis with j+1 leaves, thus M' is a hash tree. (2) M has depth $\log_2 2^i = i \geq j$, thus M' has depth $i+1 = \lceil \log_2(n+1) \rceil$. The leaves of M' are the leaves of r'.left=r.left, then the leaves of r'.right which by the induction hypothesis can be the original leaves of r.right plus x on the right-most side.

Theorem 8: For k≤n, given $\Pi_{x_k \in M_n}$, the Merkle proof that leaf $x_k$ is in $M_n$, a client device can regenerate $r_k$, the root of $M_k$. Proof. Induction on n. Base case: (n=1) $M_1$=Node$(x_1)$, $\Pi_{x_1 \in M_1}=[r_1]$.

Induction step: Assume the theorem holds for all $M_m$, m<n and k≤m. Given $M_n$, any k and $\Pi_{k \in M_n}=[r_n, r_n$.left, $r_n$.right, . . . ], if k=n then $r_k=r_n$. Otherwise, let i be the maximum integer s.t. $n=2^i+j$ where j>0. There can be 3 possibilities: 1) $k=2^i$, $r_k=r_n$.left. 2) $k<2^i$, thus $x_k$ is in the left subtree of $M_n$. Let $n'=2^i$ and $r_{n'}=r_n$.left, we get that $\Pi_{x_k \in M_{n'}}=\Pi_{x_k \in M_n}-[r_n, r_n$.right]. Since n'<n, by the induction hypothesis we can get $r_k$ from $\Pi_{x_k \in M_{n'}}$. 3) $k>2^i$, thus $x_k$ is in the right subtree of $M_n$. Since k<n and i is the maximum integer s.t. $n=2^i+j$ for some j>0, i is also the maximum integer s.t. $k=2^i+j'$ for some j'>0. Thus $r_k$.left=$r_n$.left. Note $r_n$.right is the MMR $M_j$ where k is the $k'=k-2^i=j$'th leaf. Thus, $r_k$.right=$M_{k'}$, and $\Pi_{x_k \in M_j}=\Pi_{x_k \in M_n}-[r_n, r_n$.left]. By the induction hypothesis we can extract $r_k$, from $\Pi_{x_k \in M_j}$. The client device hashes the left and right roots to get the value of $r_k$.

C. Embodiments for Proof-of-X Protocols

For simplicity, methods according to embodiments are described in the context of Bitcoin and Ethereum, where the blockchain grows based on a PoW mining process. However, it is understood that embodiments are applicable to any proof-of-X protocol [Shehar Bano, Alberto Sonnino, Mustafa Al-Bassam, Sarah Azouvi, Patrick Mc-Corry, Sarah Meiklejohn, and George Danezis. 2017. Consensus in the Age of Blockchains. CoRR abs/1711.03936 (2017). arXiv: 1711.03936 http://arxiv.org/abs/1711.03936], where a more energy-efficient alternative to PoW is used to build a chain based on the longest chain rule, similar to Bitcoin and Ethereum. Examples of such alternatives are proof-of-stake [Aggelos Kiayias, Alexander Russell, Bernardo David, and Roman Oliynykov. 2017. Ouroboros: A provably secure proof-of-stake blockchain protocol. In *Annual International Cryptology Conference*. Springer, 357-388], proof-of-space [Stefan Dziembowski, Sebastian Faust, Vladimir Kolmogorov, and Krzysztof Pietrzak. Proofs of Space. Cryptology ePrint Archive, Report 2013/796. (2013). http://eprint.iacr.org/], or proof-of-elapsed-time Intel Sawtooth Lake Documentation, Available at https://intelledger.gitub.io. (March 2017)]. Such a protocol can allow a node to verify the validity of each block individually ensuring that the block creator has spent (or burnt) a certain amount of a resource uniquely for this block.

Proof-of-space (PoS) protocols may require a source of randomness that can reveal random strings in regular intervals to pick leaders (i.e., block proposers) randomly with respect to the stake distribution. PoS protocols typically extract this randomness from various sources such as previous blocks [Rafael Pass and Elaine Shi. Hybrid Consensus: Efficient Consensus in the Permissionless Model. Cryptology ePrint Archive, Report 2016/917. (2016). http://eprint.iacr.org/2016/917, Yossi Gilad, Rotem Hemo, Silvio Micali, Georgios Vlachos, and Nickolai Zeldovich. 2017. Algorand: Scaling *Byzantine* Agreements for Cryptocurrencies. In *Proceedings of the 26th Symposium on Operating Systems Principles (SOSP '17)*. ACM, 51-68. http://doi.acm.org/10.1145/3132747.3132757] or multi-party coin tossing [Aggelos Kiayias, Alexander Russell, Bernardo David, and Roman Oliynykov. 2017. Ouroboros: A provably secure proof-of-stake blockchain protocol. In *Annual Inter-*

*national Cryptology Conference*. Springer, 357-388]. Some of these protocols grow their chains based on the longest chain rule that can result in forks. Some PoS protocols such as [Algorand] and [Eleftherios Kokoris-Kogias, Philipp Jovanovic, Linus Gasser, Nicolas Gailly, Ewa Syta, and Bryan Ford. 2018. OmniLedger: A Secure, Scale-Out, Decentralized Ledger via Sharding. In 2018 *IEEE Symposium on Security and Privacy (S&P)*. 19-34. doi.ieeecomputersociety.org/10.1109/SP.2018.000-5], however, use a hybrid design to avoid forks. Embodiments can be used in the first type of PoS protocols with minimal changes to allow lightweight transaction verification.

D. Client Devices for Hybrid Blockchains

Most hybrid blockchain protocols such as [Ittai Abraham, Dahlia Malkhi, Kartik Nayak, Ling Ren, and Alexander Spiegelman. 2017. Solida: A Blockchain Protocol Based on Reconfigurable Byzantine Consensus. In *Proceedings of the 21st International Conference on Principles of Distributed Systems (OPODIS '17)*[, [Timo Hanke, Mahnush Movahedi, and Dominic Williams. 2018. DFINITY Technology Overview Series, Consensus System. CoRR abs/1805.04548 (2018). arXiv:1805.04548 http://arxiv.org/abs/1805.04548], OmniLedger, and [Mandi Zamani, Mahnush Movahedi, and Mariana Raykova. 2018. RapidChain: Scaling Blockchain via Full Sharding. In 2018 *ACM Conference on Computer and Communications Security (CCS)*] that rely on classical Byzantine fault-tolerant (BFT) consensus protocols such as [Miguel Castro and Barbara Liskov. 1999. Practical Byzantine Fault Tolerance. In *Proceedings of the Third Symposium on Operating Systems Design and Implementation* (OSDI '99). 173-186.], including hybrid proof-of-stake protocols such as [Phil Daian, Rafael Pass, and Elaine Shi. Snow White: Provably Secure Proofs of Stake. Cryptology ePrint Archive, Report 2016/919. (2016). https://eprint.iacr.org/2016/919], [Algorand], and [Aggelos Kiayias, Alexander Russell, Bernardo David, and Roman Oliynykov. 2017. Ouroboros: A provably secure proof-of-stake blockchain protocol. In *Annual International Cryptology Conference*. Springer, 357-388], can create a special type of block, sometimes known as identity blocks, that stores the identities of block validators, usually referred to as a committee. Every identity block can contain the list of members of a new committee, signed by the previous committee, recording the transfer of custody from the previous committee to the new one, starting from a trusted "genesis committee". These committees can be usually re-elected at a slower rate than the rate transaction blocks are added to the blockchain. Therefore, the number of identity blocks is usually much smaller than transaction blocks, possibly only a sublinear (in the length of the transaction blocks) number of identity blocks.

To verify that a block belongs to the valid chain in a hybrid protocol, a client can download and verify every identity block, and then verify the signature on the desired transaction block against the public keys of the committee members who witnessed the addition of the block to the blockchain. Without verifying every identity block, a malicious full node can deceive the client by providing a fake signature along with a fake set of public keys that match the signature. Some BFT-based protocols such as Algorand that are resilient to a fully-adaptive adversary, choose a new committee for every transaction block resulting in a linear number of identity blocks required to verify transactions. To reduce this overhead by a factor of, say k, the acting committee can witness (i.e., sign) the election of k committees selected after it. This allows a client device to download only one identity block per every k identity blocks.

Embodiments of the invention provide for a number of advantages. For example, the light client does not need to assume that a full node is honest if the full node reports a current height of the blockchain. A malicious full node can report the same current height of the blockchain as the honest nodes in the verification network. The malicious full node can then provide fake block headers to the light client. Embodiments can provide for greater security by the light client effectively comparing block headers received from two or more full nodes in order to determine if at least one of the full nodes is malicious, rather than simply trusting that a full node that reports the same current height of the blockchain as other full nodes is honest.

However, querying multiple full nodes for block headers to compare the received block headers can introduce additional latency into the system. Embodiments of the invention provide for a number of additional advantages. For example, the light client can efficiently perform probabilistic sampling methods in one round (see at least section VI.C.4.) thus reducing latency in the verification network. Decreasing latency in a network of potentially thousands of full nodes and light clients is beneficial for quick interaction processing.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   receiving, by a client device, a verification request comprising an interaction identifier for an interaction;
   generating, by the client device, a random sampling of a number of block headers, wherein the random sampling is according to a random distribution that is generated based on a probability density function;
   querying, by the client device, two or more full nodes for random samplings of block headers from the two or more full nodes;
   receiving, by the client device, the random samplings of block headers from the two or more full nodes;
   comparing, by the client device, the random samplings of block headers received from two or more full nodes;
   based on the comparing, verifying, by the client device, at least one block header of the random samplings of block headers; and
   determining that a blockchain maintained by at least one of the two or more full nodes is valid in response to verifying the at least one block header of the random samplings of block headers,
   wherein the probability density function is inversely related to an aggregate difficulty and inversely related to a natural log of a final number of block headers,
   wherein block headers stored by the two or more full nodes include a Merkle mountain range root including a hash of previous block headers concatenated with the aggregate difficulty of a corresponding block header.

2. The method of claim 1 further comprising:
   after determining that the blockchain maintained by at least one of the two or more full nodes is valid, transmitting, by the client device to a prover, a verification response indicating the validity of the interaction.

3. The method of claim 2 wherein the client device is a first client device operated by a first user, and wherein the prover is a second client device operated by a second user.

4. The method of claim 2, wherein the verification request further comprises a Merkle proof and a Merkle mountain range proof.

5. A client device comprising:
   a processor; and
   a computer readable medium, the computer readable medium comprising code, executable by the processor, to implement a method comprising:
   receiving a verification request comprising an interaction identifier;
   generating a random sampling of a number of block headers, wherein the random sampling is according to a random distribution that is generated based on a probability density function;
   querying two or more full nodes for random samplings of block headers from the two or more full nodes;
   receiving the random samplings of block headers from the two or more full nodes;
   comparing the random samplings of block headers received from two or more full nodes;
   based on the comparing, verifying at least one block header of the random samplings of block headers; and
   determining that a blockchain maintained by at least one of the two or more full nodes is valid in response to verifying the at least one block header of the random samplings of block headers,
   wherein the probability density function is inversely related to an aggregate difficulty and inversely related to a natural log of a final number of block headers,
   wherein block headers stored by the two or more full nodes include a Merkle mountain range root including a hash of previous block headers concatenated with the aggregate difficulty of a corresponding block header.

6. The client device of claim 5, wherein the client device is a smart phone, and wherein the smart phone further comprises:
   a memory.

7. The client device of claim 5, wherein the computer readable medium further comprises a light client.

8. The client device of claim 5, wherein the two or more full nodes store the blockchain.

9. A method comprising:
   receiving, by a full node, a query from a client device including a request for one or more block headers from a blockchain, wherein the full node maintains a copy of the blockchain;
   generating, by the full node, a sampling of block headers comprising the one or more block headers, wherein the samplings of block headers are random samplings of block headers and wherein the client device generates a random sampling of a number of block headers, wherein the client device generates the random sampling according to a random distribution that is based on a probability density function; and
   transmitting, by the full node, the sampling of block headers to the client device, wherein the client device compares the sampling of block headers to corresponding block headers from one or more other full nodes, based on the comparison, verifies at least one block header of the sampling of block headers, and determines that the blockchain maintained by at least the full node is valid in response to verifying the at least one block header of the samplings of block headers,
   wherein the probability density function is inversely related to an aggregate difficulty and inversely related to a natural log of a final number of block headers,
   wherein block headers stored by the full node includes a Merkle mountain range root including a hash of previous block headers concatenated with the aggregate difficulty of a corresponding block header.

10. The method of claim 9, wherein a Merkle mountain range associated with the Merkle mountain range root can be a binary hash tree.

11. The method of claim 9, wherein the full node is a server computer in a verification network.

12. The method of claim 11, wherein the verification network comprises the one or more other full nodes.

13. The method of claim 9 wherein the client device is a wearable device.

14. The method of claim 9 further comprising:
   retrieving, by the full node, the one or more block headers from the blockchain.

* * * * *